United States Patent [19]
Aoki

[11] Patent Number: 5,978,609
[45] Date of Patent: *Nov. 2, 1999

[54] ELECTRONIC STILL VIDEO CAMERA HAVING ELECTRO-DEVELOPING RECORDING MEDIUM

[75] Inventor: Harumi Aoki, Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/600,515

[22] Filed: Feb. 13, 1996

[30] Foreign Application Priority Data

| Feb. 13, 1995 | [JP] | Japan | 7-047789 |
| Feb. 13, 1995 | [JP] | Japan | 7-047790 |
| Feb. 13, 1995 | [JP] | Japan | 7-047791 |
| Feb. 13, 1995 | [JP] | Japan | 7-047792 |
| Feb. 13, 1995 | [JP] | Japan | 7-047793 |
| Feb. 13, 1995 | [JP] | Japan | 7-047794 |

[51] Int. Cl.[6] .......... G03B 27/52; G03B 29/00; H04N 5/225; H04N 1/00
[52] U.S. Cl. .......... 396/429; 358/909.1; 358/906
[58] Field of Search .......... 396/429, 430, 396/446, 535; 348/222; 358/909.1, 906

[56] References Cited

U.S. PATENT DOCUMENTS

| 5,161,233 | 11/1992 | Matsuo et al. | 355/218 |
| 5,164,751 | 11/1992 | Weyer | 396/429 |
| 5,315,410 | 5/1994 | Takanshi et al. | 348/222 |
| 5,424,156 | 6/1995 | Aoki et al. | 430/59 |
| 5,465,133 | 11/1995 | Aoki | 396/429 |
| 5,606,420 | 2/1997 | Maeda et al. | 396/429 |
| 5,631,700 | 5/1997 | Sato | 348/222 |
| 5,708,472 | 1/1998 | Morisawa et al. | 348/373 |
| 5,739,849 | 4/1998 | Aoki et al. | 348/207 |

FOREIGN PATENT DOCUMENTS

| 0327236 | 1/1989 | European Pat. Off. |
| 2-29081 | 1/1990 | Japan |
| 3-15087 | 1/1991 | Japan |
| 3278342 | 12/1991 | Japan |
| 5-2280 | 1/1993 | Japan |
| 5-24706 | 4/1993 | Japan |
| 5150251 | 6/1993 | Japan |
| 6313894 | 11/1994 | Japan |

*Primary Examiner*—Safet Metjahic
*Assistant Examiner*—Michael Dalakis
*Attorney, Agent, or Firm*—Greenblum & Bernstein P.L.C.

[57] ABSTRACT

An electronic still video camera has an electro-developing recording medium and a printer. An optical image is focussed and formed on the electro-developing medium by a photographing lens, and is directly recorded and developed thereon as as a visible image. The recorded image is photoelectrically read by a CCD image line sensor as a series of pixel data, and the series of pixel data is processed to thereby produce a printing data therefrom. A printing is successively made on a paper on the basis of the processed printing data.

24 Claims, 35 Drawing Sheets

|   | X | Y |
|---|---|---|
| 1 | 640 | 480 |
| 2 | 768 | 512 |
| 3 | 1536 | 1024 |
| 4 | 3072 | 2048 |
| 5 | 4096 | 3072 |

Fig. 42

ELECTRONIC STILL VIDEO CAMERA HAVING ELECTRO-DEVELOPING RECORDING MEDIUM

BACKGROUND OF THE INVENTION

1. Field of the Invention

The present invention relates to an electronic still video camera having an electro-developing recording medium in which an optical image obtained through a photographing lens system is electronically and directly recorded and developed as a visible image a short period of time.

2. Description of the Related Art

Conventionally, silver halide photographic material is generally used as a material for recording an optical image. Silver halide photographic material has a high optical sensitivity and high resolution, and the economical efficiency thereof is excellent. However, silver halide photographic material has drawbacks in that not only is the developing process cumbersome, but also a visible image cannot be obtained at the same time as photography. A dry-type developing method has been developed to simplify the developing process. However, a simultaneous development in which a visible image is obtained upon photography is impossible in the dry-type developing method.

On the other hand, as non-silver-halide photographic materials, there are known electrophotographic materials, diazotype photographic materials and free-radical photographic materials, and so on. In these materials, however, there is no material which has advantageous characteristics like silver halide photographic material, while being able to simultaneously develop and keep a visible image. Note that, electrophotographic materials have been used mainly in copying machines, since they can perform dry-type development and can simultaneously develop an electrostatic latent image, which is obtained by exposure, using toner.

In such electrophotographic materials, recently, a photographic material has been developed, in which an optical image can be electronically and directly recorded and developed as a visible image in no time, the image so developed being similar to one obtained in a silver halide photographic material. A recording medium formed of such a recording material, in which a visible image is electronically and directly recorded and developed, is referred to as an electro-developing recording medium hereinafter.

For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layers and the electric charge keeping medium includes a liquid crystal display, both mediums being combined to face each other with a small gap therebetween. In use, a voltage is applied between the electrostatic information recording medium and the electric charge keeping medium, and an optical image is formed on the electrostatic information recording medium during the application of the voltage. An electric charge distribution is produced over the electrostatic information recording medium in accordance with a light intensity distribution of the optical image formed thereon, so that the intensity of an electric field acts on the liquid crystal of the electric charge keeping medium in accordance with the electric charge distribution. Thus, an image derived from the optical image is reproduced in the electric charge keeping medium as a visible image. Namely, as soon as the optical image is formed on the electrostatic information recording medium, the image is developed in the electric charge keeping medium.

When the electric charge keeping medium is constituted as a memory type liquid crystal display, the developed visible image can be kept therein even if the electric field is eliminated from the electro-developing recording medium. In the memory type liquid crystal display, the developed image can be erased by heating it at a given temperature. In this case, the same electro-developing recording medium can be repeatedly used for photographing.

In an electronic still video camera having the electro-developing recording mediums there may be provided an image reader comprising a CCD line sensor for electronically reading image signals from a developed image of the electro-developing recording medium, and the read image signals obtained from the CCD image sensor may be processed in various manners. For example, the read image signals may be stored in a second recording medium, such as an IC memory card, a floppy disk, a hard disk or the like. Also, the read image signals may be transferred from the camera to an external processing device, such as a computer, a TV monitor and so on.

Also, in such an electronic still video cameras it is desirable that the developed image is erased after the read image signals are stored in the second recording medium so that the same electro-developing recording medium can be repeatedly used for photographing. In this case, the developed image cannot be erased from the electro-developing recording medium by an erroneous switching operation of the camera.

Furthermore, it is desirable to incorporate a printer in the electronic still video camera such that the developed image can be reproduced and printed on a sheet of paper.

Under these circumstances, in the electronic still video camera as mentioned above, various modes are desired in operating the camera. Accordingly, the manipulation of the camera has a tendency towards being frequently complicated due to execution of operations based upon the various modes.

Furthermore, in the electronic still video camera, when the image signals read from the developed image of the electro-developing recording medium are transferred from the camera to the external device, such as a computer, a TV monitor or the like, the transfer of the image signals to the external device should not be executed without establishing a connection between the camera and the external device, so that an electric poser source of the camera can not be wastefully consumed. On the other hand, the electric power source of the camera should be arranged such that the complete transfer of the image signals to the external device can be ensured without interrupting the transfer of the image signals due to a consumption of the power source.

SUMMARY OF THE INVENTION

Therefore, an object of the present invention is to provide an electronic still video camera having an electro-developing recording medium and a printer, and constituted such that a manipulation thereof for executing operations in various modes can be easily carried out.

Another object of the present invention is to provide an electronic still video camera having an electro-developing recording medium and a printer, and constituted such that an execution of at least two operations can be positively prevented in those modes which are inconsistent with each other.

In accordance with an aspect of the present invention, there is provided an electronic still video camera having an electro-developing recording medium, comprising: photographing means for forming an optical image on the electro-developing recording medium to record the optical image therein; image-sensing means for successively sensing the recorded image of the electro-developing recording medium in a scanning manner to output a series of image data at an interval of scanning steps; and image-processing means for successively processing the series of image data outputted from the image-sensing means, to produce a series of image-reproduction data therefrom.

The electronic still video camera may further comprise image-reproduction means for reproducing an image on the basis of the image-reproduction data outputted from the image-processing means. Preferably, the image-reproduction means comprises dot-matrix printer for reproducing the image by generating dots on the basis of the series of image-reproduction data. Also, the image-reproduction means may comprise writing means for writing the image on an image-carrying medium, feeding means for feeding the image-carrying medium, and synchronization means for synchronizing a feeding of the image-carrying medium with the scanning steps of the image-sensing means. The electronic still video camera may further comprise video-processing means for processing the series of image data outputted from the image-sensing means, to produce a video signal therefrom; and disabling means for disabling the image-reproduction means during outputting of the video signal from the video-processing means. Preferably, the electronic still video camera further comprises means for varying intervals of the scanning steps of the image-sensing means.

In accordance with another aspect of the present invention, there is provided an electronic still video camera having an electro-developing recording medium, comprising: photographing means for forming an optical image on the electro-developing recording medium to record the optical image therein; image-sensing means for successively sensing the recorded image of the electro-developing recording medium in a scanning manner to output a series of image data at an interval of scanning steps; image-processing means for successively processing the series of image data outputted from the image-sensing means, to produce a series of image-reproduction data therefrom; image-reproduction means for reproducing an image on the basis of the image-reproduction data outputted from the image-processing means; operation-mode selection means for selecting one of the first operation mode and a second operation mode, the first operation mode involving the formation of the optical image by the photographing means the second operation mode excluding the formation of the optical image by the photographing means; and printing operation mode selection means for determining whether the reproduction of image by the image-reproduction means is enabled, wherein an execution of the reproduction of images by the image-reproduction means is enabled in both the first and second operation modes, but the execution is disabled in accordance with a disablement-determination of the printing operation mode selection means.

In accordance with yet another aspect of the present invention, there is provided an electronic still video camera having an electro-developing recording medium, comprising: photographing means for forming an optical image carrying color information on the electro-developing recording medium to record the optical image therein; image-sensing means for successively sensing the recorded image of the electro-developing recording medium in a scanning manner to output a series of image data carrying the color information at an interval of scanning steps; and image-processing means for successively processing the series of image data outputted from the image-sensing means, to produce a series of image-reproduction data carrying different color information reconstituted on the basis of the color information. The color information carried by the recorded image may comprise red, green, and blue color information, and the different color information may comprise cyan, yellow, magenta, and black color difference information.

In accordance with yet another aspect of the present invention, there is provided an electronic still video camera having an electro-developing recording medium, comprising: photographing means for forming an optical image carrying color information on the electro-developing recording medium to record the optical image therein; image-sensing means for successively sensing the recorded image of the electro-developing recording medium in a scanning manner to output a series of image data carrying the color information at an interval of scanning steps; and image-processing means for successively processing at least two series of image data outputted from the image-sensing means, to produce a series of image-reproduction data carrying different color information reconstituted on the basis of the color information. The color information carried by the recorded image may comprise red, green, and blue, and the different color information may comprise cyan, yellow, magenta, and black.

In the present invention, preferably, the electro-developing recording medium comprises an electrostatic information recording medium and an electric charge keeping medium. The electrostatic information recording medium may include a photoconducting layer and an inorganic oxide material layer, and the electric charge keeping medium includes a liquid crystal display. Also, preferably, the liquid crystal display comprises a memory type liquid crystal display.

BRIEF DESCRIPTION OF THE DRAWINGS

These objects and other objects of the present invention will be better understood from the following descriptions with reference to the accompanying drawings, in which:

FIG. 42 is a block diagram of the electronic still video camera shown in FIGS. 40 and 41.

DESCRIPTION OF THE PREFERRED EMBODIMENTS

Figure 1:
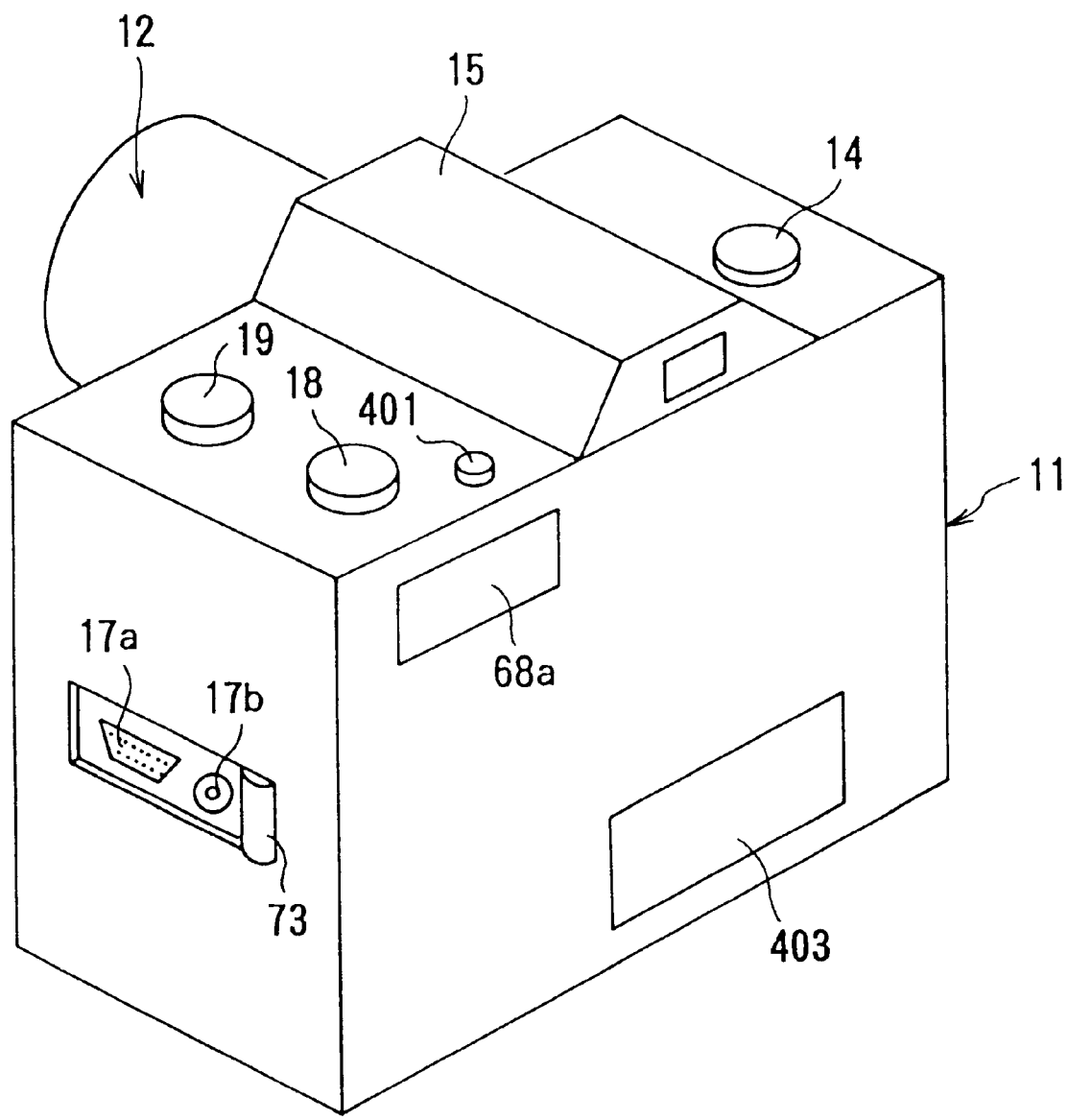
FIG. 1 is a schematic perspective view showing an appearance of a first embodiment of an electronic still video camera according to the present invention.

FIG. 1 is an external view of a first embodiment of an electronic still video camera according to the present invention. The camera comprises a camera body 11 having a box-like configuration, and a photographing optical system 12 provided on approximately a center portion of the front face thereof. An electronic flash (not visible) is provided at a suitable location of the front face of the camera body 11, and a view finder 15 is provided at a center location of a top surface of the camera body 11.

The camera comprises a printer provided in the camera body 11, and a photographed image can be printed on a suitable paper by the printer. In FIG. 1, reference 403 indicates a removal lid for closing an opening through which a roll of printing paper is inserted in the camera body 11. A printed paper is discharged from the camera body 11 through a discharge port (not visible) formed in a lower portion of the front face thereof.

A release switch 14 is provided at a side of the view finder 15, and three switches 18, 19 and 401 are provided on the side opposite to the release switch 14. The switches 18, 19, and 401 are referred to as an operation mode selection switch, a scan mode selection switch, and a printing mode selection switch, respectively, hereinafter.

An opening 11a is formed in a side wall of the camera body 11, and an output-terminal connector 17a is provided in the opening 11a for transferring image data from the camera to an external processing device such as a personal computer. Also, another output-terminal connector 17b is provided within the opening 11a adjacent to the output-terminal connector 17a, and is used to directly output a video signal to an external TV monitor. The opening 11a is usually closed by a slidable cover plate 73 provided within the camera body 11, whereby the output-terminal connectors 17a and 17b can be protected by the slidable cover plate 73. The slidable cover plate 73 is manually moved between a closed position and an open position, and is shown at the open position in FIG. 1. The slidable cover plate 73 can be held at each of the closed and open positions by a suitable click mechanism (not shown).

A display device 68 is provided on a rear surface of the camera body 11 at a suitable location thereof to display various setting conditions of the still video camera and messages necessary to operate the camera, and may be constituted as an LCD (liquid crystal display) panel.

Figure 2:
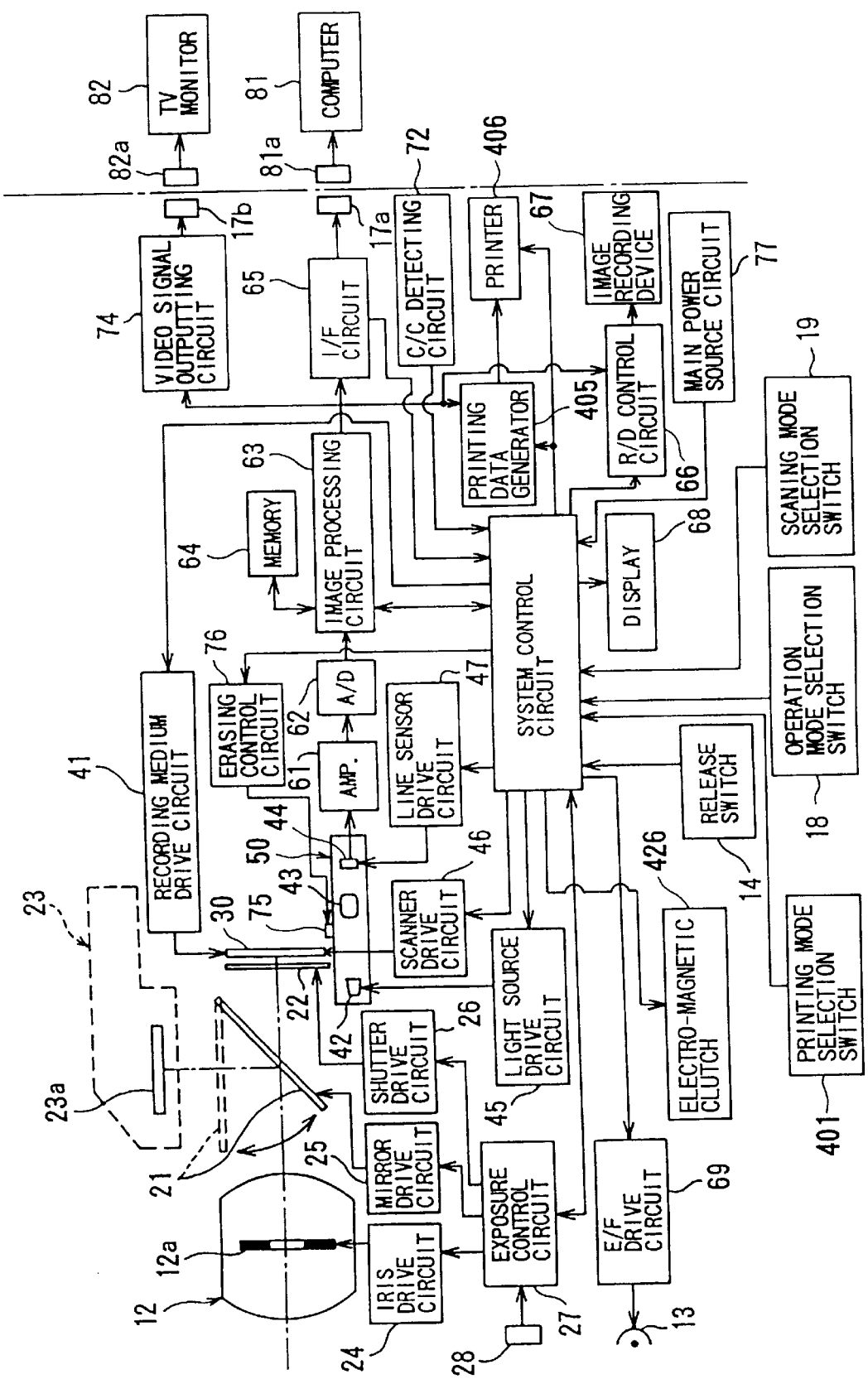
FIG. 2 is a block diagram of the electronic still video camera shown in FIG. 1.

FIG. 2 shows a block diagram of the still video camera as mentioned above, in which a system control circuit 20 including a micro-computer or micro-processor is provided to control the still video camera as a whole.

The photographing optical system 12 has a plurality of lens groups and an aperture 12a. An electro-developing recording medium 30 is disposed-behind the photographing optical system 12, and a quick return mirror 21 is placed between the photographing optical system 12 and the electro-developing recording medium 30. A shutter 22 is provided between the quick return mirror 21 and the electro-developing recording medium 30. The view finder 15 has a view finder optical system 23 including a focusing glass 23a which is disposed above the quick return mirror 21.

The aperture 12a, the quick return mirror 21 and the shutter 22 are driven by an iris drive circuit 24, a mirror drive circuit 25 and a shutter drive circuit 26, respectively. These drive circuits 24, 25 and 26 are controlled by an exposure control circuit 27 which is energized in accordance with a command signal outputted by the system control circuit 20.

When an exposure is controlled, an opening degree of the aperture 12a is adjusted by the iris drive circuit 24 under the control of the exposure control circuit 27, based on an output signal of a photometry sensor 28.

The quick return mirror 21 is usually set to a down position (an inclining position shown by the solid line in the drawing), and thus, a light beam passing through the photographing optical system 12 is led to the view-finder optical system 22, so that an object to be photographed can be observed by a photographer. When a photographing operation is carried out, the quick return mirror 21 is rotated upward by the mirror drive circuit 25, and is then set to an up position (a horizontal position shown by the broken line in the drawing), so that the light beam is directed to the shutter 22.

Shutter 22 is usually closed, and upon performing a photographing operation, the shutter 22 is opened over a given period of time by the shutter drive circuit 26 under the control of the exposure control circuit 27. Thus, the light beams passing through the photographing optical system 12 and the shutter 22 are led to a light receiving surface of the electro-developing recording medium 30, resulting in the forming a two-dimensional optical image thereon.

A voltage is applied to the electro-developing recording medium 30 under the control of a recording medium drive circuit 41. By exposing the electro-developing recording medium 30 while applying the voltage, an optical image formed by the photographing optical system 12 is developed on the electro-developing recording medium 30 as a visible image. Note that the recording medium drive circuit 41 is energized in accordance with a command signal outputted by the system control circuit 20.

A scanning mechanism 50 is immovably provided below the electro-developing recording medium 30, and comprises a light source 42, a scanner optical system 43, and a line sensor 44 aligned with each other and supported by a suitable frame member. The electro-developing recording medium 30 is moved between an upper position (shown in FIG. 1) and a lower position by a suitable driving mechanism which is driven and controlled by a scanner drive circuit 46. During the movement of the electro-developing recording medium 30 between the upper position and the lower position, the electro-developing recording medium 30 is passed between the light source 42 and the scanning optical source 43.

The light source 42 comprises an LED (light emitting diode) array or a plurality of light emitting diodes aligned with each other, and a collimater lens for converting the light beams, emitted therefrom, into parallel light beams. ON and OFF control of the light source 42 is performed by a light source drive circuit 45.

The line sensor 44 may comprise a one-dimensional CCD image sensor having. for examples 4,096 pixels, and serves as a photoelectric-conversion device for sensing and converting an optical image into electric pixel signals. The line sensor 44 is driven by a line sensor drive circuit 47.

Both the light source 42 and the line sensor 44 may be of suitable length to completely cover and extend over one horizontal-scanning line of the image formed on the electro-developing recording medium 30. When the electro-developing recording medium 30 is moved from the upper position to the lower position, it is scanned by the scanning mechanism 50. In particular, the scanning operation is carried out by intermittently moving the electro-developing recording medium 30, such that a liner segment of the image developed by the medium 30 is illuminated by the light source 42, and is focussed on a linear light receiving surface of the line sensor 44 by the scanner optical system 43. Note, the drive circuits 45, 46 and 47 are energized and controlled by the system control circuit 20.

Pixel signals sensed and read out of the line sensor 44 are amplified by an amplifier 61, and are then converted to digital pixel signals by an analog-digital (A/D) converter 62. The digital pixel signals are subjected to a shading correction, a gamma correction and so on by an image processing circuit 63 under control of the system control circuit 20, and are then temporarily stored in a memory 64 which may include an EEPROM having correction data for the shading correction. Note, the memory 64 may have a capacity for storing a single-line of digital pixel signals outputted from the line senor 44 or may have a capacity for storing a single-frame of digital pixel signals obtained by a completion of the scanning operation.

The pixel signals outputted from the memory 64 through the image processing circuit 63 may be optionally recorded on, for example, a second recording medium such as an IC memory card, a floppy disk, a detachable hard disk or the like, held in an image recording device 67 therefor. In particular, the image recording device 67 is driven and controlled by a recording device control circuit 66 which is operated in accordance with a command signal outputted from the system control circuit 20. The pixel signals are once inputted into the recording device control circuit 66 so as to be subjected to a given processing such as an image-compression processing and a format-conversion processing therein, and the processed pixel signals are written in the second recording medium held in the image recording device 67.

Also, the pixel signals may be transferred to an external image processing device such as a personal computer 81. In this case, the output-terminal connector 17a is connected to an interface connector 81a joined to an end of a cable extending from the personal computer 81. The pixel signals obtained from the memory 64 are inputted into an interface circuit 65 through the image processing circuit 63, and are subjected to a given processing such as a format-conversion processing and so on. Then, the pixel signals are outputted to the computer 81 through the connectors 17a and 81a. The pixel signals transferred to the computer 81 may be processed in various manners, and may be reproduced on a monitor associated therewith.

Further, the pixel signals may be transferred to an external TV monitor 82, such as a liquid crystal type monitor. In this case, the output-terminal connector 17b is connected to an interface connector 82a joined to an end of a cable extended from the TV monitor 82. The pixel signals obtained from the memory 64 are inputted to an video-signal outputting circuit 74 through the image processing circuit 63, and are processed to thereby produce a video signal. Namely, the video-signal outputting circuit 74 includes a video memory for temporarily storing the digital pixel signals, a digital-analog (D/A) converter for converting the digital pixel signals, outputted from the video memory at a given timing, into analog pixel signals, and an encoder for successively producing a video signal on the basis of the converted analog pixel signals. The produced video signal is outputted to the TV monitor 82 through the connectors 17b and 82a, and the photographed image is reproduced on the TV monitor 82 on the basis of the video signal.

Figure 25:
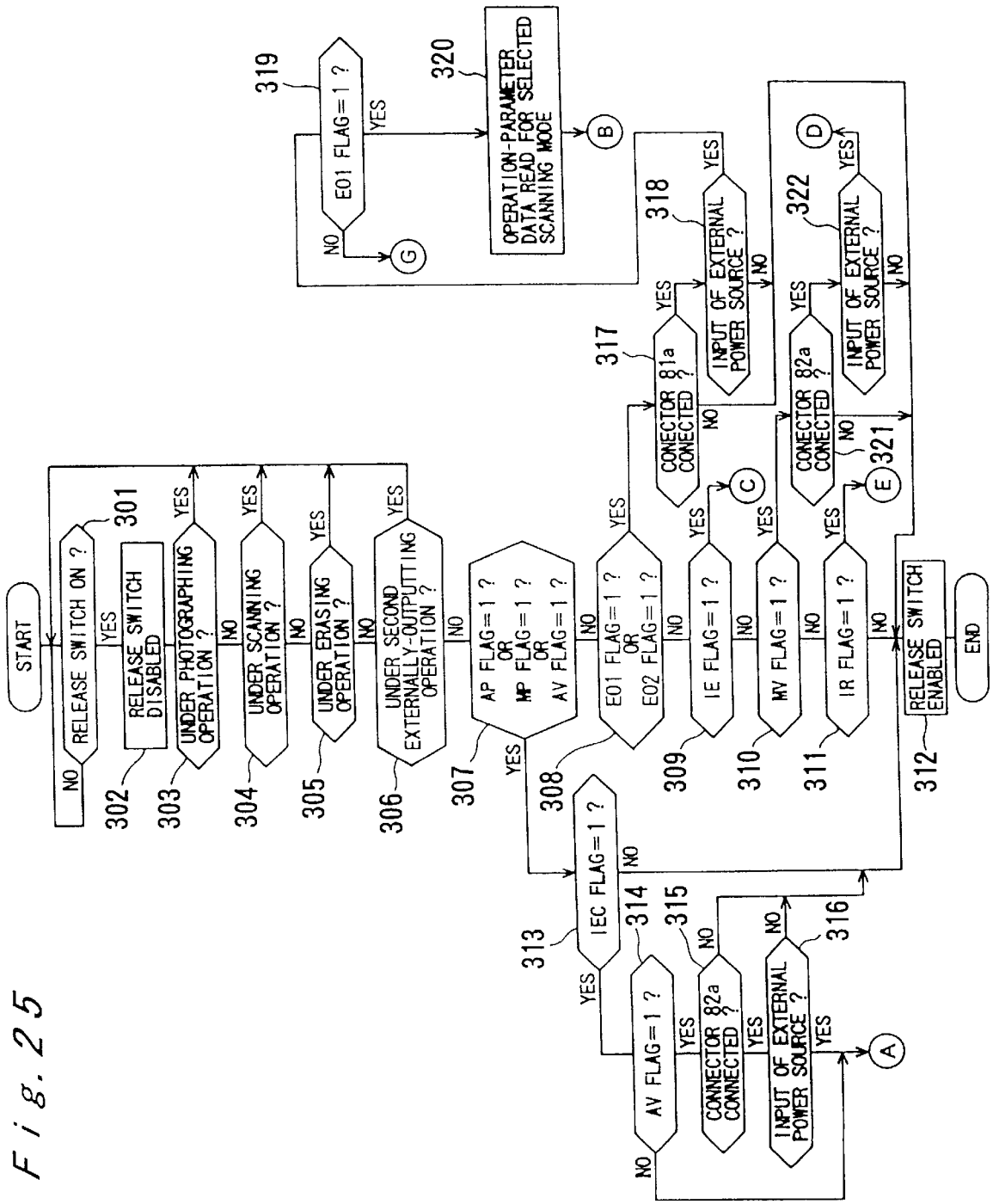
FIG. 25 is a part of a flowchart for explaining a whole operation of the electronic still video camera shown in FIG. 6.
Figure 26:
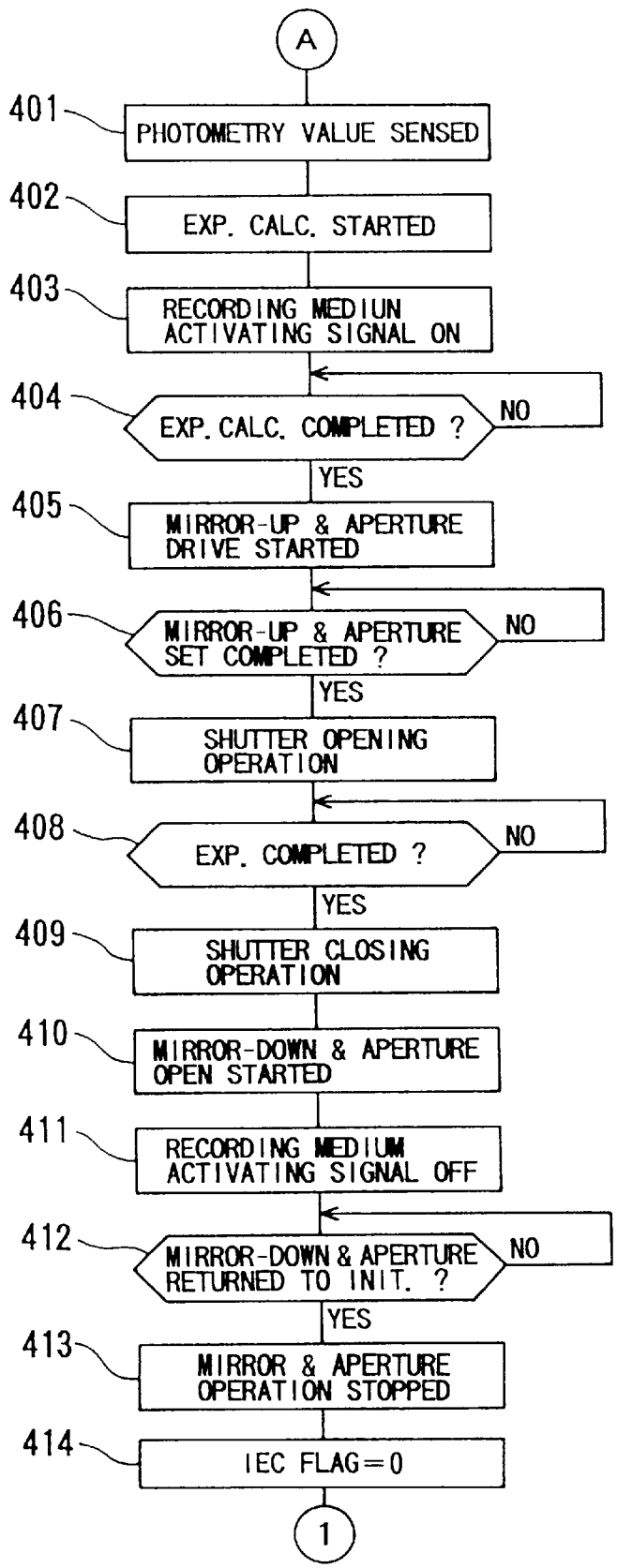
FIG. 26 is another part of the flowchart for explaining the whole operation of the electronic still video camera shown in FIG. 6.

As mentioned above, the camera is provided with the printer, indicated by reference 406 in FIG. 25 by which the photographed image may be recorded reproduced on a suitable paper on the basis of the pixel signals obtained from the memory 64. In particular the pixel signals obtained from the memory 64 are inputted into a printing data generator 405 through the image processing circuit 63, and are processed to thereby produce printing data. Then, the printing data is successively outputted to the printer 406. Note, the printing data generator 405 and the printer 406 are operated and controlled by the system control circuit 20.

When the pixel signals read from the line sensor 44 are directly recorded on the second recording medium (such as an IC memory card, a floppy disk, a detachable hard disk or the like) held in the image recording device 67, the pixel signals may be read out of the second recording medium, if necessary, and then may be transferred to the computer 81, the TV monitor 82 or the printer 406.

In FIG. 2, reference 72 indicates a connector-connection detecting circuit which is provided to detect a connection of the respective cable connectors 81a and/or 82a to the connectors 17a and/or 17b, and reference 77 indicates a main power source circuit which may be constituted so as to to detect an output voltage level of an internal battery provided in the camera body 11, and an input or connection of an external power source (not shown), such as an AC power adaptor, a detachable additional battery power pack or the like.

Also, in FIG. 2, reference 75 indicates a thermal erasing device which is provided to thermally erase an image recorded in the electro-developing recording medium 20 therefrom, and is incorporated in the scanning mechanism 50. The thermal erasing device 75 is energized by an erasing control circuit 76 which is controlled in accordance with a command signal outputted from the system control circuit 20.

As shown in FIG. 2, the release switch 14 and the operation mode selection switch 18 are connected to the system control circuit 20. The operation mode selection switch 18 is constituted as a rotary type switch such that one of various operation modes can be selected by manually turning the operation mode selection switch 18. When one of the various operation modes is selected by the switch 18, a flag corresponding to the selected operation mode is set to be "1", and the other flags corresponding to the non-selected operation modes are kept at "0". In this situation, when the release switch 14 is depressed and turned ON the camera executes an operation in the selected mode.

Also, the scanning mode selection switch 19 is connected to the system control circuit 20, and is constituted as a rotary type switch, such that one of various scanning modes can be selected by manually turning the scanning mode selection switch 19. When one of the scanning modes is selected by the switch 19, the scanning operation is carried out in the selected mode in which a given number of horizontal-scanning lines is defined, with each of the horizontal-scanning lines including a given number of pixel signals. Namely, a scanning pitch is selected by the scanning mode selection switch 19, and the electro-developing recording medium 30 is intermittently moved according to the selected scanning pitch during the scanning operation.

Further, the printing mode selection switch 401 is also connected to the system control circuit 20 and comprises a push type switch. Whenever the printing mode selection switch 401 is depressed, the setting of a printing operation enabling flag is changed. Namely, when the setting of the printing operation enabling flag is "1", this flag is reset to be "0" by depressing the switch 401, and, when the setting of the printing operation enabling flag is "0" this flag is set to be "1" by depressing the switch 401. When the setting of the printing operation enabling flag is "1", a printing operation is possible, but, when the setting of the printing operation enabling flag is "0", a printing operation is impossible.

The display device 68 is connected to the system control circuit 20 to display various setting conditions of the still video camera and messages necessary to operate the camera, as mentioned above. Also, the electronic flash, indicated by reference 13 in FIG. 2, is connected to the system control circuit 20 through an electronic flash drive circuit 69 to control a flashing operation of the electronic flash 13.

Figure 3:
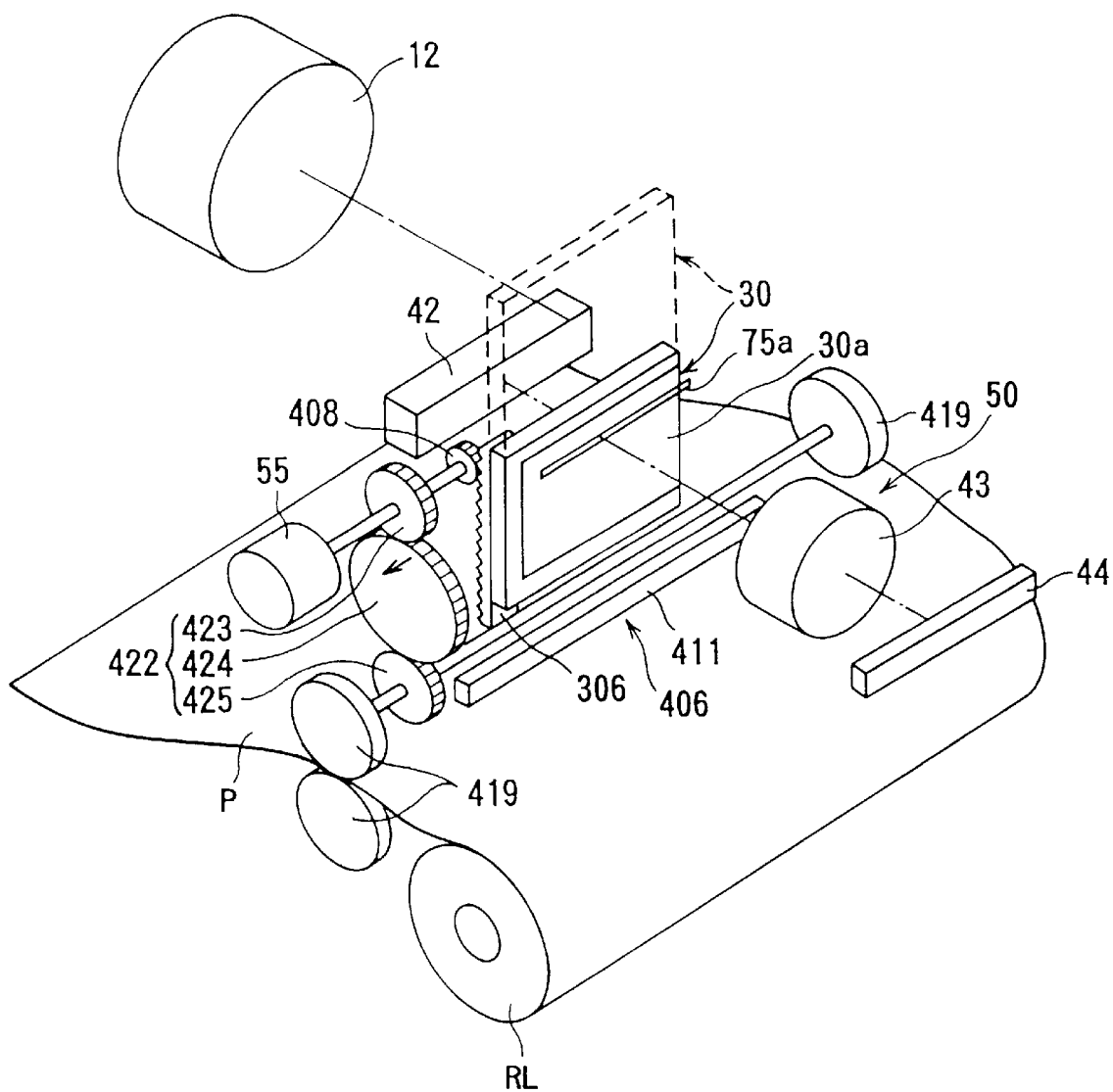
FIG. 3 is a schematic perspective view showing a scanning mechanism and a printer used in the electronic still video camera shown in FIGS. 1 and 2.

FIG. 3 shows an arrangement of the electro-developing recording medium 30, the scanning mechanism 50, and the printer 406.

As is apparent from FIG. 3, the drive mechanism for carrying out the movement of the electro-developing recording medium 30 includes a rack 306 fixed to a lateral side of the electro-developing recording medium 30, and a pinion 408 engaged with the rack 306 and securely mounted on a shaft of a scan drive motor 55 such as a stepping motor, a servo-motor or the like. Thus, by driving the motor 55, the electro-developing recording medium 30 is moved between the upper position (shown by a broken line) and the lower position (shown by a solid line). When the electro-developing recording medium 30 is positioned at the upper position, an image area 30a thereof is aligned with the photographing optical system 12, whereby an optical image is properly focussed and formed on the image area 30a by the photographing optical system 12.

As mentioned above, the scanning mechanism 50 includes the light source 42, the scanner optical system 43, and the line sensor 44 aligned with each other and supported by the frame member (not shown in FIG. 3), and are arranged so as to be removed from an optical path defined by the photographing path. During the scanning operation, the electro-developing recording medium 30 is intermittently moved from the upper position toward the lower position such that the image area 30a thereof is scanned with parallel light beams emitted from a linear light emitting surface of the light source 42, and the parallel light beams passing through the image area 30a are focussed on the linear light receiving surface of the line sensor 44 by the scanning optical system 43.

The printer 406 is provided below the scanning mechanism 50, and is constituted as a thermal line dot-printer. The printer 406 includes a thermal printing head 411, and a pair of paper feeder roller assemblies each including a pair of rubber rollers 419, 419 for drawing a printing paper web P out of a roll of printing paper RL and for feeding the same to the thermal printing head 411. Note, the printing paper may be a heat sensitive paper. One of the paper feeder roller assemblies, namely, the upper paper feeder assembly, is driven by the scan drive motor 55 through a gear train 422.

In particular, the gear train 422 includes a gear 423 securely mounted on the shaft of the motor 55, a movable middle gear 424 engaged with the gear 423, and a gear 425 engaged with movable middle gear 424 and securely mounted on a shaft of the upper paper feeder roller assembly. The movable middle gear 424 forms a part of an electro-magnetic clutch 426 (FIG. 2) operated by the system control circuit 20. When the electromagnetic clutch 426 is turned ON, the movable middle gear 424 is engaged with the gears 423 and 425, as shown in FIG. 3, but, when the electro-magnetic clutch 426 is turned OFF, the movable middle gear 424 is removed in the direction indicated by an arrow shown in FIG. 3, and is thus disengaged from the gears 423 and 425.

Only during an operation of the printer 406 is the electro-magnetic clutch 426 turned ON, and thus, the movable middle gear 424 is engaged with the gears 423 and 425. Also, whenever a horizontal-scanning line of pixel signals is read from the line sensor 44, printing is turned on to move the paper web P past the thermal printing head 411 on the basis of the horizontal-scanning line of pixel signals. Preferably, the thermal printing head has a dot-pitch which is twice the pixel-pitch of the line sensor 44, and the feeding-pitch of the paper web P is also twice the scanning pitch by which the electro-developing recording medium 30 is intermittently moved during the scanning operation. In this case, an image recorded on the electro-developing recording medium 30 is printed and reproduced on the paper web P by a magnifying power of 2. In other words, an area of the printed and reproduced image is four times as large as that of the image recorded on the electro-developing recording medium.

The thermal erasing device 75 (FIG. 2) includes an electric linear heater element 75a, and the heater element 75a is attached to the frame member by which the light source 42, the scanning optical system 43, and the line sensor 44 are supported. The heater element 75a is arranged to be close to a path along which the electro-developing recording medium 30 is moved, as if the image area 30a thereof is swept by the heater element 75a.

Figure 4:
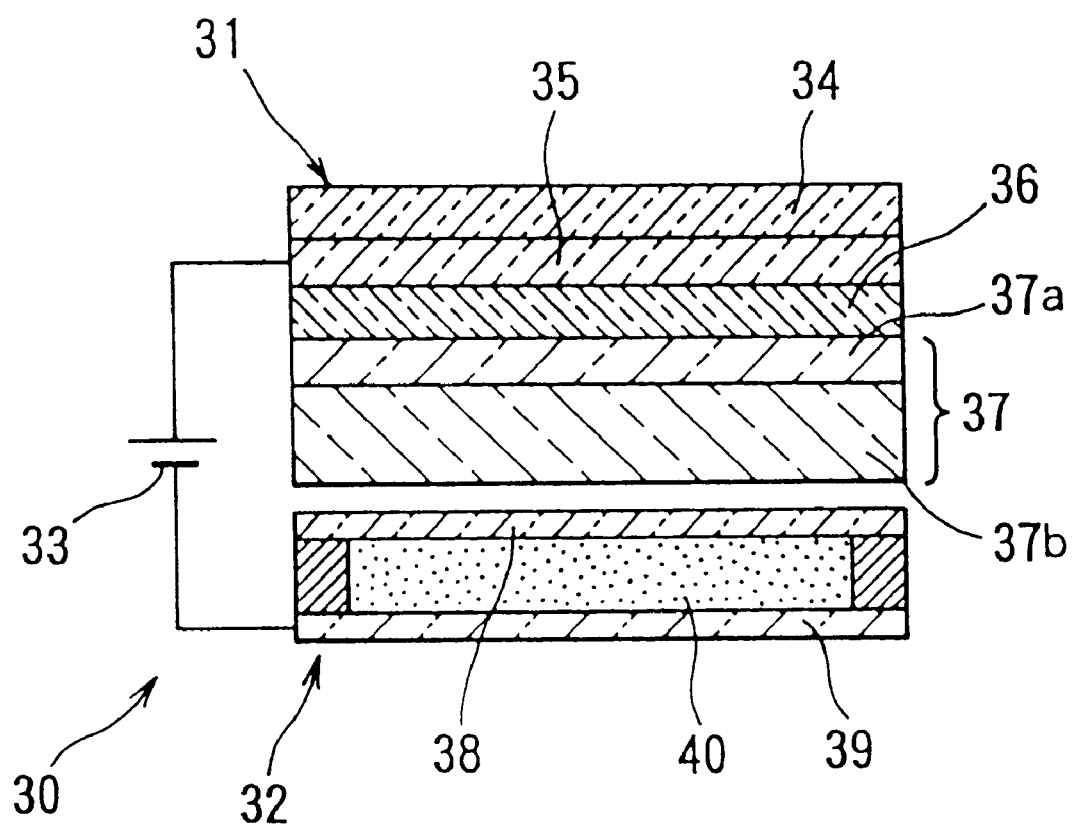
FIG. 4 is a schematic sectional view showing an electro-developing recording medium used in the electronic still video camera shown in FIGS. 1 and 2.

FIG. 4 shows a structure of the electro-developing recording medium 30, which is identical with that disclosed in Japanese Unexamined Patent Publication No. 5-2280 and U.S. Pat. No. 5,424,156, the disclosures of which are expressly incorporated herein by reference in their entirety.

The electro-developing recording medium 30 comprises an electrostatic information recording medium 31 and an electric charge keeping medium 32. Voltage is applied therebetween by an electric power source 33, illustrated symbolically in FIG. 4. The electric power source 3S corresponds to the recording medium drive circuit 41. A recording medium activating signal (a voltage signal) is applied from the recording medium drive circuit 41 (i.e., the electric power source 33) to the electro-developing recording medium 30 during the photographing operation.

The electrostatic information recording medium 31 is formed by laminating a base plate 34, an electrode layer 35, an inorganic oxide material layer 36 and a photoconducting layer 37. The photoconducting layer 37 is formed by laminating an electric charge generating layer 37a and an electric charge transferring layer 37b. The electric charge keeping medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween. Note, as is apparent from FIG. 4, the whole structure of the electro-developing recording medium 30 is transparent.

When the electric power source 33 is turned ON, or when the recording medium drive circuit 41 is energized, a voltage signal or recording medium activating signal is applied between the electrostatic information recording medium 31 and the electric charge keeping medium 32, i.e., between the electrode layer 35 and the liquid crystal electrode layer 39. When an optical image is formed on the electrostatic information recording medium 31 by the photographing optical system 12 during the application of the voltage signal, an electric charge distribution is produced over the electrostatic information recording medium 31 in accordance with a light intensity distribution of the optical image formed thereon, so that the intensity of an electric field acts on the liquid crystal 40 of the electric charge keeping medium 32 in accordance with the electric charge distribution. Thus, an image derived from the optical image is reproduced in the liquid crystal 40 as a visible image. Namely, as soon as the optical image is formed on the electrostatic information recording medium 31, the image is developed in the electric charge keeping medium 32.

In this embodiments since the electric charge keeping medium 32 comprises a memory type liquid crystal display, the developed visible image can be kept therein even if the electric field is eliminated from the electro-developing recording medium 30. In the memory type liquid crystal displays the developed image can be erased by heating it to a given temperature, using the electric heater element 75a of the thermal erasing device 75. In this case, the same electro-developing recording medium 30 can be repeatedly used for photographing.

Figure 5:
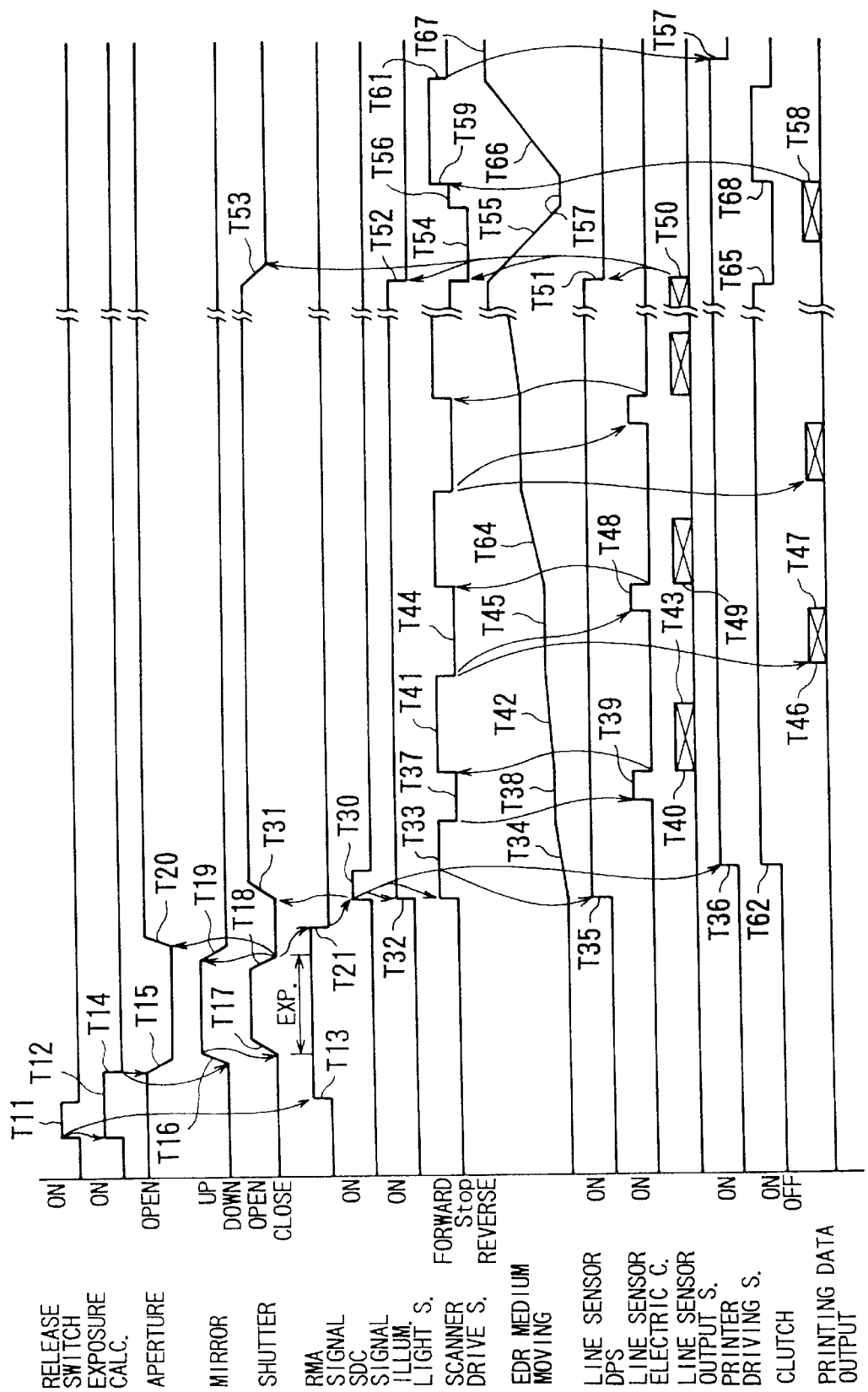
FIG. 5 is a timing chart for explaining a whole operation of the electronic still video camera shown in FIGS. 1 and 2.

FIG. 5 shows a timing chart for explaining various operations of the camera.

For example, when an auto-printing mode is selected by the operation mode selection switch 18, and when the printing operation enabling flag is set to be "1", an operation is executed in the auto-printing mode by depressing and turning the release switch 14 ON. In the auto-printing mode, first, a photographing operation is executed to record and develop an optical image on the electro-developing recording medium 30. Then, a scanning operation is executed to electronically read pixel signals from the recorded and developed image of the electro-developing recording medium 30, and a printing operation is simultaneously executed on the basis of the read pixel signals.

In particular, when the release switch 14 has been turned ON, a command signal for executing the photographing operation is made ON (reference "T11" in FIG. 5), and is inputted to the system control circuit 20. Then, an output signal of the photometry sensor 28, i.e., a photometry value, is sensed and fetched by the system control circuit 20, and an exposure calculation is started based on the fetched photometry value (reference "T12" in FIG. 5).

After a predetermined period of time has elapsed from the ON operation of the release switch 14, a recording medium activating signal outputted from the recording medium drive circuit 41 to the electro developing recording medium 30 is made ON (reference "T13" in FIG. 5). Namely, the recording medium activating signal is changed from a low level to a high level, so that the activating voltage is applied between the electrostatic information recording medium 31 and the electric charge keeping medium 32.

When the exposure calculation has been completed (reference "T14" in FIG. 5), the procedures necessary for the photographing operation are subsequently carried out on the basis of the calculated result. Namely, an opening area of the aperture 12a is adjusted in accordance with the calculated result. Note, since the aperture 12a initially has a fully-open area, the adjustment of the aperture 12a is usually carried out such that the fully-open area thereof is made small (reference "T15" in FIG. 5). On the other hand, the quick return mirror 21 is changed from the down-position to the up-position (reference "T16" in FIG. 5).

When the quick return mirror 21 has been changed from the down-position to the up-position, and when the adjustment of the aperture 12a has been completed, the shutter 22 is opened (reference "T17" in FIG. 5), whereby an optical image is focussed and formed on the electro-developing recording medium 30. When an exposure period of time, which is designated by the calculated result, has elapsed, i.e., when the exposure has been completed, the shutter 22 is closed (reference "T18" in FIG. 5). After the closing of the shutter 22 is completed, the quick return mirror 21 is returned from the up-position to the down-position (reference "T19" in FIG. 5), and the opening area of the aperture 12a is returned to the fully-open area (reference "T20" in FIG. 5). Then, the output voltage of the recording medium activating signal is made OFF (reference "T21" in FIG. 5), i.e., the recording medium activating signal is returned from the high level to the low level.

The output of the recording medium activating signal to the electro-developing recording medium 30 is kept ON at least during the period of time during which the shutter 22 is opened whereby recording and development of the optical image can be carried out in the electro-developing recording medium 30. As mentioned above, the electric charge keeping medium 32 of the electro-developing recording medium 30 comprises a memory type liquid crystal display, and thus, the developed image can be held therein even if the output of the recording medium activating signal is stopped.

When the quick return mirror 21 has moved to the initial position or down-position, and when the opening area of the aperture 12a has returned to the initial area or fully-open area, the driving of the quick return mirror 21 and the aperture 12a are stopped. Thus, the recording and development of the optical image on the electro-developing recording medium 30, i.e., the photographing operation is completed. In the operation as mentioned above, the recording medium activating signal may be outputted just before the exposure is started, i.e., just before the shutter 22 is opened, if necessary.

When a predetermined period of time has elapsed after the output voltage of the recording medium activating signal is turned OFF, a scanner drive command signal for executing the scanning operation is turned ON (reference "T30" in FIG. 5). Then, the shutter 22 is opened (reference "T31" in FIG. 5); the light source 42 is turned ON (reference "T32" in FIG. 5); and a line sensor drive power source included in the line sensor drive circuit 47 is turned ON (reference "T35" in FIG. 5), so that the line sensor 44 is energized.

Also, when the scanner drive command signal is turned ON, the electromagnetic clutch 401 is turned ON (reference "T62" in FIG. 5), so that the movable middle gear 424 comes into engagement with the gears 423 and 425. At the same times a scanner drive signal outputted from the system control circuit 20 to the scanner drive circuit 46 is changed from the zero level to the positive level (reference "T33" in FIG. 5), so that the scan drive motor 55 is driven in a forward direction due to the drive pulses outputted from the scanner drive circuit 46 thereto, whereby the electro-developing recording medium 30 is moved from the upper position towards an image-reading start position (reference "T34" in FIG. 5). During the movement of the electro-developing recording medium 30 toward the image-reading start position, the paper web P is drawn out of the roll of printing paper due to the turn-ON of the electro-magnetic clutch 401.

When a predetermined period of time has elapsed after the scanning drive command signal is turned ON, a printer driving signal outputted from the system control circuit 20 to the printing data generator 405 and the printer 406 is turned ON (reference "T36" in FIG. 5). When the electro-developing recording medium 30 reaches the image-reading start position, i.e., when the image sensor 44 is relatively positioned at the image-reading start position with respect to the electro-developing recording medium 30, the scanner drive signal outputted from the system control circuit 20 to the scanner drive circuit 46 is returned from the positive level to the zero level (reference "T37" in FIG. 5), and thus, the output of the drive pulses from the scanner drive circuit 46 to the scan drive motor 55 is interrupted to thereby stop the scan drive motor 55, whereby the electro-developing recording medium 30 is held at the image-reading start position (reference "T38" in FIG. 5). Note, the standing still of the electro-developing recording medium 30 at the image-reading start position may be controlled by, for example, counting the driving pulses outputted from the scanner drive circuit 46 to the scan drive motor 55 in the system control circuit 20. Note, at this stage, the paper web is moved in synchronization with the movement of the electro-developing recording medium 30 due to the turn-ON of the electro-magnetic clutch (reference "T36" in FIG. 5).

Thus, an exposure of the line sensor 44 is started by the illumination of the light source 42, and thus an electric charge accumulation in the line sensor 44 is performed (reference "T39" in FIG. 5). When the electric charge accumulation in the line sensor 44 has been completed a reading-scan of pixel signals (included in a first horizontal-scanning line) from the line sensor 44 is started by the line sensor drive circuit (reference "T40" in FIG. 5). At the same time, the scanner drive signal outputted from the system control circuit 20 to the scanner drive circuit 46 is changed from the zero level to the positive level (reference "T41" in FIG. 5), so that the scan drive motor 55 is driven in the forward direction due to the drive pulses outputted from the scanner drive circuit 46 thereto, whereby the electro-developing recording medium 30 is moved downward towards a next image-reading position (reference "T42" in FIG. 5).

During the movement of the electro-developing recording medium 30, the reading-scan of pixel signals (included in the first horizontal scanning line) from the line sensor 44 has been completed (reference "T43" in FIG. 5). Note that the completion of the reading-scan can be known by, for examples counting reading-clock pulses outputted from the line sensor drive circuit 47 to drive the line sensor 44. The read pixel signals in the first horizontal scanning line are successively converted into digital pixel signals by the A/D converter 62, and are temporarily stored in the memory 64. The digital pixel signals included in the first horizontal-scanning line are outputted from the memory 64 to the printing data generator 405, to thereby produce a horizontal-scanning line of printing data therein.

When the electro-developing recording medium 30 reaches the next image-reading positions the scanner drive signal outputted from the system control circuit 20 to the scanner drive circuit 46 is returned from the positive level to the zero level (reference "T44" in FIG. 5), and thus, the output of the drive pulses from the scanner drive circuit 46 to the scan drive motor 55 is interrupted to thereby stop the scan drive motor 55, whereby the electro-developing recording medium 30 is held at the next image-reading position (reference "T45" in FIG. 5), i.e., the line sensor 44 is relatively positioned at the next image-reading position with the electro-developing recording medium 30. Note, during the movement of the electro-developing recording medium 30 from the image-reading start position to the next image-reading position, the paper web P is drawn out of the roll of printing paper RL, and the paper web P is positioned at a printing start position when the medium 30 reaches the next image-reading position.

Then, the horizontal-scanning line of printing data is outputted from the printing data generator 405 to the thermal printing head 411 of the printer 40 (reference "T46" in FIG. 5), and printing is made on the printer web P on the basis of the horizontal-scanning line of printing data. On the other hand, at the next image-reading position, an exposure of the line sensor 44 is carried out by the illumination of the light source 42, and thus electric charge accumulation in the line sensor 44 is performed (reference "T48" in FIG. 5).

After the printing has been completed (reference "T47" in FIG. 5), and after the electric charge accumulation in the line sensor 44 has been completed, a reading-scan of pixel signals (included in a second horizontal-scanning line) from the line sensor 44 is started by the line sensor drive circuit (reference "T49" in FIG. 5). At the same time, the scanner drive signal outputted from the system control circuit 20 to the scanner drive circuit 46 is changed from the zero level to the positive level, so that the scan drive motor 55 is driven in the forward direction due to the drive pulses outputted from the scanner drive circuit 46 thereto, whereby the electro-developing recording medium 30 is moved downward towards a further next image-reading position (reference "T64" in FIG. 5).

The same operation as mentioned above is repeated until the whole of the developed image has been completely read, i.e., until the reading-scans have been completed on all of the horizontal-scanning lines defined by intervals of the intermittent movements of the electro-developing recording medium 30. The completion of the reading-scans on all of the horizontal-scanning lines can be determined by, for example, counting the drive pulses outputted from the scanner drive circuit 46. In this first embodiment, all of the horizontal-scanning lines may be a number of about 3,072.

When the reading-scan of pixel signals (included in the last horizontal-scanning line) from the line sensor 44 has been completed (reference "T50" in FIG. 6), the electro-magnetic clutch 426 is turned OFF (reference "T65" in FIG. 5), so that the movable middle gear 424 is disengaged from the gears 423 and 425. Then, the line sensor drive power source included in the line sensor drive circuit 47 is turned OFF (reference "T51" in FIG. 5); the light source 42 is turned OFF (reference "T52" in FIG. 5); and the shutter 22 is closed (reference "T53" in FIG. 5). Subsequently, the scanner drive signal outputted from the system control circuit 20 to the scanner drive circuit 46 is changed from the zero level to the negative level (reference "T54" in FIG. 5), so that the scan drive motor 55 is driven in a reverse direction due to the drive pulses outputted from the scanner drive circuit 46 thereto, whereby the electro-developing recording medium 30 is moved upward towards the upper position or initial position (reference "T55" in FIG. 5). At this stage, the paper web P is not prevented from being rolled up in the roll of printing paper RL due to the disengagement of the movable gear 424 from the gears 423 and 425.

When the electro-developing recording medium 30 reaches the upper or initial position, the scanner drive signal outputted from the system control circuit 20 to the scanner drive circuit 46 is returned from the negative level to the zero level (reference "T56" in FIG. 5), and thus, the output of the drive pulses from the scanner drive circuit 46 to the scan drive motor 55 is stopped, i.e., the scan drive motor 55 is stopped (reference "T57" in FIG. 5), whereby the electro-developing recording medium 30 is held at the upper or initial position thereof. The standing still of the electro-developing recording medium 30 at the initial position may be known by detecting a part of the medium 30 with, for example, a photo-interrupter type detector (not shown).

When the last printing has been made on the paper web P on the last horizontal-scanning line of printing data (reference "T58" in FIG. 5), the electro-magnetic clutch is turned ON (reference "T68" in FIG. 5), and the scanner drive signal outputted from the system control circuit 20 to the scanner drive circuit 46 is changed from the zero level to the positive level (reference "T59" in FIG. 5), so that the scan drive motor 55 is driven in the forward direction due to the drive pulses outputted from the scanner drive circuit 46 thereto, whereby the electro-developing recording medium 30 is moved from the upper or initial position toward the lower position (reference "T66" in FIG. 5). At the same time, the paper web P is drawn out of the roll of printing paper RL, and the printed section thereof is discharged from the discharge port formed in the front face of the camera body 11.

When the electro-developing recording medium 30 reaches the lower position (reference "T67" in FIG. 5) the scanner drive signal outputted from the system control circuit 20 to the scanner drive circuit 46 is returned from the positive level to the zero level (reference "T61" in FIG. 5), and thus, the output of the drive pulses from the scanner drive circuit 46 to the scan drive motor 55 is stopped, i.e., the scan drive motor 55 is stopped. Then, the electromagnetic clutch 426 is turned OFF (reference "T69" in FIG. 5), so that the movable middle gear 424 is disengaged from the gears 423 and 425. Thereafter, the printer drive signal outputted from the system control circuit 20 to the printing data generator 405 and the printer 406 is turned OFF (reference "TS7" in FIG. 5). Note, although not shown in the timing chart of FIG. 5, the electro-developing recording medium 30 is moved from the lower position to the upper or initial position after the printed paper section is discharged. Note, after the discharging of the printed paper section, the electro-magnetic clutch 426 is turned OFF, and the electro-developing recording medium 30 is returned to the upper or intial position.

In the auto-printing mode as mentioned above, the pixel signals obtained from the memory 64 may be stored in the second recording medium (such as an IC memory card, a floppy disk a detachable hard disk or the like) held in the image recording device 67.

In the case where the printing operation enabling flag is reset to "0" in the auto-printing mode as mentioned above, an execution of the printing operation can be prevented regardless of the selection of the auto-printing mode (ie., the electro-magnetic clutch 426 is kept OFF).

When the electro-developing recording medium 30 has an image recorded and developed thereon, a manual printing mode may be selected by the operation mode selection switch 18. In the manual printing mode, the scanning operation is executed to successively read a horizontal scanning line of pixel signals from the recorded and developed image of the medium 30 by the line sensor 44, and the printing operation is executed to successively make a printing on the paper web P on the basis of a horizontal-scanning line of printing data produced from the read pixel signals. If the printing operation enabling flag is reset to be "0" in the manual printing mode, an execution of the printing operation is prevented. In this case, a suitable massage for warning of the impossibility of the printing operation may be displayed on the display panel 68.

When an operation mode for transferring the pixel signals from the camera to the external device, such as the computer 81, the TV monitor 81, or the like is selected by the operation mode selection switch 18, a connection between the interface connector (81a, 82a) and the output terminal connector (17a, 17b) is detected by the connector-connection detecting circuit 72 before an execution of operation in the selected mode. If the connection between the interface connector (81a, 82a) and the output terminal connector (17a, 17b) is not detected, the execution of operation in the selected mode is prevented. Further, before the execution of operation in the selected mode, the main power source circuit 77 may detect an external power source, such as an AC power adaptor, a detachable additional battery power pack or the like.

Figure 6:
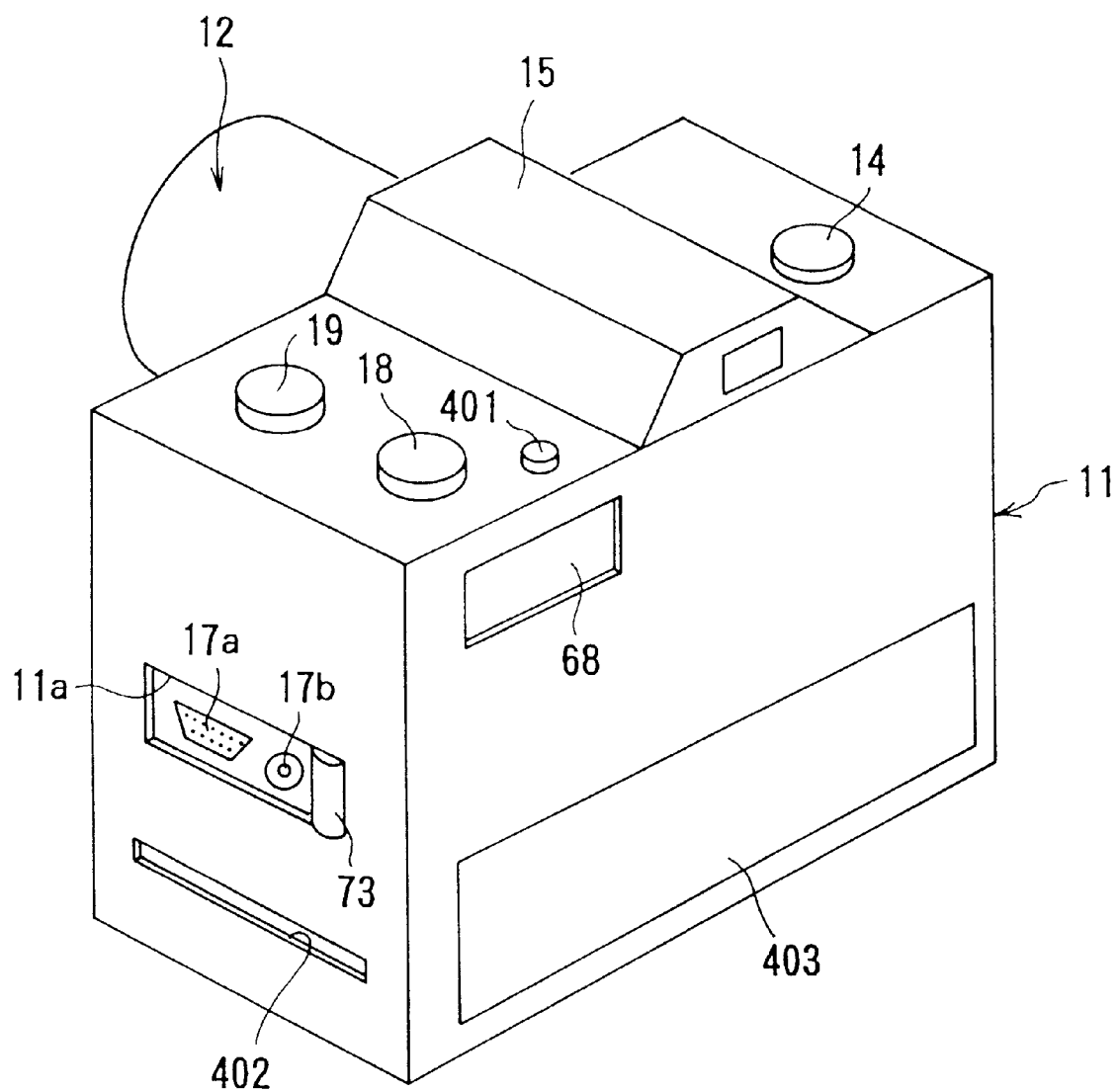
FIG. 6 is a schematic perspective view showing an appearance of a second embodiment of an electronic still video camera according to the present invention.
Figure 7:
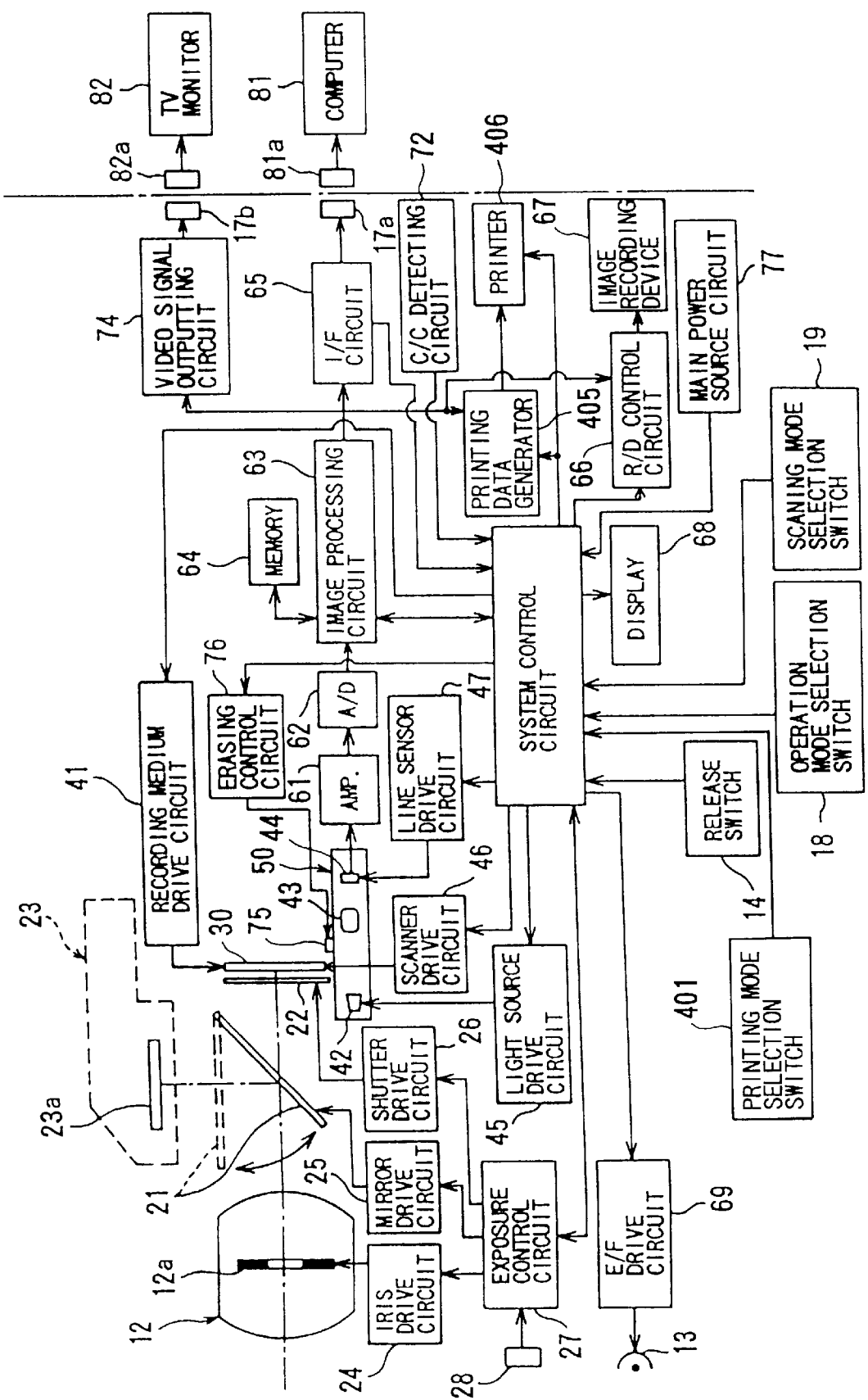
FIG. 7 is a block diagram of the electronic still video camera shown in FIG. 6.

FIG. 6 shows a second embodiment of an electronic still video camera according to the present invention, and FIG. 7 shows a block diagram of the electronic still video camera of FIG. 6. In these drawings, the same references as in FIGS. 1 and 2 represent the same elements, and the same electro-developing recording medium 30 as shown in FIG. 4 may be used in the second embodiment.

In the second embodiment, the camera is characterized in that a photographed image is printed and reproduced as a full color image, and the full color image is printed on a cut sheet paper. Namely, the printer 406 comprises a color printer. As shown in FIG. 6, a discharge port 402 for discharging a printed cut sheet paper is formed in a side wall of the camera body. A stack of cut sheet paper and/or a roll of color ink ribbon are inserted through the opening which is usually closed by the removable lid 403. As is apparent from FIG. 7, the electro-magnetic clutch 426 (FIG. 2) is eliminated from the block diagram, because the color printer 406 per se is provided with a drive motor for feeding the cut sheet paper. Also, in the second embodiment, the memory 64 has a capacity for storing at least three scanning lines of pixel signals.

Figure 8:
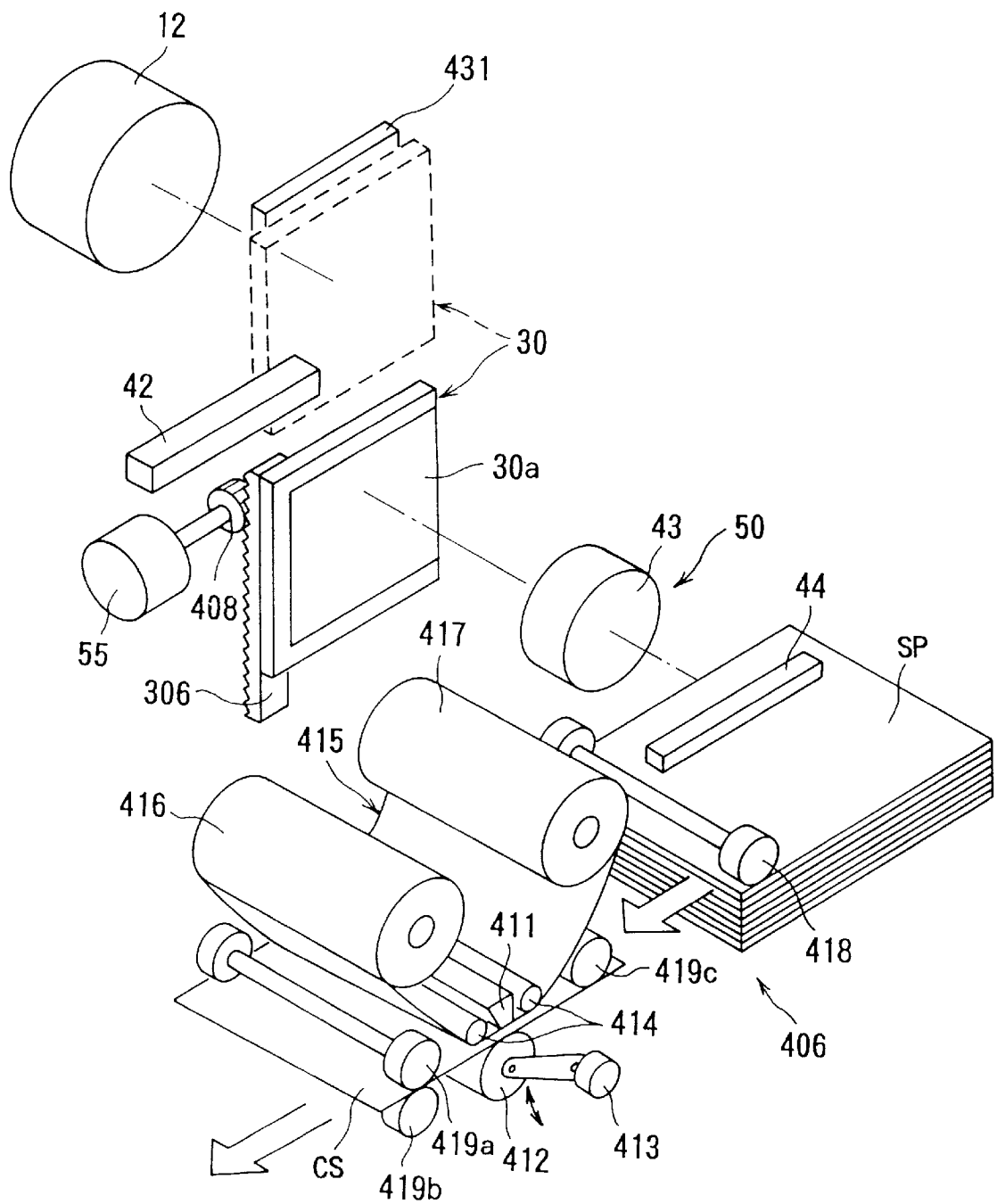
FIG. 8 is a schematic perspective view showing a scanning mechanism and a printer used in the electronic still video camera shown in FIGS. 6 and 7.

FIG. 8 shows an arrangement of the electro-developing recording medium 30, the scanning mechanism 50, and the printer 406 used in the second embodiment of the invention.

Similar to the first embodiment, the electro-developing recording medium 30 is moved between the upper or initial position (shown by a broken line) and the lower position (shown by a solid line). A color filter 431 is disposed adjacent to the upper or initial position. When the electro-developing recording medium 30 is positioned at the upper or intial position, the image area 30a thereof is aligned with the photographing optical system 12, and is substantially registered with the color filter 431.

Figure 9:
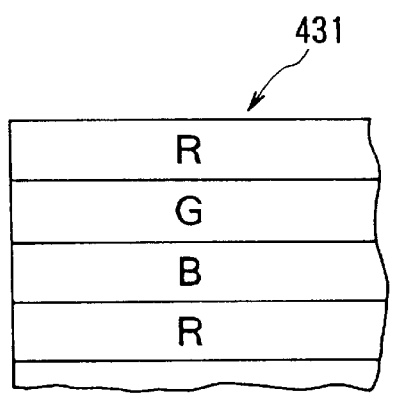
FIG. 9 is a schematic view enlargedly showing a part of a regular arrangement of different color filter elements of a color filter shown in FIG. 8.

As shown in FIG. 9, the color filter 431 comprises a stripe type three-primary-color filter including a plurality of three different color filter elements corresponding to red, green, and blue (indicated by R, G, and B) and these color filter elements R, G, and B are regularly arranged. Accordingly, when an optical image is focussed and formed on the image area 30a of the electro-developing recording medium 30 through the color filter 431 by the photographing optical system 12, and then is recorded and developed thereon, the recorded and developed image possesses color image information. In particular, a red image component of the optical image is recorded on stripe-like sections of the image area 30a corresponding to the red filter elements R; a green image component of the optical image is recorded on stripe-like sections of the image area 30a corresponding to the green filter elements G; and a blue image component of the optical image is recorded on stripe-like sections of the image area 30a corresponding to the blue filter elements B.

Note, although not shown in FIG. 8, the electric heat element 75a of the thermal erasing device 75 is provided in the same manner as shown in FIG. 3.

As shown in FIG. 8, the printer 406 is provided with a paper feeder station at which a stack of cut sheet paper SP is disposed and a cut sheet paper CS is fed from the stack of cut sheet paper SP by a paper feeder roller 418. Also, the printer 406 comprises: a thermal printing head 411; a movable platen 412 associated with the thermal printing head 411; a pair of pusher rollers 414, 414 disposed at the sides of the thermal printing head 414; a pair of feeder roller assemblies 419a, 419b disposed at the side of the thermal printing head 411 apart from the paper feeder station; and a feeder roller 419c disposed at side of the thermal printing head 411 near to the paper feeder station. The removable platen 412 is driven by a suitable actuator 413, such that it is rotated between an operative position at which the platen 412 is pressed against the printing head 411 and a removal position at which the platen 412 is spaced from the printing head 411.

During a printing operation, the platen 412 is positioned at the operative position, and is rotated to feed the cut sheet paper CS in a direction Indicated by an arrow in FIG. 8. The rotation of the platen 412 is carried out by a suitable drive motor (not shown), such as a stepping motor, a servo-motor or the likes and this drive motor is also used to drive the paper feeder roller 418; the feeder roller assemblies 419a, 419b; and the feeder roller 419c. Also, the drive motor can be reversely driven such that the cut sheet paper CS is returned towards the paper feeder station.

Further, the printer 406 is provided with a roll of heat-sensitive type color ink ribbon 417 disposed above the feeder roller 419c. An ink ribbon web 415 drawn out of the roll 417 is passed through the printing head 411 and the platen 413, and is wound up as a roll of used ink ribbon 416. The roll 416 is driven by the above-mentioned motor for driving the platen 412, and thus the ink ribbon web 415 is successively drawn out of the roll 417 in a manner as mentioned hereinafter.

Figure 10:
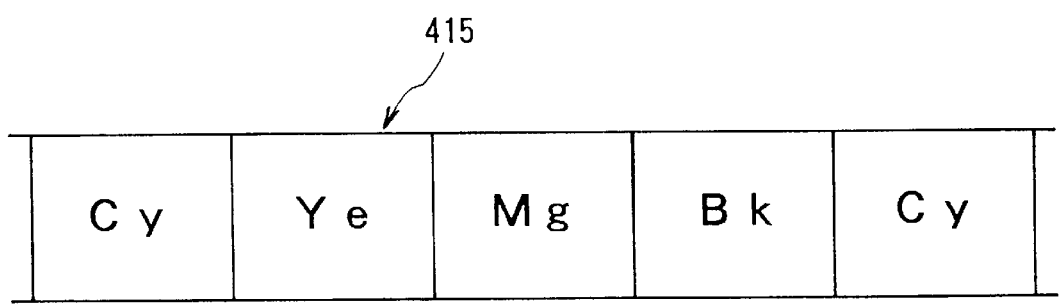
FIG. 10 is a schematic view enlargedly showing a part of an ink ribbon shown in FIG. 8.

As shown in FIG. 10, the ink ribbon web 415 includes a plurality of different color ink zones corresponding to cyan, yellow, magenta, and black indicated by Cy, Ye, Mg, and Bk, and the successive four color ink zones are regularly arranged. Each of the color ink zones has an area size corresponding to a printing area size of the cut sheet paper CS.

As shown In FIG. 7, similar to the first embodiment, the operation mode selection switch 18 is connected to the system control circuit 20, and inputs various commands thereto for making the camera execute various operations by merely depressing and turning ON the release switch 14. As shown in FIG. 112 eight indication marks are made around the operation mode selection switch 18 on the surface of the camera body 11, and are distinguished from each other by significant characters MP, AP, IR, EO1, EO2, AV, MV, and IE affixed thereto, respectively. The significant characters MP, AP, IR, EO1, EO2, AV, MV, and IE mean a manual-photographing mode (MP), an auto-photographing/recording mode (AP), an image-recording mode (IR), a first externally-outputting mode (EO1), a second externally-outputting mode (EO2), an auto-video-monitor mode (AV), a manual-video-monitor mode (MV), and an image-erasing mode (IE), respectively.

The operation mode selection switch 18 has an indicating protrusion 18a projected therefrom, and one of the eight operation modes is selected by matching the indicating protrusion 18a with the indication mark concerned. Whenever one of the operation modes is selected by the operation mode selection switch 18, the camera executes an operation in the selected mode by merely depressing and turning ON the release switch 14. Namely, only one of the operation modes is selected by the rotary type selection switch 18, and the operation is executed in the selected mode by the turn-ON of the release switch 14.

To this end, when the manual-photographing mode (MP) is selected, only an MP flag is set to be "1"; when the auto-photographing/recording mode (AP) is selected, only an AP flag is set to be "1"; when the image-recording mode (IR) is selected, only an IR flag is set to be "1"; when the first externally-outputting mode (EO1) is selected, only an EO1 flag is set to be "1"; when a second externally-outputting mode (EO2) is selected, only an EO2 flag is set to be "1"; when the auto-video-monitor mode (AV) is selected, only an AV flag is set to be "1"; when the manual-video-monitor mode (MV) is selected, only an MV flag is set to be "1"; and when the image-erasing mode (IE) is selected, only an IE flag is set to be "1".

Figure 11:
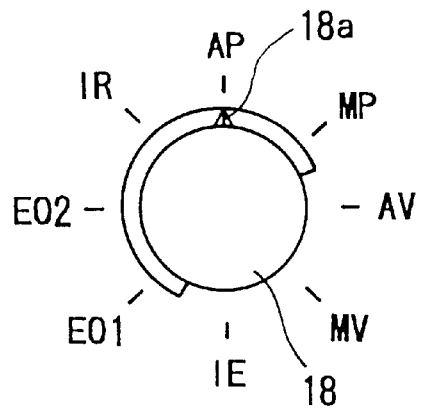
FIG. 11 is a schematic plan view showing an operation mode selection switch provided on a camera body of the electronic still video camera shown in FIG. 6.

When one of the manual-photographing mode (MP), the auto-photographing/recording mode (AP), the image-recording mode (IR), the first externally-outputting mode (EO1), and the second externally-outputting mode (EO2) is selected by the operation mode selection switch 18, a printing operation can be executed provided that a printing operation enabling (POE) flag Is set to be "1" by the printing mode selection switch 426. Note, in FIG. 11, a semi-circle strip zone 18b indicates a possibility of an execution of the printing operation if one of the characters MP, AP, IR, EO1, and EO2 covered by the semi-circle strip zone 18b is selected. On the contrary, when one of the auto-video-monitor mode (AV), the manual-video-monitor mode (MV), and the image-erasing mode (IE) is selected, the execution of the printing operation is prevented, and the printing operation enabling (POE) flag is forcibly reset to be "0" for the reasons mentioned hereinafter.

Figure 12:
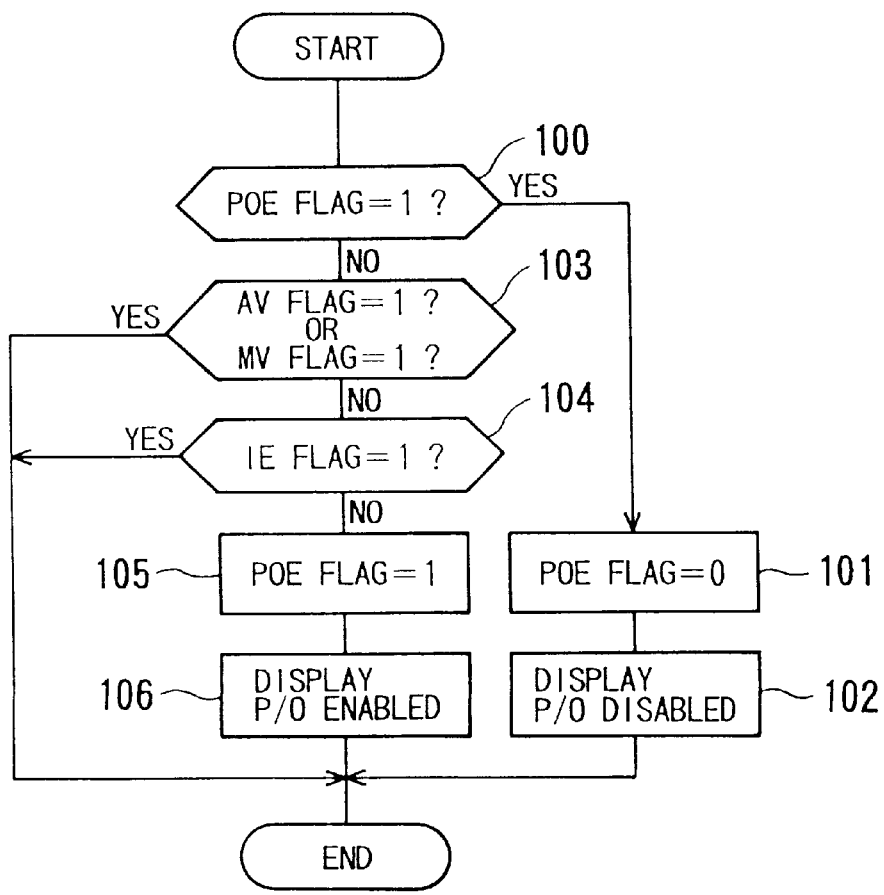
FIG. 12 is a flowchart for explaining a function of a printing mode selection switch provided on a camera body of the electronic still video camera shown in FIG. 6.

FIG. 12 shows a flow chart for explaining a routine for preventing the execution of the printing operation when selecting one of the auto-video-monitor mode (AV), the manual-video-monitor mode (MV), and the image-erasing mode (IE). This routine is executed whenever the printing mode selection switch 426 is depressed.

At step 100, it is determined whether the printing operation enabling (POE) flag is set to "1". If the POE flag=1, the control proceeds to step 101, in which the POE flag is reset to be "0". Then, at step 102, it is displayed on the display panel 68 that the printing operation is disabled.

At step 100, if the POE flag=0, the control proceeds to step 103, in which it is determined whether one of the auto-video-monitor mode (AV) flag or the manual-video-monitor mode (MV) flag is set to be "1". If one of the AV flag or the MV flag=1, this routine is ended.

At step 103, if both the AV and MV flags are reset to be "0", the control proceeds to step 104, in which it is determined whether the image-erasing mode (IE) is set to be "1". If the IE flag=1, this routine is ended.

At step 104, if the IE flag is reset to be "0", the control proceeds to step 105 in which the POE flag is set to be "1". Then, at step 106, it is displayed on the display panel 68 that the printing operation is enabled.

Accordingly, as long as one of the auto-video-monitor mode (AV), the manual-video-monitor mode (MV), and the image-erasing mode (IE) is selected, the execution of the printing operation is prevented.

Figure 13:
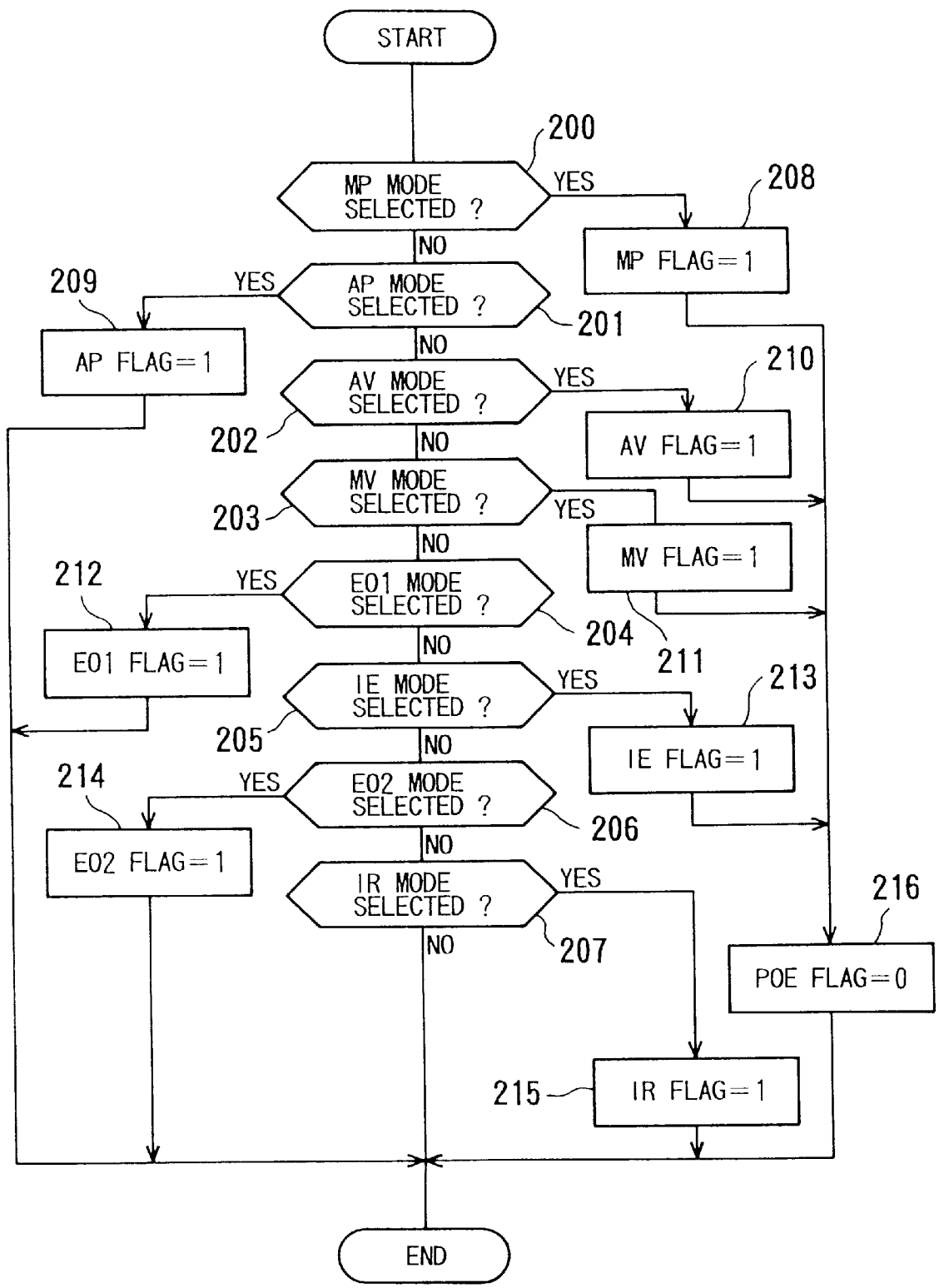
FIG. 13 is a flowchart for explaining a function of the operation mode selection switch shown in FIG. 11.

FIG. 13 shows a flowchart for explaining a routine executed whenever selecting one of the above-mentioned eight operation modes by the operation mode selection switch 18.

At step 200, it is determined whether or not the manual-photographing mode (MP) has been selected by the switch 18. If the selection of the MP mode is confirmed, the control proceeds to step 208, in which the MP flag is set to be "1". Then, at step 216, the printing operation enabling (POE) flag is reset to be "0", and the routine is ended.

At step 200, if the selection of the MP mode is not confirmed, the control proceeds to step 201, in which it is determined whether the auto-photographing/recording mode (AP) has been selected by the switch 18. If the selection of the AP mode is confirmed, the control proceeds to step 209, in which the AP flag is set to be "1". Then, the routine is ended.

At step 201, if the selection of the AP mode is not confirmed, the control proceeds to step 202, in which it is determined whether or not the auto-video-monitor mode (AV) has been selected by the switch 18. If the selection of the AV mode is confirmed, the control proceeds to step 210, in which the AV flag is set to be "1". Then, at step 216, the printing operation enabling (POE) flag is reset to be "0", and the routine is ended.

At step 202, if the selection of the AV mode is not confirmed, the control proceeds to step 203, in which it is determined whether the manual-video-monitor mode (MV) has been selected by the switch 18. If the selection of the MV mode is confirmed, the control proceeds to step 211, in which the MV flag is set to be "1". Then, at step 216, the printing operation enabling (POE) flag is reset to be "0", and the routine is ended.

At step 203, if the selection of the MV mode is not confirmed, the control proceeds to step 204, in which it is determined whether the first externally-outputting mode (EO1) has been selected by the switch 18. If the selection of the EO1 mode is confirmed, the control proceeds to step 212, in which the EO1 flag is set to be "1". Then, the routine is ended.

At step 204, if the selection of the EO1 mode is not confirmed, the control proceeds to step 205, in which it is determined whether the image-erasing mode (IE) has been selected by the switch 18. If the selection of the IE mode is confirmed, the control proceeds to step 213, in which the IE flag is set to be "1". Then, at step 216, the printing operation enabling (POE) flag is reset to be "0", the routine is ended.

At step 205, if the selection of the IE mode is not confirmed the control proceeds to step 206, in which it is determined whether the second externally-outputting mode (EO2) has been selected by the switch 18. If the selection of the EO2 mode is confirmed, the control proceeds to step 214, in which the EO2 flag is set to be "1". Then, the routine is ended.

At step 206, if the selection of the EO2 mode is not confirmed, the control proceeds to step 207, in which it is determined whether the image-recording mode (IR) has been selected by the switch 18. If the selection of the IR mode is confirmed, the control proceeds to step 215, in which the IR flag is set to be "1". Then, the routine is ended.

Thus, when one of the eight operation modes is selected, only the flag corresponding to the selected mode is set to be "1", and all of the settings of the other modes are kept at "0".

Figures 14, 15:
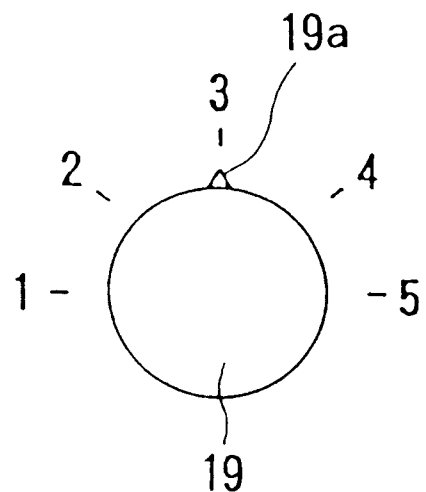
FIG. 14 is a schematic plan view showing a scanning mode selection switch provided on the camera body of the electronic still video camera shown in FIG. 6.
FIG. 15 is a table representing relationships between respective scanning modes designated by the characters [1], [2], [3], [4], and [5]; the respective numbers of horizontal-scanning lines in the modes; and the numbers of pixel signals included in each scanning line obtained in each mode.

As shown in FIG. 7, similar to the first embodiment, the scanning mode selection switch 19 is connected to the system control circuit 20, and inputs various commands thereto for executing a scanning operation in various scanning modes. As shown in FIG. 14, five indication marks are made around the scanning mode selection switch 19 on the surface of the camera body 11, and are distinguished from each other by numerical characters [1], [2], [3], [4], and [5] affixed thereto respectively. The scanning mode selection switch 19 has an indicating protrusion 19a projected therefrom, and one of the five scanning modes is selected by matching the indicating protrusion 19a with the indication mark concerned. When one of the scanning modes is selected by the scanning mode selection switch 19, the scanning operation is carried out in the selected mode in which a given number of horizontal-scanning lines is defined, with each of the scanning lines including a given number of pixel signals.

FIG. 15 shows a table representing the relationships between the respective modes designated by the numerical characters [1], [2], [3], [4], and [5]; the respective numbers of the horizontal-scanning lines in the modes; and the numbers of the pixel signals included in each scanning line obtained in each mode. Note, in this table, "X" designates a number of effective pixel signals included in a horizontal-scanning line; and "Y" designates a number of horizontal-scanning lines (i.e., a total number of steps of the line sensor 44 necessary for scanning the image area of the medium 30 therewith).

As is apparent from this table, when the indicating protrusion 19a of the scanning mode selection switch 19 is matched, for example, with the indication mark [5] (i.e., when the scanning mode [5] is selected), the scanning operation is carried out by the line sensor 44 such that 3,072 horizontal-scanning lines can be obtained. In this case, all of the pixel signals (4,096) are sampled from the line sensor 44 having 4,096 pixels. Also, when the scanning mode [4] is selected, 2,048 horizontal-scanning lines can be obtained, and 3,072 pixel signals are subsampled at the memory 64. Similarly, in the scanning mode [3], a number of the horizontal-scanning lines are 1024, and 1,536 pixel signals are subsampled at the memory 64; in the scanning mode [2], a number of the horizontal-scanning lines are 512, and 762 pixel signals are subsampled at the memory 64; and in the scanning mode [1], a number of the horizontal-scanning lines are 480, and 640 pixel signals are subsampled at the memory 64.

Accordingly, the scanning mode [5] should be selected before a developed image can be read, with the highest resolution, from the electro-developing recording medium 30 by the line sensor 44. Nevertheless, in the scanning mode [5], the reading of the developed image from the electro-developing recording medium 30 is very slow. On the other hand, in the scanning mode [1], the reading of the developed image from the electro-developing recording medium 30 is very fast, but the resolution of the read image is lowest. Thus, one of the scanning modes [1], [2], [3], [4], and [5] can be suitably selected by a user in accordance with a compromise between the resolution of the read image and the speed of the reading.

Since the scanning mode [1] is suitable for reproduction of the image on the TV monitor 82, this mode is necessarily selected when performing the reproduction of the image on the TV monitor 82. On the other hand, when the printing operation is executed, the scanning mode [1] should not be selected, because the resolution of the printed image deteriorates greatly. Thus, when one of the AV mode or the MV mode is selected, the execution of the printing operation must be prevented.

Figure 16:
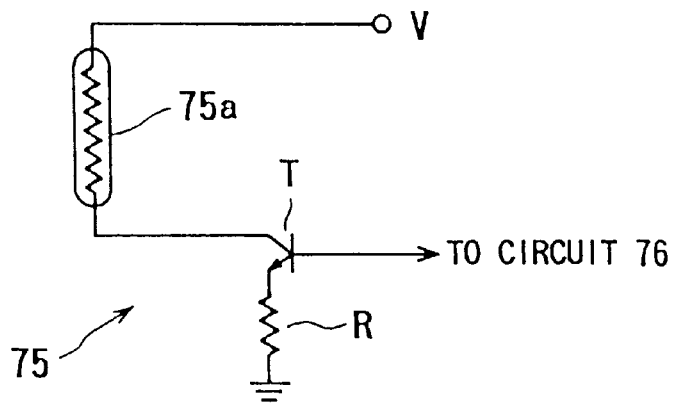
FIG. 16 is an electric circuit of a thermal erasing device shown in FIG. 10.

FIG. 16 shows an electric circuit of the thermal erasing device 75. As shown in this drawing, the electric heater element 75a is connected to an electric power source symbolically designated by "V", at one end thereof. The other end of the electric heater element 75a is grounded through the intermediary of a transistor switch "T" and a resistance "R". When an ON and OFF signal outputted from the erasing control circuit 76 to the transistor switch "T" is changed from the low level into the high level, the transistor switch "T" is turned ON, so that an electric current flows from the source to the ground, and thus, the electric heater element 75a is electrically heated, whereby thermal radiation is emitted from the electric heater element 75a. In an erasing operation, the electro-developing recording medium 30 holding an image recorded and developed thereon is moved from the upper or intial position towards the lower position as if the image area 30a thereof is swept with the heated heater element 75a, and thus, the recorded and developed image can be thermally erased from the electro-developing recording medium 30.

Figure 17:
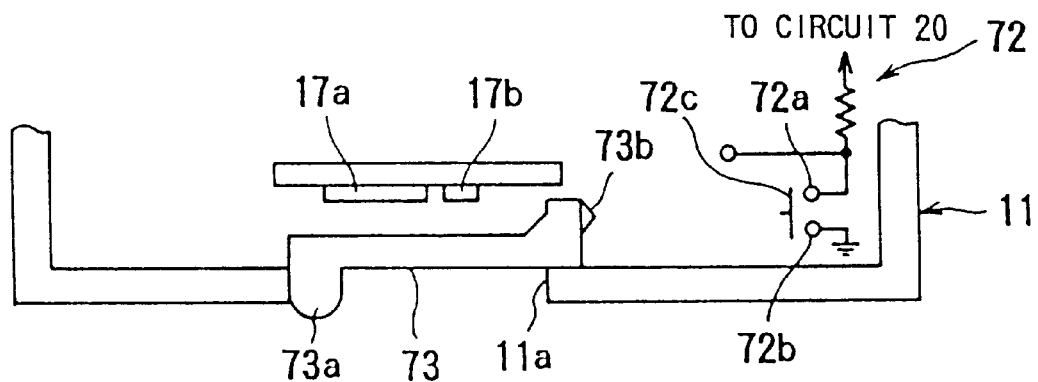
FIG. 17 is a schematic view showing an embodiment of a connector-connection detecting circuit together with output terminal connectors associated therewith and provided in the camera body of the electronic still video camera shown in FIG. 9.
Figure 18:
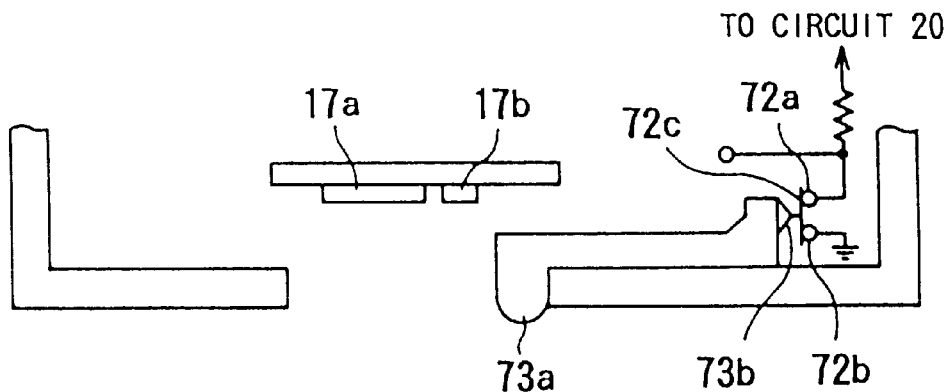
FIG. 18 is a schematic view similar to FIG. 17, showing a part of the elements at different positions.

FIGS. 17 and 18 schematically show an embodiment of the connector connection detecting circuit 72 constituted such that the connection of the cable connectors 81a and/or 82a to the connectors 17a and/or 17b is indirectly detected. As illustrated, the connector-connection detecting circuit 72 is associated with the slidable cover plate 73, and includes a terminal 72a having a suitable electric potential applied thereto, a terminal 72b grounded, and a movable contact element 72c for establishing an electric connection between the terminals 72a and 72b. Usually, the movable contact element 72c is resiliently biased so as to be spaced from the terminals 72a and 72b, and thus an electric connection is not established between the terminals 72a and 72b. The slidable cover plate 73 has a nob element 73a integrally formed at one end thereof, and the nob element 73a is extended through the opening 11a of the camera body 11. Also, the slidable cover plate 73 has a push element 73b projected from the other end thereof, and the push element 73b is aligned with the movable contact element 72c.

When the slidable cover plate 73 is moved from the closed position (FIG. 17) to the open position (FIG. 18) by pushing the nob element 73a with, for example, a thumb or finger of a user, the push element 73b is abutted against the movable contact element 72c, and then moves the same toward the terminals 72a and 72b so that the movable contact element 72c becomes in contact with the terminals 72a and 72b. Thus, the electric connection is established between the terminals 72a and 72b, so that the electric potential of the terminal 72a falls to the ground level. This fall of the electric potential to the ground level is detected by the system control circuit 20. In short, the slidable cover plate 73 must be moved from the closed position to the open position before the interface connectors 81a and/or 82a can be connected to the output terminal connectors 17a and/or 17b, and thus, the connection between the interface connectors 81a and/or 82a and the output terminal connectors 17a and/or 17b can be indirectly detected by the fall of the electric potential (terminal 72a) to the ground level.

Figure 19:
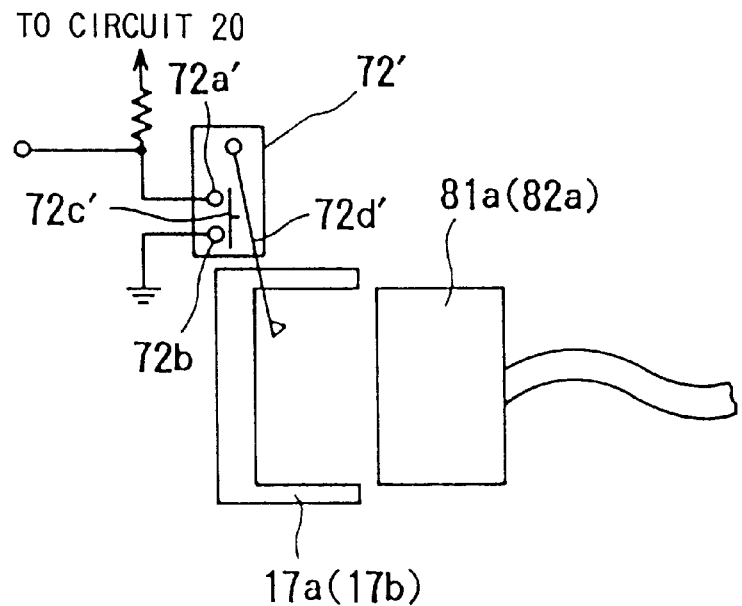
FIG. 19 is a schematic view showing another embodiment of the connector-connection detecting circuit.
Figure 20:
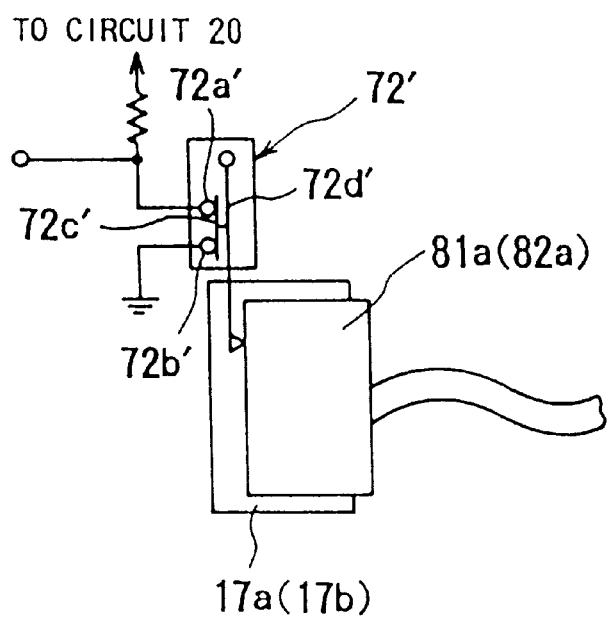
FIG. 20 is a schematic view similar to FIG. 19, showing a part of the elements at different positions.

FIGS. 19 and 20 schematically show another embodiment of the connector-connection detecting circuit 72' constituted such that the connection between the interface connector (81a, 82a) and the output terminal connector 17a, 17b is directly detected. In this embodiment, the connector-connection detecting circuit 72' is associated with each of the output terminal connectors 17a and 17b, and includes a terminal 72a' having a suitable electric potential applied thereto, a terminal 72b' grounded, a movable contact element 72c' for establishing an electric connection between the terminals 72a' and 72b', and a pivoted arm element 72d' for pushing the movable contact element 72c' toward the terminals 72a' and 72b'. Similar to the case mentioned above, usually, the movable contact element 72c' is resiliently biased so as to be spaced from the terminals 72a' and 72b', and thus an electric connection is not established between the terminals 72a' and 72b'. Also, usually, the arm element 72d' is resiliently biased so as to be spaced from the movable contact element 72c'.

When the interface connecter (81a, 82b) is connected to the output terminal connector (17a, 17b), as shown in FIG. 20, the arm element 72d' is pressed against the movable contact element 72c', resulting in moving the movable contact element 72c' towards the terminals 72a' and 72b' so that the movable contact element 72c' comes in contact with the terminals 72a' and 72b'. Thus, the electric connection is established between the terminals 72a' and 72b', so that the electric potential of the terminal 72a' falls to the ground level. This fall of the electric potential to the ground level is detected by the system control circuit 20. Namely, according to the arrangement of the connector-connection detecting circuit 72' shown in FIGS. 19 and 20, the connection between the interface connectors (81a, 82a) and the output terminal connectors (17a, 17b) can be directly detected by the fall of the electric potential (terminal 72a') to the ground level.

Figure 21:
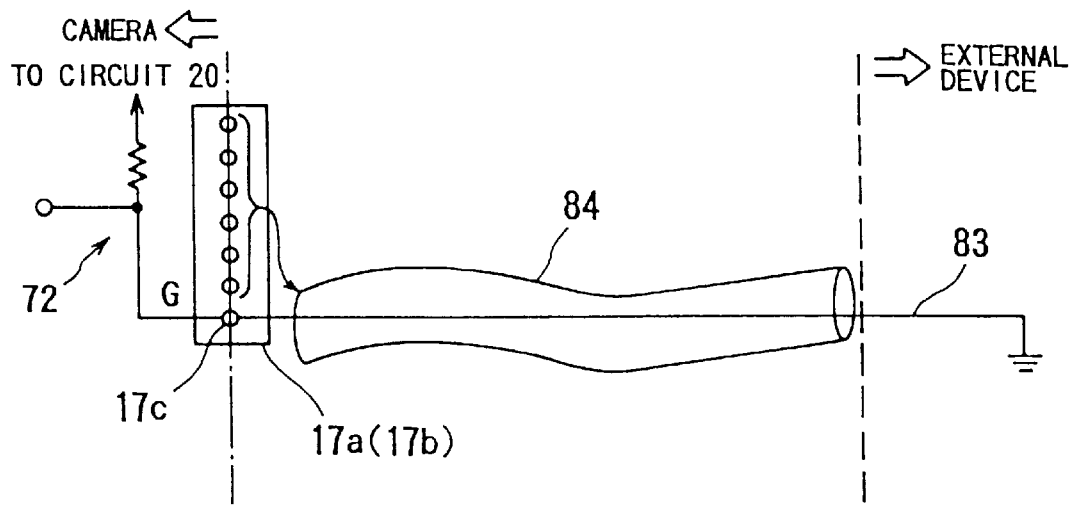
FIG. 21 is a a schematic view throwing yet another embodiment of the connector-connection detecting circuit.

FIG. 21 schematically shows yet another embodiment of the connector-connection detecting circuit 72 constituted such that the connection between the interface connector (81a, 62a) and the output terminal connector 17a, 17b is directly detected. In this embodiment, the connector-connection detecting circuit 72 includes a terminal end joined to a grounding-contact 17c of the output terminal connector (17a, 17b), and has a suitable electric potential applied thereto. When the interface connector (81a, 82a) is connected to the output terminal connector (17a, 17b), the contact 17c of the output terminal connector (17a, 17b) is grounded through the intermediary of a grounding-line 83 included in the cable 84 extending from the interface connector (81a, 82a), so that the electric potential of the connector-connection detecting circuit 72 falls to the ground level. This fall of the electric potential to the ground level is detected by the system control circuit 20. Namely, the connection between the interface connectors (81a, 62a) and the output terminal connectors (17a, 17b) can be directly detected by the fall of the electric potential (circuit 72) to the ground level.

Figure 22:
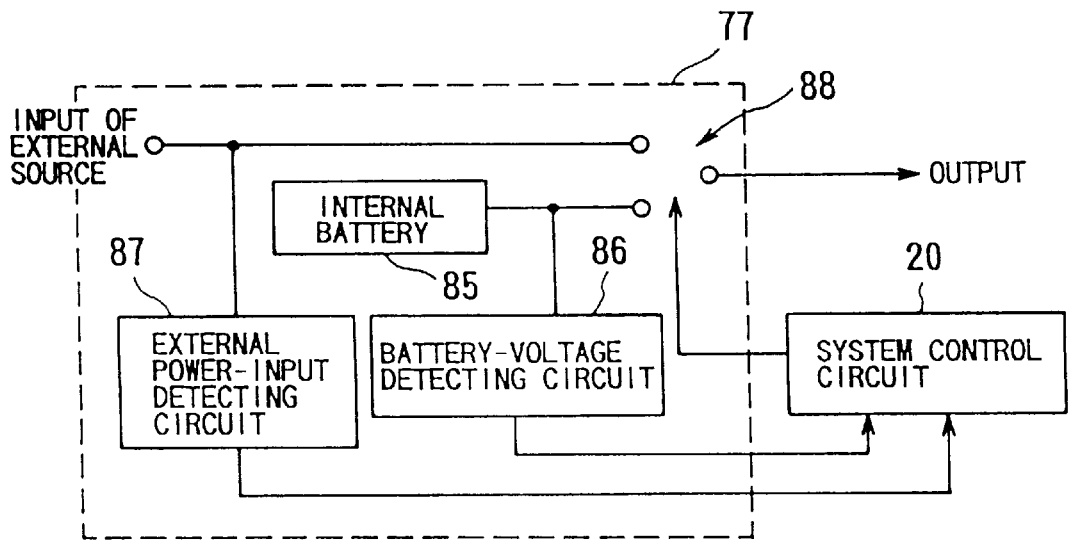
FIG. 22 illustrates a block diagram of a main power source circuit of the electronic still video camera shown in FIG. 6.

FIG. 22 shows a block diagram of the main power source circuit 77 which includes an exchangeable internal battery 8S, and a battery-voltage detecting circuit 86 for detecting an output voltage of the internal battery 85. The detection of the output voltage of the internal battery 85 is carried out at regular time intervals of, for example, 1 second. The detected output voltage data is fetched by the system control circuit 20, in which it is determined whether the detected data is lower than a given level. If the detected data is lower than the given level, a message is displayed on the display device 68 warning that the internal battery should be exchanged for a new one.

The main power source circuit 77 also includes an external power-input detecting circuit 87 for detecting an input or connection of an external power source (not shown), such as an AC power adapter, a detachable additional battery power pack, or the like. When the input or connection of the external power source is detected, a detecting signal outputted from the external power-input detecting circuit 87 to the system control circuit 20 is changed from a low level to a high level, whereby the input or connection of the external power source is confirmed by the system control circuit 20.

The main power source circuit 77 further includes a switching circuit 88 which is controlled by the system control circuit 20. Usually, the internal power battery 85 is switched ON by the switching circuit 88. However, whenever the input or connection of the external power source is detected by the external power-input detecting circuit 87, the internal power battery 85 is switched OFF, and the external power source is switched ON by the switching circuit 88.

When a main switch (not shown) of the camera is turned ON, first, the main power source circuit 77 is energized to supply the camera with electric power from the internal power source 85 or the external power source. Namely, unless an input or connection of the external power source is detected by the external power-input detecting circuit 87, the internal battery 85 is switched ON by the switching circuit 88. If the input or connection of the external power source is detected by the external power-input detecting circuit 87, the use of the external power source is switched ON by the switching circuit 88. On the other hand, when the main switch of the camera is turned ON, a release switch disabling flag is initially set to be "0", and thus, the release switch 14 is enabled.

Figure 23:
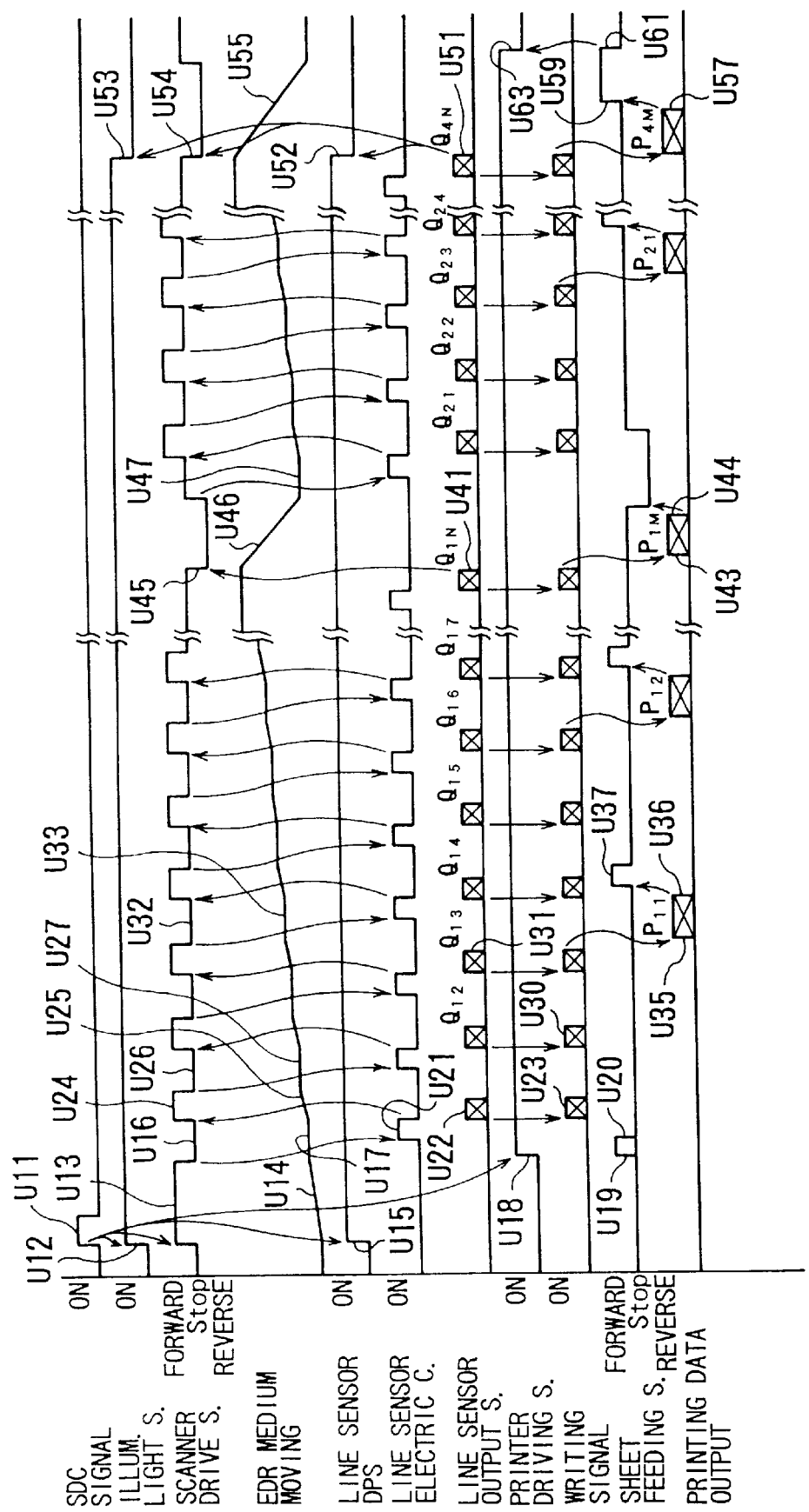
FIG. 23 is a timing chart for explaining an operation of the electronic still video camera shown in FIG. 6.
Figure 24:
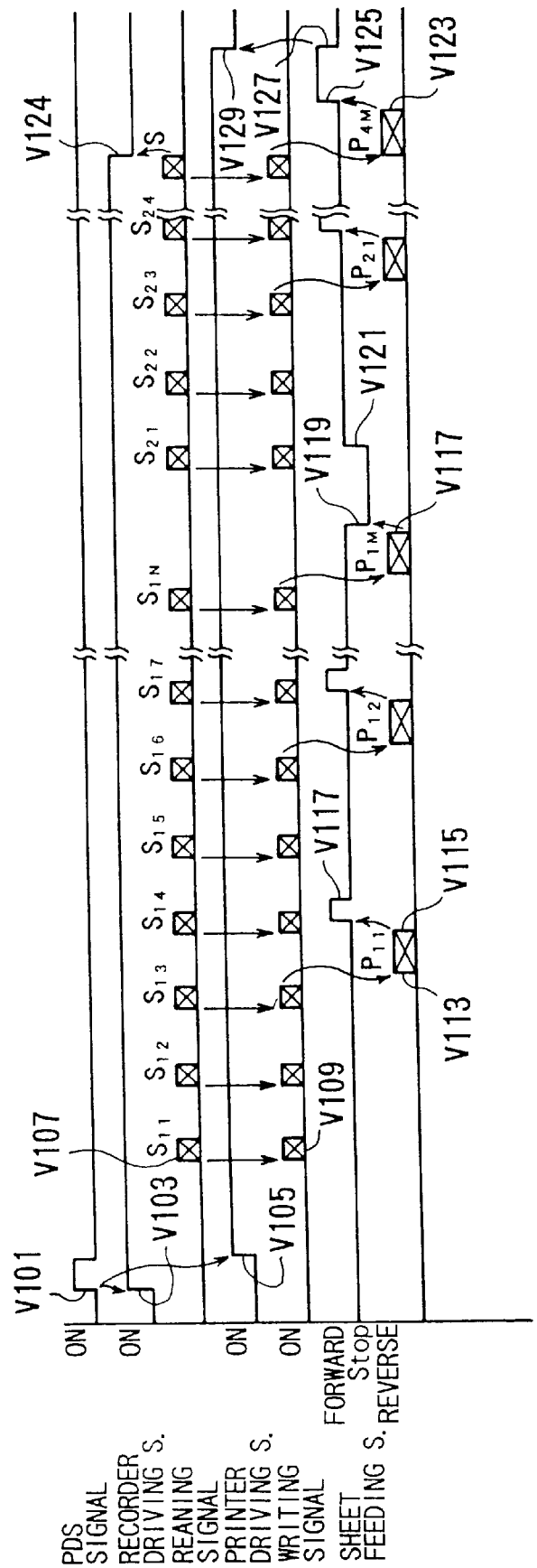
FIG. 24 is a timing chart for explaining another operation of the electronic still video camera shown in FIG. 6.

FIG. 23 shows a timing chart for explaining the scanning and printing operations executed in the camera, and FIG. 24 shows a timing chart for explaining the operation in the second externally-outputting mode (EO2). FIGS. 25 to 36 show a flowchart for explaining a whole operation of the second embodiment of the camera according to the present invention.

Before an explanation of the whole operation of the cameras for convenience, the eight operation modes as mentioned above are summarized below.

In the auto-photographing/recording mode (AP), a photographing operation is executed to record and develop an optical image in the electro-developing recording medium 30, as mentioned above, and then a scanning operation is executed to read the developed image from the electro-developing recording medium 30 by the line sensor 44, such that the read pixel signals are stored in a second recording medium, such as an IC memory card, a floppy disk, a detachable hard disk or the like in the image recording device 67. Note, in this mode, if the printing operation enabling (POE) flag is set to be "1" by the switch 401, the printing operation is executed.

In the manual-photographing mode (MP), only an execution of the photographing operation is carried out. Nevertheless, if the POE flag is set to be "1", the printing operation is executed.

In the image-recording mode (IR), an execution of the scanning operation is carried out such that the pixel signals read from the electro-developing recording medium 30 are stored in a second recording medium, such as an IC memory card, a floppy disk, a detachable hard disk or the like, loaded in the image recording device 67. Note, in this mode, if the POE flag is set to be "1" by the switch 401, the printing operation is executed.

In the first externally-outputting mode (EO1), only an execution of the scanning operation is carried out such that the pixel signals read from the electro-developing recording medium 30 are transfered to the personal computer 81. Nevertheless, if the POE flag is set to be "1", the printing operation is executed.

In the second externally-outputting mode (EO2), the photographing operation and the scanning operation are not executed. The pixel signals are read from the second recording medium such as an IC memory card, a floppy disk, a detachable hard disk or the like in the image recording device 67, and are then transfered to the personal computer 81. Note, in this mode, if the POE flag is set to be "1", the printing operation is executed.

In the auto-video-monitor mode (AV), an execution of the photographing operation is carried out, and then, an execution of the scanning operation is carried out such that the read pixels signals are processed in and are transfered from the video signal outputting circuit 74 to the TV monitor 82. Note, in this mode, the setting of the POE flag is kept to be "0", and thus, the execution of the printing operation is prevented.

In the manual-video-monitor mode (MV), only an execution of the scanning operation is carried out such that the read pixel signals are processed in and are transfered from the video signal outputting circuit 74 to the TV monitor 82. Note, in this mode, the setting of the POE flag is kept at "0", and thus, the execution of the printing operation is prevented.

In the image-erasing mode (IE), an image-erasing operation is executed to thermally erase a recorded and developed image from the electro-developing recording medium 30 by moving the movable member 52 carrying the electric heater element 75a. Of course, in this mode, the execution of the printing operation is prevented.

Note, whenever the image-erasing operation is completed, an image erasing completion (IEC) flag is set to be "1", and, whenever the photographing operation is completed, the IEC flag is reset to be "0". Namely, by obtaining access to the IEC flag, it can be determined whether the electro-developing recording medium 30 has an image recorded and developed therein. The IEC flag is defined in a non-volatile memory provided in the system control circuit 20, and thus the setting of the IEC flag can be kept even if the main switch of the camera is turned OFF.

Further, when one of the scanning modes [1], [2], [3], [4], and [5] is selected by the scanning mode selection switch 19, a corresponding flag is set "1", whereby operation-parameter data (for example, data for regulating intervals of an intermittent movement of the movable member 52 and so on) necessary for executing the scanning operation in the selected scanning mode are read from a read-only memory (ROM) provided in the system control circuit 20.

With reference to the flowchart of FIG. 25, at step 301, it is determined whether the release switch 14 has been turned ON. If the turn-ON of the release switch 14 is confirmed, the control proceeds to step 302, in which a release switch disabling flag is set to "1", and a switching operation of the release switch 14 is disabled.

At step 303, it is determined whether the camera is in the course of the photographing operation for recording and developing an optical image in the electro-developing recording medium 30. This determination can be carried out by detecting, for example, whether the quick return mirror 21 is at the initial position or at the down position. If the camera is in the course of the photographing operation, the control returns to step 301. Note, when the photographing operation is finished, the release switch disabling flag is reset to "0". If the camera is not in the course of the photographing operation, the control proceeds from step 303 to step 304.

At step 304, it is determined whether the camera is in the course of the scanning operation for electronically reading the developed image from the electro-developing recording medium 30. This determination can be carried out by detecting, for example, whether the electro-developing recording medium 30 is at the upper or initial position. If the camera is in the course of the scanning operation, the control returns to step 301. Note, when the scanning operation is finished, the release switch disabling flag is reset to "0". If the camera is not in the course of the scanning operation, the control proceeds from step 304 to step 305.

At step 305, it is determined whether the camera is in the course of the erasing operation for thermally erasing the developed image from the electro-developing recording medium 30. This determination can also be carried out by detecting, for example, whether or not the electro-developing recording medium 30 is at the upper or initial position. If the camera is in the course of the erasing operation, the control returns to step 301. Note, when the erasing operation is finished, the release switch disabling flag is reset to "0". If the camera is not in the course of the scanning operation, the control proceeds from step 305 to step 306.

At step 306, it is determined whether the camera is in the course of the second externally-outputting operation for transferring the pixel signals from the second recording mediums held in the image recording device 67, to the computer 81. This determination can be carried out by detecting, for example, whether the image recording device 67 is operating. If the camera is in the course of the second externally-outputting operation, the control returns to step 301. Note, when the second externally-outputting operation is finished, the release switch disabling flag is reset to "0". If the camera is not in the course of the second externally-outputting operations the control proceeds from step 306 to step 307.

At step 307, it is determined whether one of the AP, MV, or AV flags is "1", i.e., whether a mode, in which the execution of the photographing operation is involved, has been selected. If the manual photographing mode (MP) is selected (the MP flag=1), the control proceeds from step 307 to step 313, in which it is determined whether a image-erasing completion (IEC) flag is "0". If the IEC flag=0, i.e., if the electro-developing recording medium 30 has an image recorded and developed therein, the control proceeds from step 313 to step 312, in which the release switch disabling flag is reset to be "0", i.e., the release switch 14 is enabled. Thus, this routine is ended, i.e., the operation based open the manual photographing mode is erroneously finished. Namely, the execution of an image-erasing operation should be carried out by selecting the image-erasing mode (IE) and by turning the release switch 14 ON, before an operation can be executed in the manual-photographing mode (MP).

At step 313, if the image-erasing completion (IEC) flag is "1", i.e. if the electro-developing recording medium 30 has no image recorded and developed therein, the control proceeds from step 313 to step 314, in which it is determined whether the AV flag is "1". At this stages since the AV flag=0, i.e., since the auto-video-monitor mode is not selected, the control proceeds to step 401 (FIG. 26), in which an execution of the photographing operation is started.

In particulars at step 401, an output signal of the photometry sensor 28, i.e., a photometry value, is sensed and fetched by the system control circuit 20, and then control proceeds to step 402, in which an exposure calculation is started based on the fetched photometry value. After a predetermined period of time has elapsed from the ON-operation of the release switch 14, the control proceeds to step 403, in which a recording medium activating signal outputted from the recording medium drive circuit 41 to the electro-developing recording medium 30 is turned ON. Namely, the recording medium activating signal is changed from the low level to the high level, so that the activating voltage is applied between the electrostatic information recording medium 31 and the electric charge keeping medium 32. Then, at step 404, it is determined whether the exposure calculation has been completed. When the exposure calculation has been completed, the procedures necessary for the photographing operation are subsequently carried out in the following steps on the basis of the calculated result.

At step 405, an opening area of the aperture 12a is adjusted in accordance with the calculated result. Note, since the aperture 12a initially has the fully-open area, the adjustment of the aperture 12a is usually carried out such that a fully-open area thereof is made small. Also, at step 405, the quick return mirror 21 is changed from the down-position to the up-position.

At step 406, it is determined whether the quick return mirror 21 has been changed from the down-position to the up-position, and whether the adjustment of the aperture 12a has been completed. Then, the control proceeds from step 406 to step 407, in which the shutter 22 is opened, whereby an optical image is focussed and formed on the electro-developing recording medium 30.

At step 408 it is determined whether an exposure period of time, which is designated by the calculated result, has elapsed. When the exposure period of time has elapsed, i.e., when the exposure has been completed, the control proceeds to step 409, in which the shutter 22 is closed. After the closing of the shutter 22 is completed, the control proceeds to step 410, in which the quick return mirror 21 in returned from the up-position to the down-position, and in which the opening area of the aperture 12a is returned to the fully-open area. Then, at step 411, the output of the recording medium activating signal is stopped.

Namely, the output of the recording medium activating signal to the electro-developing recording medium 30 is at least kept ON during the period of time during which the shutter 22 is opened, whereby recording and development of the optical image can be carried out in the electro-developing recording medium 30. As mentioned above, the electric charge keeping medium 32 of the electro-developing recording medium 30 comprises a memory type liquid crystal display, and the developed image can be held therein even if the output of the recording medium activating signal is stopped.

At step 412 it is determined whether the quick return mirror 21 has moved to the initial position or down-position, and whether the opening area of the aperture 12a has returned to the initial area or fully-open area. Then, the control proceeds from step 412 to step 413, in which the driving of the quick return mirror 21 and the aperture 12a are stopped. Thus, the execution of the photographing operation is finished. Thereafter, the control proceeds to step 414, in which the image-erasing completion (IEC) flag is reset to be "0". Namely, the resetting of the IEC flag means that the electro-developing recording medium 30 has an image recorded and developed therein.

Subsequently, the control proceeds from step 414 to step 415 (FIG. 27), in which a scanning operation enabling (SOE) flag is set to be "1", to thereby enable the scanning operation. Nevertheless, at this stage, since the manual-photographing mode (MP) has been selected, it is unnecessary to execute the scanning operation. At step 416, it is determined whether the AP flag is set to be "1". However, at this stage, since the MV flag=1, the control proceeds to step 417, in which it is determined whether the printing operation enabling flag (POE) is set to be "1". If the POE flag is reset to be "0", the control proceeds to step 420, in which it is determined whether one of the AV flag or the MV flag is set to be "1". As stated above, at this stage, since the MP flag=1, the control proceeds from step 420 to step 423, in which the release switch 14 is enabled. Thus, the manual-photographing is finished.

Figure 28:
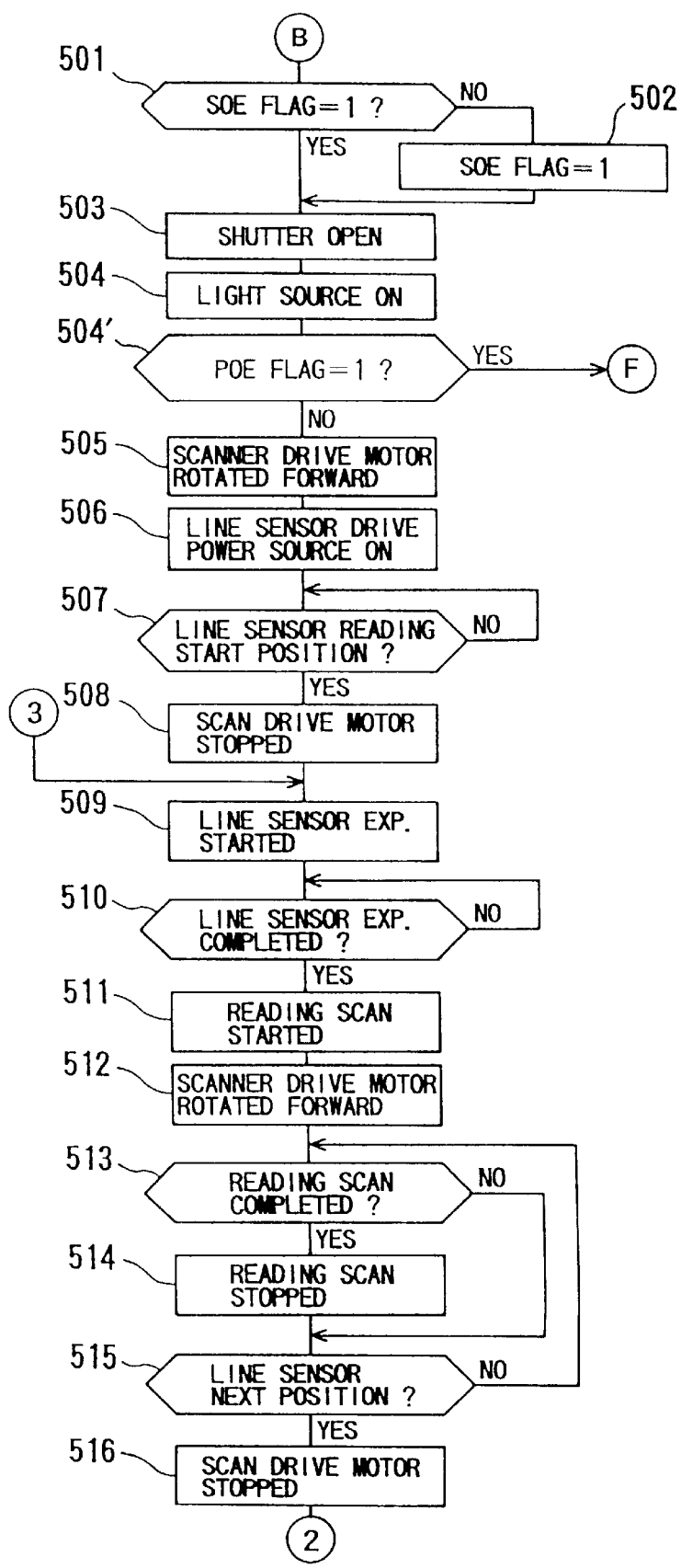
FIG. 28 is still yet another part of the flowchart for explaining the whole operation of the electronic still video camera shown in FIG. 6.
Figure 29:
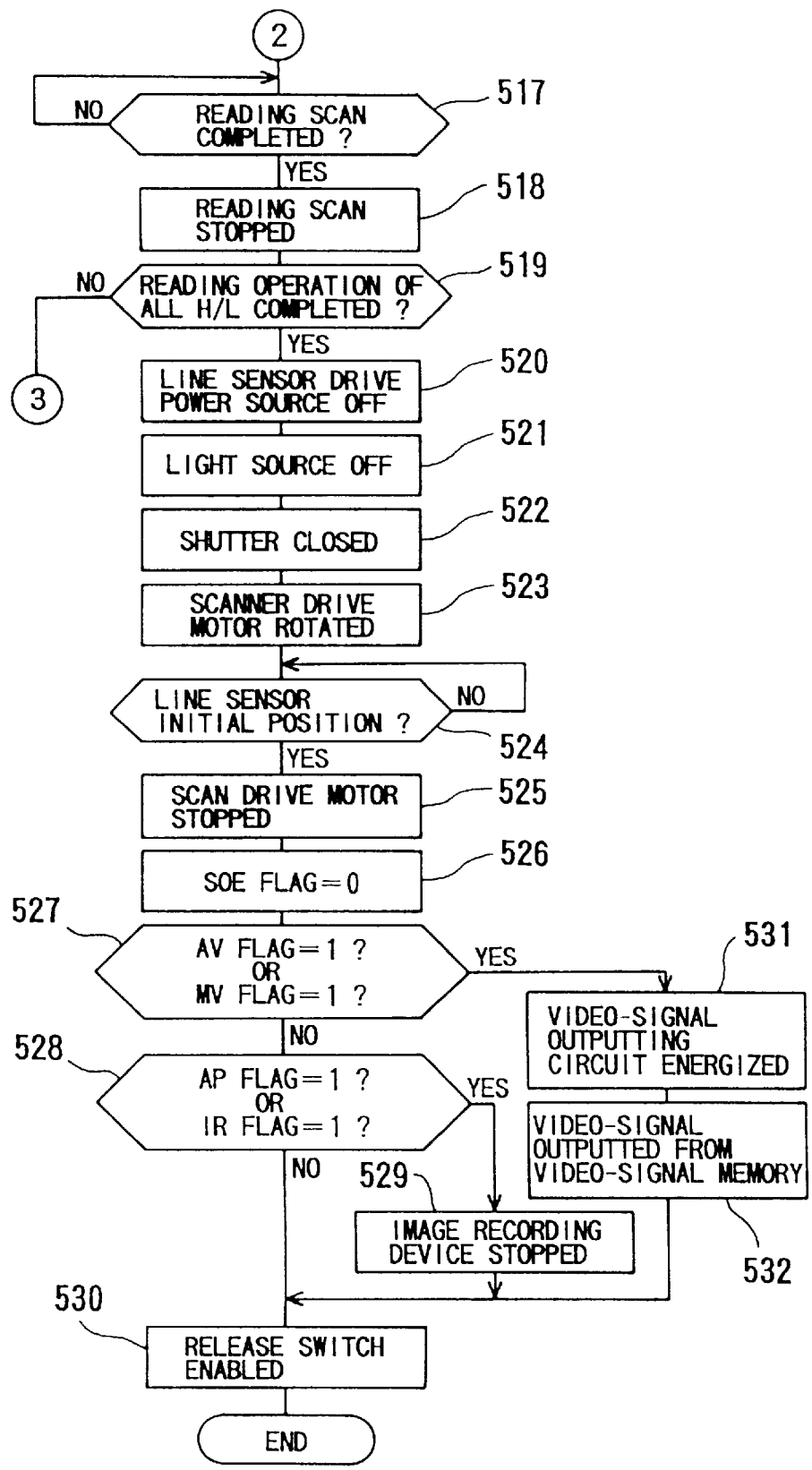
FIG. 29 is still yet another part of the flowchart for explaining the whole operation of the electronic still video camera shown in FIG. 6.

At step 417, if the printing operation enabling flag (POE) is set to be "1", the control proceeds to step 418, in which the operation-parameter data necessary for executing the scanning operation in the selected scanning mode [1], [2], [3], [4] or [5] is read from the read only memory (ROM) of the system control circuit 20. Then, the control proceeds from step 418 to step 501 (FIG. 28).

At step 501, it is determined whether the scanning operation enabling (SOE) flag is "1". If the SOE flag=0, the control proceeds to step 502, in which the SOE flag is set to be "1". When the SOE flag is set to be "1", a scanner drive command signal for enabling the execution of the scanning operation is turned ON (reference "U11" in FIG. 29). Then, at step 503, the shutter 22 is opened, and, at step 504, the light source 42 is turned ON (reference "U12" in FIG. 23).

Figure 30:
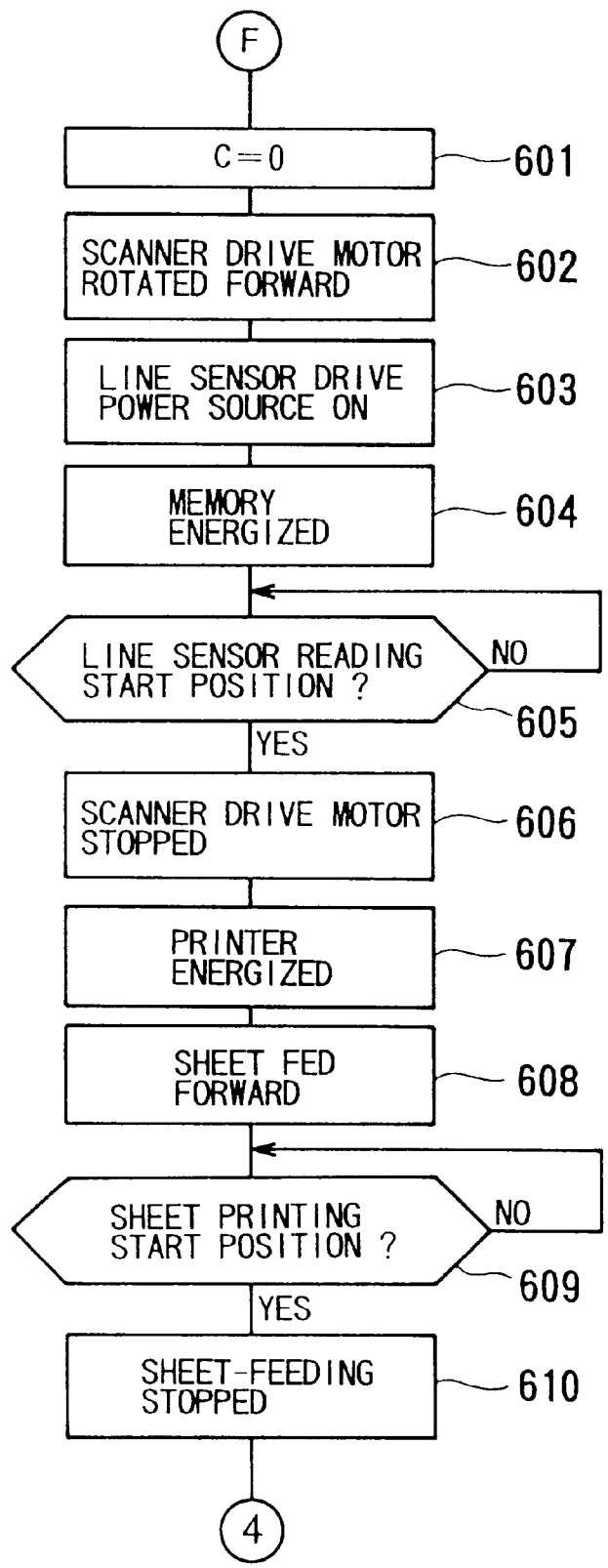
FIG. 30 is still yet another part of the flowchart for explaining the whole operation of the electronic still video camera shown in FIG. 6.
Figure 31:
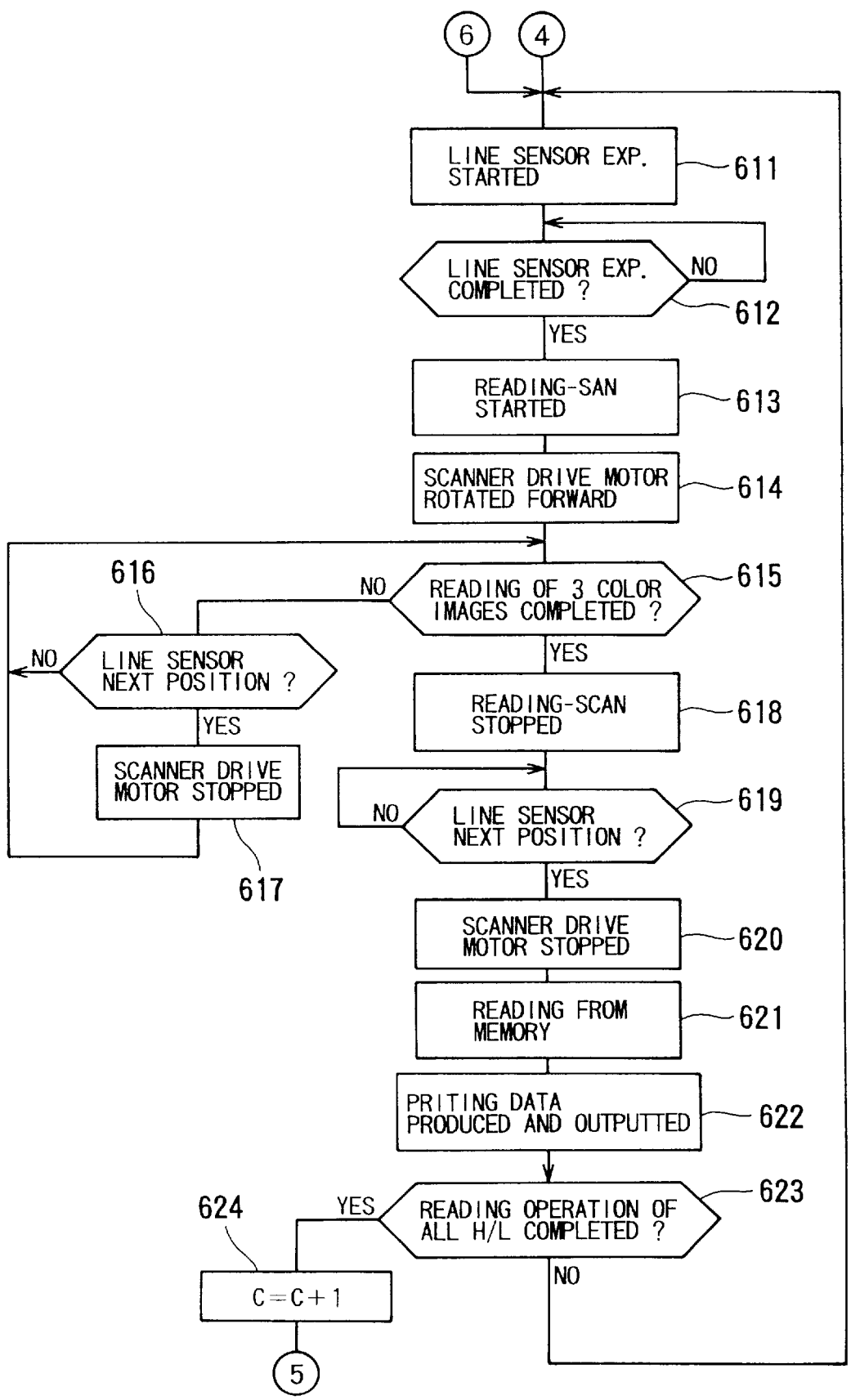
FIG. 31 is still yet another part of the flowchart for explaining the whole operation of the electronic still video camera shown in FIG. 6.

At step 504', it is determined whether the printing operation enabling (POE) flag is set to be "1". At this stage, since the POE flag=1, the control proceeds from step 504' to step 601 (FIG. 30).

At step 601, a counter C is reset to be "0". Then, at step 602, a scanner drive signal outputted from the system control circuit 20 to the scanner drive circuit 46 is changed from a zero level to a positive level (reference "U13" in FIG. 23), so that the scan drive motor 55 is driven in a forward direction due to the drive pulses outputted from the scanner drive circuit 46 thereto, whereby the electro-developing recording medium 30 starts to move downward from the upper or initial position towards an image-reading start position (reference "U14" in FIG. 23).

At step 603, a line sensor drive power source included in the line sensor drive circuit 47 is turned ON (reference "U15" in FIG. 23). Then, at step 604, the memory 64 is energized such that a writing/reading of data is enabled, At step 605, it is determined whether the electro-developing recording medium 30 has been moved to an image-reading start position, i.e., whether the line sensor 44 has been relatively positioned at the image-reading start position with respect to the electro-developing recording medium 30.

When the electro-developing recording medium 30 reaches the image-reading start positions the control proceeds to step 606, in which the scanner drive signal outputted from the system control circuit 20 to the scanner drive circuit 46 is returned from the positive level to the zero level (reference "U16" in FIG. 23), and thus, the output of the drive pulses from the scanner drive circuit 46 to the scan drive motor 55 is interrupted to thereby stop the scan drive motor 55, whereby the electro-developing recording medium 30 is held at the image-reading start position (reference "U17" in FIG. 23). At this time, the line sensor 44 is aligned and registered with the lowermost blue filter element of the color filter 431, because the electro-developing recording medium 30 is moved downward. Note, the standing still of the electro-developing recording medium 30 at the image-reading start position may be controlled by, for example, counting the driving pulses outputted from the scanner drive circuit 46 to the scan drive motor 55.

At step 607, a printer driving signal for driving the printer 406 is turned ON (reference "U18" in FIG. 23), whereby the printer 406 is energized such that a printing is enabled. Then, at step 608, a cut sheet paper CS is introduced from the paper station into a nip between the printing head 411 and the platen 412. At step 609, it is determined whether the cut sheet paper CS is fed to a printing start position thereof. When the cut sheet paper CS reaches the printing start position, the control proceeds to step 610, in which the feeding of the cut sheet paper CS is stopped.

At step 611, an exposure of the line sensor 44 is started by the illunination of the light source 42, and thus, electric charge accumulation in the line sensor 44 is performed (reference "U21" in FIG. 23). Then, at step 612, it is determined whether a given time has elapsed, i.e., whether the electric charge accumulation in the line sensor 44 has been completed. When the electric charge accumulation in the line sensor 44 is completed, the control proceeds to step 613, in which a reading-scan of a first horizontal-scanning line of blue pixel signals from the line sensor 44 is started by the line sensor drive circuit (reference "U22" in FIG. 23).

At step 613, when the reading-scan of the blue pixel signals from the line sensor 44 is started at step 613, the control proceeds to step 614, in which the scanner drive signal outputted from the system control circuit 2O to the scanner drive circuit 46 is changed from the zero level to the positive level (reference "U24" in FIG. 23), so that the scan drive motor 55 is driven in the forward direction due to the drive pulses outputted from the scanner drive circuit 46 thereto, whereby the electro-developing recording medium 30 is moved downward (reference "U25" in FIG. 23).

At step 615, it is determined whether a reading-scan of three color (blue, green, red) pixel signals of the line sensor 44 has been completed. At this stage, since the reading-scan of the blue pixel signals from the line sensor 44 is still performed, the control proceeds from step 615 to step 616, in which it is determined whether the electro-developing recording medium 30 has been moved to a next image-reading position. If the electro-developing recording medium 30 does not reach the next image-reading position, the control returns to step 615. As is apparent from the timing chart of FIG. 23, the reading-scan of the blue pixel signals is completed during the movement of the electro-developing recording medium 30, and the read blue pixel signals are stored as digital data in the memory 64 (reference "U23" in FIG. 23).

When the electro-developing recording medium 30 reaches the next image-reading position, i.e., when the line sensor 44 is relatively positioned at the next image-reading position with respect to the medium 30, the control proceeds from the step 616 to step 617, in which the scanner drive signal outputted from the system control circuit 20 to the scanner drive circuit 46 is returned from the positive level to the zero level (reference "U26" in FIG. 23), and thus, the output of the drive pulses from the scanner drive circuit 46 to the scan drive motor 55 is interrupted to thereby stop the scan drive motor 55 (reference "U27" in FIG. 23), whereby the electro-developing recording medium 30 is held at the next image-reading position. Then, the control returns to step 611.

When the line sensor 44 is relatively positioned at the next image-reading position with respect to the medium 30, the line sensor 44 is aligned and registered with the green filter element adjacent to the lowermost blue filter element of the color filter 431. Thus, the reading-scan of green pixel signals from the line sensor 44 is carried out. Similarly, the reading-san of red pixel signals from the line sensor 44 is carried out. Note, the read pixel signals are successively stored as digital data in memory 64 (reference "U30" and "U31" in FIG. 23).

At step 615, when the reading-scan of three color pixel signals from the line sensor 44 has been completed) the reading-scan operation is stopped. Note, the completion of the reading-scan can be known by, for example, counting reading-clock pulses outputted from the line sensor drive circuit 47 to the line sensor 44.

At step 619, it is determined whether the electro-developing recording medium 30 is moved until the line sensor 44 is relatively positioned at the further next image-reading position with respect to the medium 30. When the movement of the medium 30 to the further image-reading position is confirmed, the control proceeds to 620, in which the scan drive motor 55 is stopped.

At step 621, the color pixel data are read from the memory 64, and are fed to the printing data generator 405. At step 622, a single horizontal line of cyan data is produced as a printing data from the color (blues green, and red) pixel data in the printing data generator 405, and is then outputted to the thermal printing head 411, whereby a printing is made on the cut sheet paper CS on the basis of the single-horizontal line of cyan data (reference "$P_{11}$" in FIG. 23). Note, at this time, the cyan zone of the ink ribbon web 415 is positioned at the printing position. After the printing based upon the single-horizontal line of cyan data is completed, the cut sheet paper CS is fed by a given pitch (reference "U37" in FIG. 23).

At step 623, it is determined whether the whole of the developed image has-been completely read, i.e., the reading-scans have been completed on all of the horizontal-scanning lines defined by intervals of the intermittent movements of the line sensor 44. This determination is made possible by, for example, counting the drive pulses outputted from the scanner drive circuit 46. If the whole of the developed image has not been completely read, the control returns from step 623 to step 611. Namely, the routine comprising steps 611 to 623 are repeated until the reading-scans are completed on all of the horizontal-scanning lines. Thus, the printings are successively made on the cut sheet paper CS (reference "$P_{12}$" . . . "$P_{1M}$" in FIG. 23), and a single-frame of cyan image is printed and reproduced on the cut sheet paper CS.

At step 623, when the whole of the developed image has been completely read (reference "U41" in FIG. 23), the control proceeds from step 623 to step 624, in which the counter C is incremented by 1. Then, the control proceeds to step 625, in which it is determined whether a count number of the counter C is equal to or less than 3. At this stages since C=1 the control proceeds to step 626, in which the cut sheet paper CS carrying the cyan image printed thereon is returned back to the printing start position. Note, during the return of the cut sheet paper CS to the printing start positions the platen 412 is moved from the operative position (FIG. 8) to the removal position, and the ink ribbon web 415 is drawn out of the roll 471 such that the yellow zone thereof is positioned at the printing position. Then, at step 627, the scan drive motor 55 is reversely driven (reference "U45" in FIG. 23) so that the electro-developing recording medium 30 is returned to the image-reading start position (reference "U46" in FIG. 23). At step 628, it is determined whether the electro-developing recording medium 30 is moved to the image-reading position (reference "U47" in FIG. 23). When the electro-developing recording medium 30 reaches the image-reading position, i.e., when the line sensor 44 is relatively positioned at the image-reading position with respect to the electro-developing recording medium 305 the control proceeds to step 629, in which the scan drive motor 55 is stopped. Then, the control returns to step 611.

Accordingly, the printings are successively made on the cut sheet paper CS carrying the cyan image in substantially the same manner as mentioned above, but the printed image is reproduced as an yellow image.

Namely, at step 622, a single-horizontal line of yellow data is produced as a printing data from the color (blue, green, and red) pixel data in the printing data generator 405, and is then outputted to the thermal printing head 411, whereby a printing is made on the cut sheet paper CS carrying the cyan image, on the basis of the single-horizontal line of yellow data (reference "$P_{21}$" in FIG. 23). Thereafter, the control proceeds from step 623 to step 624, in which the counter C is incremented by 1. Then, the control proceeds to step 625, in which it is determined whether a count number of the counter C is equal to or less than 3. At this stage, since C=2, the control proceeds to step 626, in which the cut sheet paper CS carrying the cyan and yellow images printed thereon is again returned back to the printing start position. Note, during the return of the cut sheet paper CS to the printing start position, the platen 412 is moved from the operative position (FIG. 8) to the removal positions and the ink ribbon web 415 is drawn out of the roll 471 such that the magenta zone thereof is positioned at the printing position. Then, at step 627, the scan drive motor 55 is reversely driven so that the electro-developing recording medium 30 is returned to the image-reading start position. At step 628, it is determined whether the electro-developing recording medium 30 is moved to the image-reading position. When the electro-developing recording medium 30 reaches the image-reading position, i.e., when the line sensor 44 is relatively positioned at the image-reading position with respect to the electro-developing recording medium 30, the control proceeds to step 629, in which the scan drive motor 55 is stopped. Then, the control returns to step 611.

Accordingly, the printings also are successively made on the cut sheet paper CS carrying the cyan and yellow images in substantially the same manner as mentioned above but the printed image is reproduced as a magenta image. Namely, at step 622, a single-horizontal line of magenta data is produced as a printing data from the color (blue, green, and red) pixel data in the printing data generator 405, and is then outputted to the thermal printing head 411, whereby a printing is made on the cut sheet paper CS carrying the cyan and yellow images, on the basis of the single-horizontal line of magenta data. Thereafter, the control proceeds from step 623 to step 624, in which the counter C is incremented by 1. Then, the control proceeds to step 625, in which it is determined whether a count number of the counter C is equal to or less than 3. At this stage, since C=3, the control proceeds to step 626, in which the cut sheet paper CS carrying the cyan, yellow, and magenta images printed thereon is further returned back to the printing start position. Note, during the return of the cut sheet paper CS to the printing start position, the platen 412 is moved from the operative position (FIG. 8) to the removal position, and the ink ribbon web 416 is drawn out of the roll 471 such that the black zone thereof is positioned at the printing position. Then at step 627, the scan drive motor 55 is reversely driven so that the electro-developing recording medium 30 is returned to the image-reading start position. At step 628, it is determined whether the electro-developing recording medium 30 is moved to the image-reading position. When the electro-developing recording medium 30 reaches the image-reading positions i.e., when the line sensor 44 is relatively positioned at the image-reading position with respect to the electro-developing recording medium 30, the control proceeds to step 629, in which the scan drive motor 55 is stopped. Then, the control returns to step 511.

Thus, the printings are further successively made on the cut sheet paper CS carrying the cyan, yellow, and magenta images in substantially the same manner as mentioned above, but the printed image is reproduced as a black image. Namely, at step 622, a single-horizontal line of black data is produced as a printing data from the color (blue, green, and red) pixel data in the printing data generator 405, and is then outputted to the thermal printing head 411, whereby a printing is made on the cut sheet paper CS carrying the cyan, yellow, and magenta images, on the basis of the single-horizontal line of black data (reference "$P_{3M}$" in FIG. 23). At this moment, a full color image reproduction is completed on the cut sheet paper CS. Thereafter, the control proceeds from step 623 to step 624, in which the counter C is incremented by 1. Then, the control proceeds to step 625, in which it is determined whether a count number of the counter C is equal to or less than 3. At this stage, since C=4, the control proceeds from step 625 to step 630.

At step 630, the line sensor drive power source included in the line sensor drive circuit 47 is turned OFF (reference "U52" in FIG. 23). Then, at step 631, the light source 42 is turned OFF (reference "U53" in FIG. 23), and, at step 632, the shutter 22 is closed. In succession, at step 633 the memory 64 is deenergized such that the storage of pixel signals is disabled, and, at step 634, the scan drive motor 55 is reversely driven so that the electro-developing recording medium 30 is returned to the upper or initial position. At step 635, the cut sheet paper CS carrying the full color image is fed forward (reference "U59" in FIG. 23), and is discharged from the discharge port 402. Then, the printer driving signal is turned OFF (reference "U53" in FIG. 23), and the feeding of the cut sheet paper CS is stopped (reference "U61" in FIG. 23).

At step 636, it is determined whether the line sensor 44 has been relatively positioned at the initial position with respect to the electro-developing recording medium 30, i.e., whether the electro-developing recording medium 30 has reached the upper or initial position. When the electro-developing recording medium 30 is returned to the initial position, the control proceeds to step 637, in which the scan drive motor 55 is stopped. Then, at step 638, the scanning operation enabling (SOE) flag is reset to be "0".

At step 639, it is determined whether one of the AP flag or the IR flag is set to be "1". At this stage, since the MP flag=1, the control proceeds to step 640, in which the release switch 14 is enabled. Thus, the printing operation is finished in the manual photographing mode (MP).

Figure 27:
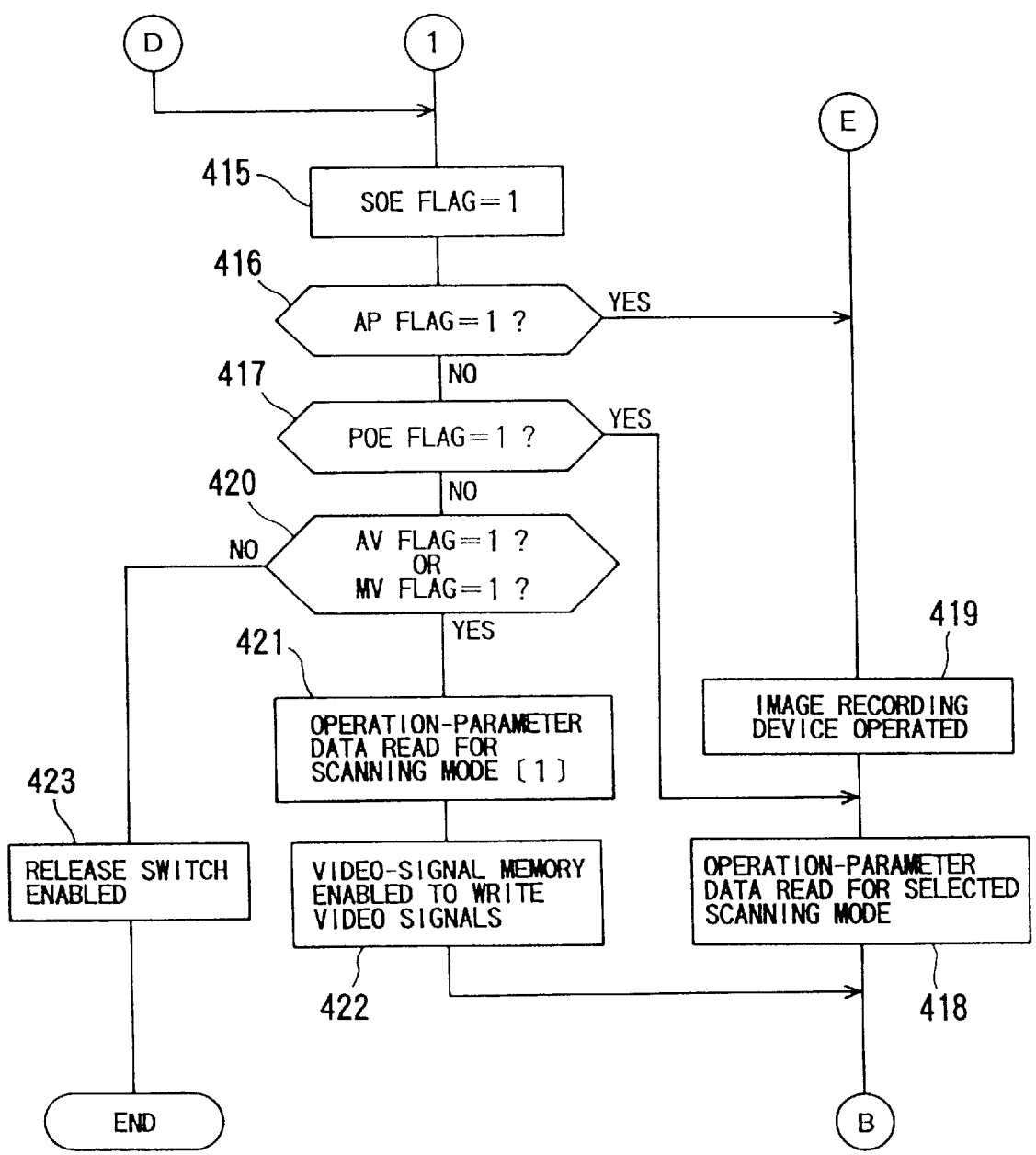
FIG. 27 is yet another part of the flowchart for explaining the whole operation of the electronic still video camera shown in FIG. 6.

When the release switch 14 is depressed and turned ON after the auto-photographing/recording mode is selected by the operation mode selection switch 18, first the photographing operation is executed in substantially the same manner as in the manual photographing mode (MP), but the control proceeds from step 416 to step 419 (FIG. 27).

At step 419, the recording device control circuit 66 is energized to thereby operate the image recording device 67. Then, at step 418, the operation-parameter data necessary for executing the scanning operation in the selected scanning mode [1], [2], [3], [4] or [5] is read from the read-only memory (ROM) of the system control circuit 20.

At step 501, it is determined whether the scanning operation enabling (SOE) flag is "1". If the SOE flag =0, the control proceeds to step 502, in which the SOE flag is set to be "1". At any rate, when the SOE flag is set to be "1", a scanner drive command signal for enabling the execution of the scanning operation is turned ON. Then, at step 503, the shutter 22 is opened, and, at step 504, the light source 42 is turned ON.

Figure 32:
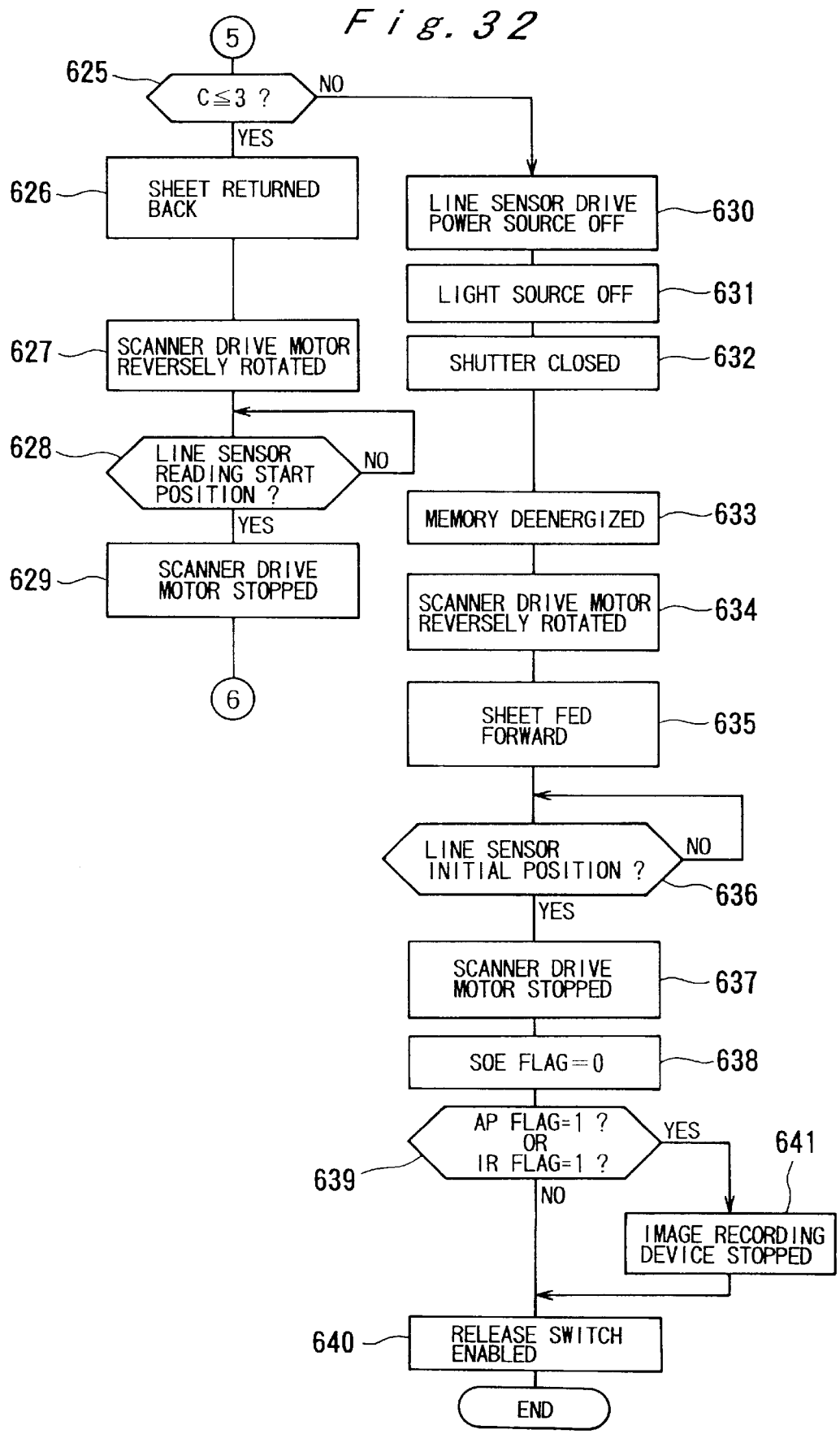
FIG. 32 is still yet another part of the flowchart for explaining the whole operation of the electronic still video camera shown in FIG. 6.
Figure 33:
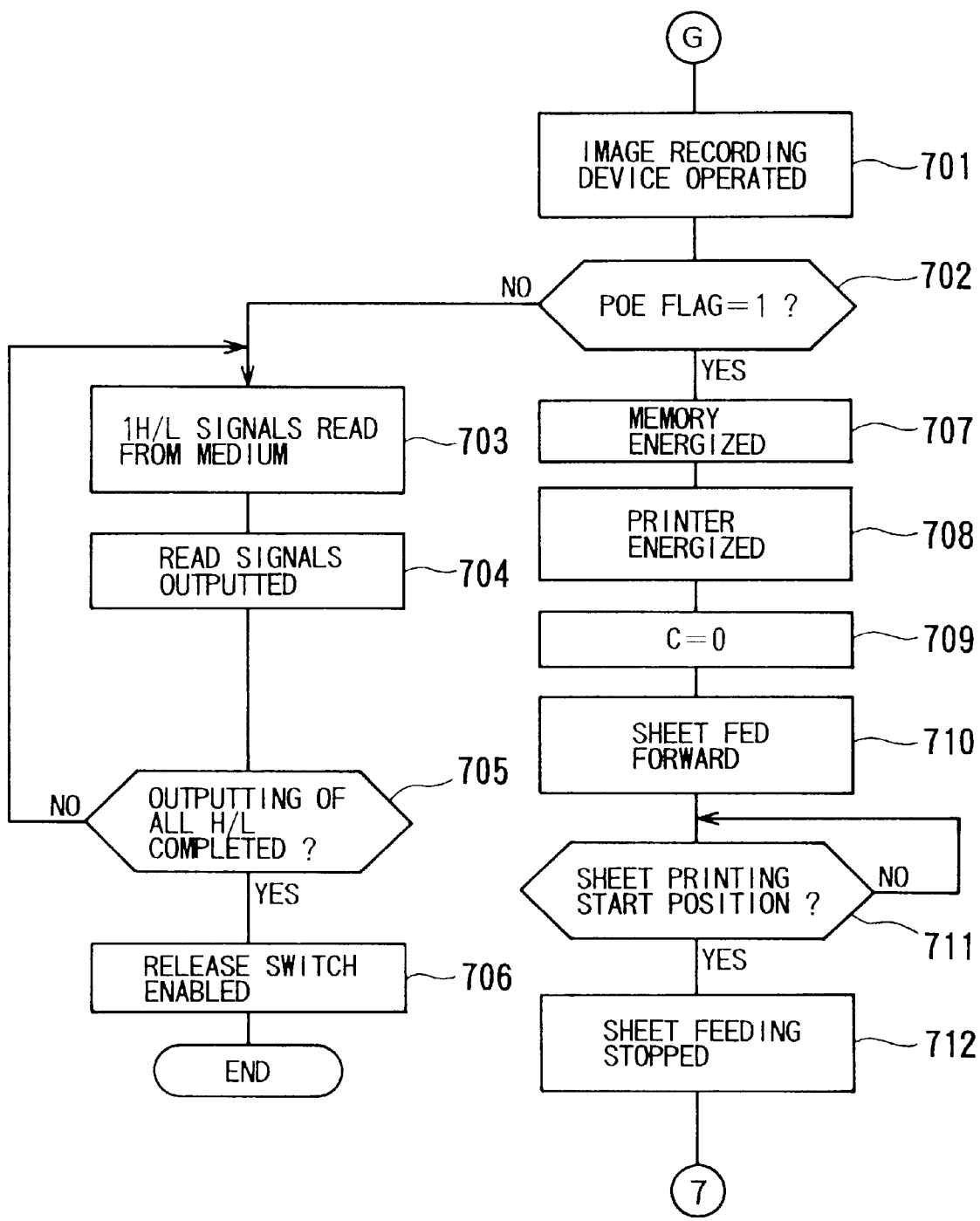
FIG. 33 is still yet another part of the flowchart for explaining the whole operation of the electronic still video camera shown in FIG. 6.

At step 504', it is determined whether the printing operation enabling (POE) flag is set to be "1". If the POE flag=1, the control proceeds from step 504' to step 601 (FIG. 30), and the scanning and printing operations are executed in substantially the same manner as mentioned above. However, in the AP mode, the pixel signals obtained in the scanning operation are recorded on the second recording medium (such as an IC memory card, a floppy disk, a detachable hard disk or the like) in the image recording device 67, and, after a completion of the recording operation, the image recording device 67 is deenergized and disabled at step 641 (FIG. 32).

At step 504', if the POE flag=0, the control proceeds to step 505, in which the scanner drive signal outputted from the system control circuit 20 to the scanner drive circuit 46 is changed from the zero level to the positive levels so that the scan drive motor 55 is driven in a forward direction due to the drive pulses outputted from the scanner drive circuit 46 thereto, whereby the electro-developing recording medium 30 starts to move downward from the upper or initial position toward an image-reading start position. Then, at step 506, a line sensor drive power source included in the line sensor drive circuit 47 is turned ON (reference "U15" in FIG. 23).

At step 507, it is determined whether the electro-developing recording medium 30 has been moved to an image-reading start position, i.e. whether the line sensor 44 has been relatively positioned at the image-reading start position with respect to the electro developing recording medium 30. When the electro-developing recording medium 30 reaches the image-reading start position, the control proceeds to step 508, in which the scanner drive signal outputted from the system control circuit 20 to the scanner drive circuit 46 is returned from the positive level to the zero level, and thus, the output of the drive pulses from the scanner drive circuit 46 to the scan drive motor 55 is interrupted to thereby stop the scan drive motor 65, whereby the electro-developing recording medium 30 is held at the image-reading start position.

At step 509, an exposure of the line sensor 44 is started by the illumination of the light source 42, and thus, electric charge accumulation in the line sensor 44 is performed. Then, at step 510, it is determined whether a given time has elapsed or the electric charge accumulation in the line sensor 44 has been completed. When the electric charge accumulation in the line sensor 44 is completed, the control proceeds to step 511, in which a reading-scan of pixel signals from the line sensor 44, (i.e., a first horizontal-scanning line) is started by the line sensor drive circuit.

At step 512, the scanner drive signal outputted from the system control circuit 20 to the scanner drive circuit 46 is changed from the zero level to the positive level, so that the scan drive motor 55 is driven in the forward direction due to the drive pulses outputted from the scanner drive circuit 46 thereto whereby the electro-developing recording medium 30 is moved downward.

During the movement of the electro-developing recording medium 30, it is determined at step 513 whether the reading-scan of pixel signals from the line sensor 44 has been completed. If the completion of the reading-scan is confirmed, the control proceeds to step 614, in which the reading-scan of pixel signals from the line sensor 44 is stopped. Note that the completion of the reading-scan can be known by, for example, counting reading-clock pulses outputted from the line sensor drive circuit 47 to drive the line sensor 44.

At step 513, if the completion of the reading-scan is not confirmed, the control skips over step 514, and then, the control proceeds to step 515, in which it is determined whether the electro-developing recording medium 30 has been moved so that the line sensor 44 is relatively positioned at a next image-reading position with respect to the electro-developing recording medium 30. Note, the next image-reading position corresponds to a position at which the pixel signals included in a second horizontal scanning line are read. If the electro-developing recording medium 30 has not reached the next image-reading positions the control returns to step 513, and the routine comprising steps 513, 514, and 515 is repeated until the electro-developing recording medium 30 reaches the next image-reading position.

At step 513, if the completion of the reading-scan is confirmed, the control proceeds to step 514, in which the reading-scan of pixel signals from the line sensor 44 is stopped. At step 515, when it is confirmed that the electro-developing recording medium 30 has reached the next image-reading position the control proceeds from step 515 to step 516, in which the scanner drive signal outputted from the system control circuit 20 to the scanner drive circuit 46 is returned from the positive level to the zero levels and thus, the output of the drive pulses from the scanner drive circuit 46 to the scan drive motor 55 is interrupted to thereby stop the scan drive motor 55, whereby the electro-developing recording medium 30 is held at the next image-reading position.

Then, at step 517 (FIG. 29), it is again determined whether the reading-scan of the single-line of pixel signals-from the line sensor 44 has been completed. This is because the control may proceed from step 515 to step 516 without having any access to step 514, i.e., because there may be a case where the reading-scan of the pixel signals from the line sensor 44 is not yet completed even after the electro-developing recording medium 30 reaches the next image-reading position. When the completion of the reading-scan is confirmed at step 517, control proceeds to step 518 (FIG. 29) in which the operation for the reading-scan is stopped.

At step 519, it is determined whether the whole of the developed image has been completely read, i.e., the reading-scans have been completed on all of the horizontal-scanning lines defined by intervals of the intermittent movements of the electro-developing recording medium 30. This determination is made possible by, for example, counting the drive pulses outputted from the scanner drive circuit 46. If the whole of the developed image has not been completely read, the control returns to step 509 (FIG. 28). Namely, the routine comprising steps 509 to 519 is repeated until the reading-scans are completed on all of the horizontal-scanning lines.

The pixel signals read out of the line sensor 44 are amplified by the amplifier 61, and are then converted to digital pixel signals by the A/D converter 62. The digital pixel signals are subjected to a shading correction, a gamma correction and so on by the image processing circuit 63, and are then temporarily stored in the memory 64. Subsequently, the digital pixel signals are read out of the memory 64 through the image processing circuit 63, and are then outputted to the image recording device 67 through the recording device control circuit 66, whereby the digital pixel signals are stored in the second recording medium, such as an IC memory card, a floppy disk, a detachable hard disk or the likes loaded in the image recording device 67. This is because, at step 418, the recording device control circuit 66 is energized to thereby operate the image recording device 67.

At step 519, when the whole of the developed image has been completely read, the control proceeds to step 520, in which the line sensor drive power source included in the line sensor drive circuit 47 is turned OFF. Then, at step 521, the light source 42 is turned OFF, and at step 522, the shutter 22 is closed. Subsequently, at step 523, the scanner drive signal outputted from the system control circuit 20 to the scanner drive circuit 46 is changed from the zero level to the negative level, so that the scan drive motor 55 is driven in a reverse direction due to the drive pulses outputted from the scanner drive circuit 46 thereto, whereby the electro-developing recording medium 30 starts to move upward towards the upper or initial position.

At step 524, it is determined whether the line sensor 44 has been relatively positioned at the initial position with respect to the electro-developing recording medium 30. When the electro-developing recording medium 30 reaches the initial position, the control proceeds to step 525, in which the scanner drive signal outputted from the system control circuit 20 to the scanner drive circuit 46 is returned from the negative level to the zero level, and thus, the output of the drive pulses from the scanner drive circuit 46 to the scan drive motor 55 is stopped, i.e., the scan drive motor 55 is stopped, whereby the electro-developing recording medium 30 is held at the upper or initial position thereof. The standing still of the electro-developing recording medium 30 at the initial position may be known by detecting a part of the electro-developing recording medium 30 with, for example, a photo-interrupter type detector (not shown).

At step 526, the scanning operation enabling (SOE) flag is reset to be "0" to thereby disable the scanning operation. Then, the control proceeds to step 527, in which it is determined whether one of the AV or MV flags is "1". At this stages since both the AV and MV flags are "0", the control proceeds from 527 to step 528, in which it is determined whether one of the AP and IR flags is "1". At this stage, since the AP flag=1, the control proceeds to step 529, in which the drive signal outputted from the recording device control circuit 66 to the image recording device 67 is turned OFF, so that the storage of pixel signals in the second recording medium is disabled. Then, the control proceeds to step 530, in which the release switch 14 is enabled. Then, this routine is ended, i.e., the operation based upon the auto-photographing/recording mode (AP) is finished.

When the release switch 14 has been turned ON after the image-recording mode (IR) is selected by the operation mode selection switch 18 (the IR flag=1), the scanning operation is executed, such that the pixel signals read from the electro-developing recording medium 30 are stored in the second recording medium, such as an IC memory card, a floppy disk, a detachable hard disk or the like, loaded in the image recording device 67, as mentioned above.

In particular, the routine comprising steps 301 to 306 is carried out in the same manner as in the manual photographing mode (MP), but the control proceeds from step 307 to step 308, because all of the AP, MV, and AV flags are "0". At step 307, it is determined whether one of the EO1 flag or the EO2 flag is "1". At this stage, since the EO1 and EO2 flags=0, the control proceeds to step 309, in which it is determined whether the IE flag is "1". At this stage, since the IE flag=0, the control proceeds to step 310, in which it is determined whether the MV flag is "1". At this stage, since the MV flag=0, the control proceeds to step 311, in which it is determined whether the IR flag is "1". At this stage, since the IR flag=1, the control proceeds from step 311 to step 419 (FIG. 27). Accordingly, the routine comprising the sequential steps for executing the scanning operation is executed in the same manner as in the auto-photographing/recording mode (AP), and the pixel signals read out of the image recorded and developed in the electro-developing recording medium 30 are stored in the second recording medium loaded in the image recording device 67. Thus, this routine is ended, i.e., the operation based upon the image-recording mode (IR) is finished.

In the IR mode, if the POE flag is set to be "1", the control proceeds from step 504' (FIG. 28) to step 601 (FIG. 30), and the scanning and printing operations are executed in substantially the same manner as mentioned above. However, in the IR mode, similar to the case of the AP mode, the pixel signals obtained in the scanning operation are recorded on the second recording medium (such as an IC memory card, a floppy disk, a detachable hard disk or the like) in the image recording device 67, and, after a completion of the recording operation, the image recording device 67 is deenergized and disabled at step 641 (FIG. 32).

When the release switch 14 has been turned ON after the first externally-outputtng mode (EO1) is selected by the operation mode selection switch 18, only an execution of the scanning operation is carried out such that the pixel signals read from the electro-developing recording medium 30 signals are transfered to the personal computer 81, as mentioned above. Namely, the scanning operation is executed in the same manner as in the auto-photographing/recording mode (AP), except that the pixel signals read from the electro-developing recording medium 30 are transfered to the personal computer 81 without recording the pixel signals in the second recording medium loaded in the image recording device 67.

In particular, the routine comprising steps 301 to 307 is executed in the same manner as in the image-recording (IR)

modes and the control proceeds from step 308 to step 317, because of the EO1 flag=1. At step 317, it is determined whether the interface connector 81a is connected to the output terminal connector 17a, and this determination is possible in the manner as explained above with reference to FIGS. 17 and 18; FIGS. 19 and 20; and FIG. 21.

If the connection of the interface connector 81a to the output terminal connector 17a is not detected, the control proceeds from step 317 to step 312, in which the release switch 14 is enabled. Thus, this routine is ended, i.e., the operation based upon the first externally-outputting mode (EO1) is erroneously finished.

If the connection of the interface connector 81a to the output terminal connector 17a is detected, the control proceeds from step 317 to step 318, in which it is determined whether an input or connection of the external power source is detected by the external power-input detecting circuit 87 of the main power source circuit 77. If the input or connection of the external power source is not detected, the control proceeds from step 318 to step 312, in which the release switch 14 is enabled. Namely, in this case, the operation based upon the first externally-outputting mode (EO1) also is erroneously finished. This is because the electric power necessary for the transfer of the pixel signals to the personal computer 81 is relatively large, resulting in prematurely consuming the internal battery 85, and because the transfer of the pixel signals to the personal computer 81 may be interrupted due to the premature consumption of the internal battery 85. Accordingly, the external power source should be connected to the power source circuit 77 (FIG. 22) before the transfer of the pixel signals to the personal computer 81 can be ensured.

If the input or connection of the external power source is detected, the control proceeds from step 318 to step 319, in which it is determined whether the EO1 flag is set to be "1". At this stage, since the EO1 flag=1, the control proceeds to step 320, in which the operation-parameter data necessary for executing the scanning operation in the selected scanning mode [1], [2], [3], [4] or [5] is read from the read-only memory (ROM) of the system control circuit 20. Then, the control proceeds from step 320 to step 501 (FIG. 28), and the scanning operation is carried out in the same manner as in the auto-photographing/recording mode (AP), except that the pixel signals read from the electro-developing recording medium 30 are transferred to the personal computer 81. After the execution of the scanning operation is completed at step 525, the routine comprising steps 526 and 527 is also executed in the same manner as in the auto-photographing/recording mode (AP), but the control proceeds from step 528 to step 530. Thus, this routine is ended, i.e., the operation based upon the first externally-outputting mode (EO1) is finished. In the EO1 mode, if the POE flag is set to be "1", the control proceeds from step 504' (FIG. 28) to step 601 (FIG. 30), and the scanning and printing operations are executed in substantially the same manner as the case of the IR mode.

When the release switch 14 has been turned ON after the second externally-outputting mode (EO2) is selected by the operation mode selection switch 18, the routine comprising steps 301 to 308, and steps 317 and 318 is executed in the same manner as the first externally-outputting mode (EO1).

At step 319, it is determined whether the EO1 flag is set to be "1". At this stage, since the EO1 flag=0, the control proceeds from 319 to step 701 (FIG. 33), in which a recording-device driving signal is turned ON (reference "V103" in FIG. 24) by outputting a printer driving command signal (reference "V101" in FIG. 24). Namely, the recording device control circuit 66 is energized to thereby operate the image recording device 67. At step 702, it is determined whether the POE flag is set to be "1". If the POE flag=0, the control proceeds to step 703, in which a single horizontal-scanning line of pixel data is read from the second recording medium (such as an IC memory card, a floppy disk, a detachable hard disk or the like) loaded in the image recording device 67. Then, at step 704, the read pixel data is transferred to the personal computer 81.

At step 705, it is determined whether all of the horizontal-scanning lines of pixel data are read from the second recording medium, and are outputted to the personal computer 81. Unless the outputting of all the pixel data is completed, the control returns to step 703. When the completion of the outputting of all the pixel data is confirmed, the control proceeds to step 706, in which the release switch 14 is enabled. Thus, this routine is ended, i.e., the operation based upon the first externally-outputting mode (EO2) is finished. Note, the first-read pixel data possesses blue image infromation; the second-read pixel data possesses green image infromation; and the third-read pixel data possesses blue read information, and this regular reading-order is repeated until the outputting of all the pixel data is completed.

When the POE flat is set to be "1", the control proceeds from step 702 to step 707, in which the memory 64 is energized such that a writing/reading of data is enabled. At step 708, a printer driving signal for driving the printer 406 is turned ON (reference "V105" in FIG. 24), whereby the printer 406 is energized such that a printing is enabled. Then, at step 709, the counter C is reset to be "0".

At step 710, a cut sheet paper CS is introduced from the paper station into a nip between the printing head 411 and the platen 412. At step 711, it is determined whether the cut sheet paper CS is fed to a printing start position thereof. When the cut sheet paper CS reaches the printing start position, the control proceeds to step 712, in which the feeding of the cut sheet paper CS is stopped.

At step 713, a first horizontal-scanning line of blue pixel data is read from the second recording medium (such as an IC memory card, a floppy disk, a detachable hard disk or the like) loaded in the image recording device 67. Then, at step 714, the read blue pixel data is transferred to the memory 64, and is temporarily stored therein. At step 715, it is determined whether a set of blue, green, and red pixel data is read from the second recording medium, and are transfered to the memory 64. Unless the transfer of the blue, green, and red pixel data is completed, the control returns to step 713.

At step 715, when the transfer of the set of blue, green, and red pixel data to the memory 64 is completed and confirmed (reference "111" in FIG. 24), the control proceeds to step 716, in which the single horizontal-scanning line of blue pixel data, the single horizontal-scanning line of green pixel data, and the single horizontal-scanning line of red pixel data are successively read from the memory 64, and are then transferred to the printing data generator 405. At step 717, a signal horizontal-scanning line of cyan pixel data is produced as a printing data from the read blue, green, and red pixel data, and is outputted from the printing data generator 405 to the thermal printing head 411, whereby a printing is made on the cut sheet paper CS on the basis of the signal horizontal-scanning line of cyan pixel data (reference "$P_{14}$" in FIG. 24).

When the printing based upon the single-horizontal line of cyan data is completed, the control proceeds to step 718, in which the cut sheet paper CS is fed by a given pitch (reference "V117" in FIG. 24). Then, at step 719, it is determined whether a single-frame of pixel data (i.e., all of the horizontal-scanning lines of pixel data) has been completely read and outputted from the second recording medium loaded in the image recording device 67. If the outputting of the single-frame of pixel data from the second recording medium is not completed, the control returns from step 719 to step 713. Namely, the routine comprising steps 713 to 719 is repeated until the outputting of the single-frame of pixel data from the second recording medium is completed. Thus, the printings are successively made on the cut sheet paper CS (reference "$P_{12}$" . . . "$P_{1M}$" in FIG. 24), and a single-frame of cyan image is printed and reproduced on the cut sheet paper CS.

Figure 34:
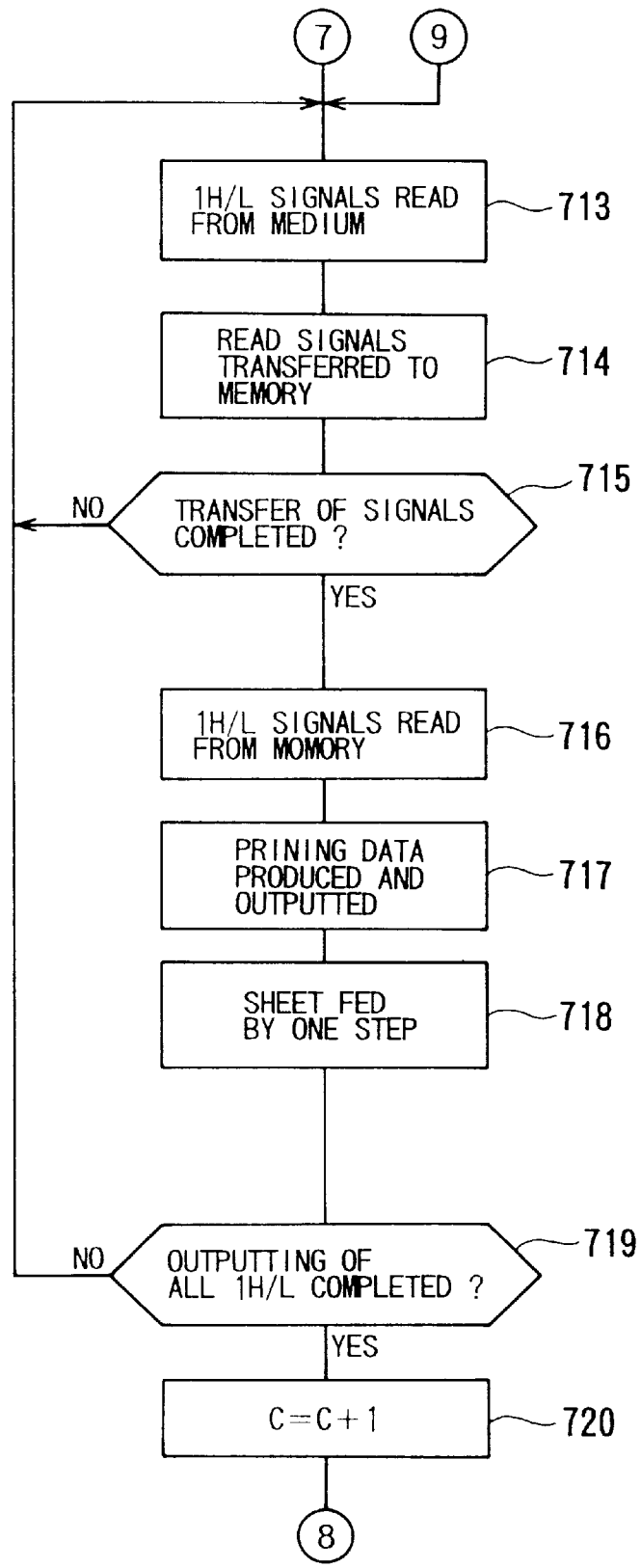
FIG. 34 is still yet another part of the flowchart for explaining the whole operation of the electronic still video camera shown in FIG. 6.
Figure 35:
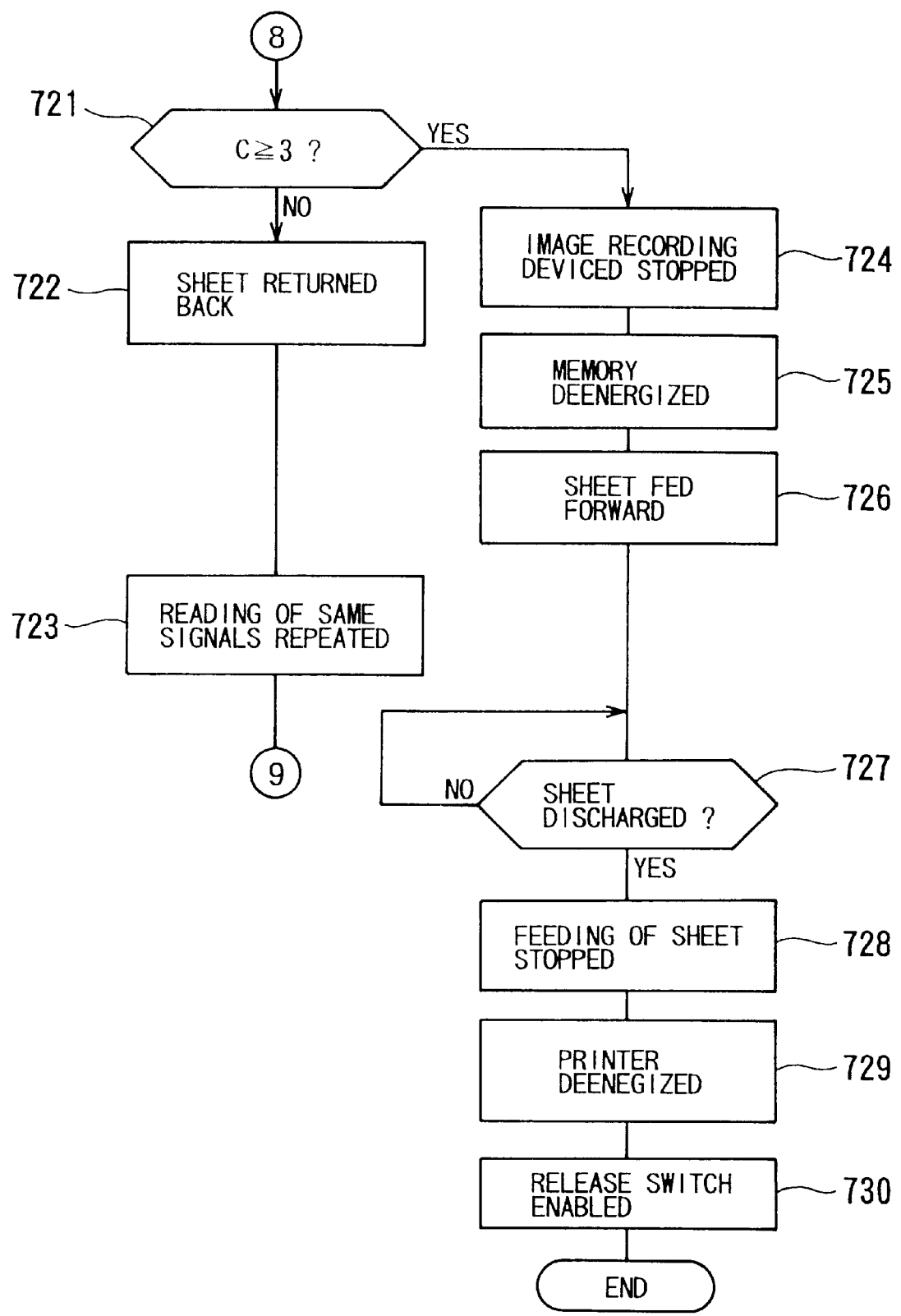
FIG. 35 is still yet another part of the flowchart for explaining the whole operation of the electronic still video camera shown in FIG. 6.
Figure 36:
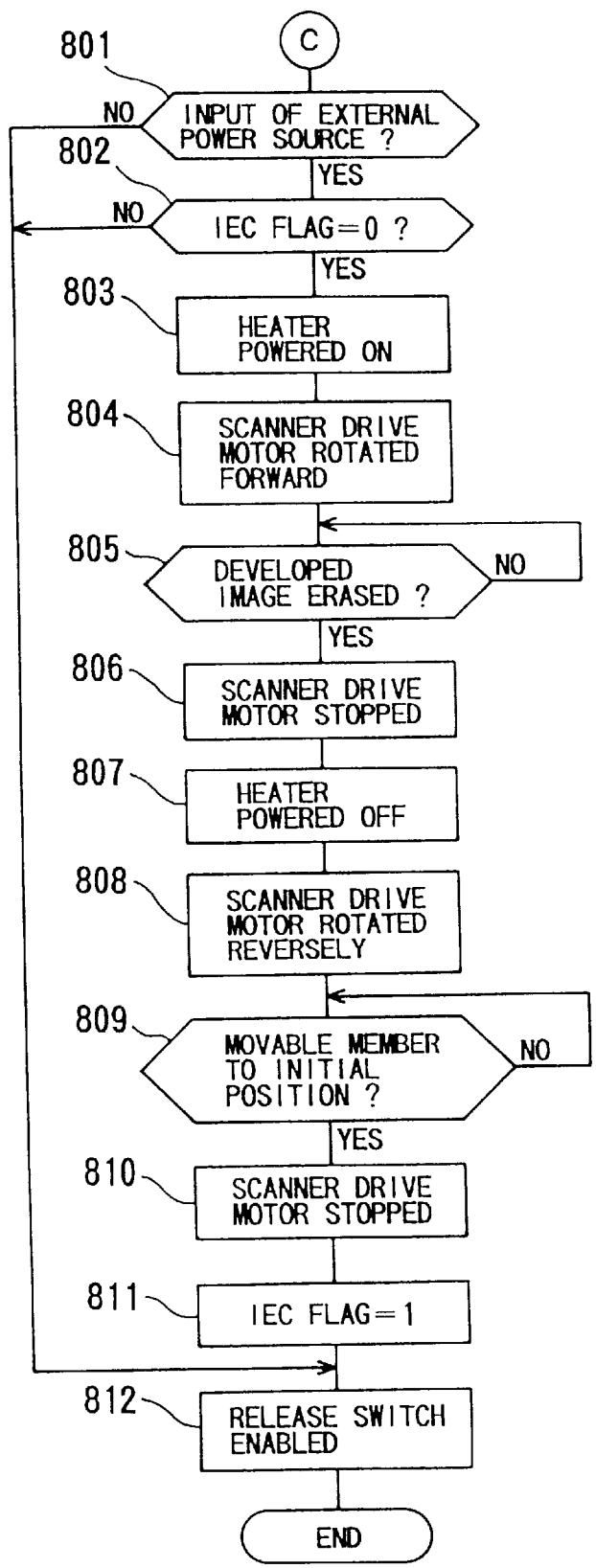
FIG. 36 is a remaining part of the flowchart for explaining the whole operation of the electronic still video camera shown in FIG. 6.

When the outputting of the single-frame of pixel data from the second recording medium is completed, the control proceeds from step 719 to step 720 (FIG. 35), in which the counter C is incremented by 1. Then, the control proceeds to step 721, in which it is determined whether a count number of the counter C is equal to or less than 3. At this stage, since C=1, the control proceeds to step 722, in which the cut sheet paper CS carrying the cyan image printed thereon is returned back to the printing start position (reference "V119" and "V121" in FIG. 24). Note, during the return of the cut sheet paper CS to the printing start position, the platen 412 is moved from the operative position (FIG. 8) to the removal position, and the ink ribbon web 415 is drawn out of the roll 471, such that the yellow zone thereof is positioned at the printing position. After the cut sheet paper CS reaches the printing start position, the control proceeds to step 723, in which the image reading device 67 is again operated, such that the same pixel data are read from the second recording medium loaded therein. Then, the control returns to step 713 (FIG. 34).

Accordingly, the printings are successively made on the cut sheet paper CS carrying the cyan image in substantially the same manner as mentioned above, but the printed image is reproduced as an yellow image. Namely, at step 717, a signal horizontal-scanning line of yellow pixel data is produced as a printing data from the read blue, green, and red pixel data in the printing data generator 405, and is outputted to the thermal printing head 411, whereby a printing is made on the cut sheet paper CS carrying the cyan image, on the basis of the signal horizontal-scanning line of yellow pixel data (reference "$P_{12}$" in FIG. 24). Thereafter, the control proceeds from step 719 to step 720, in which the counter C is incremented by 1. Then, the control proceeds to step 721, in which it is determined whether a count number of the counter C is equal to or less than 3. At this stage, since C=2, the control proceeds to step 722, in which the cut sheet paper CS carrying the cyan and yellow images printed thereon is again returned back to the printing start position. Note, during the return of the cut sheet paper CS to the printing start position, the platen 412 is moved from the operative position (FIG. 8) to the removal position, and the ink ribbon web 415 is drawn out of the roll 471, such that the magenta zone thereof is positioned at the printing position. After the cut sheet paper CS reaches the printing start position, the control proceeds to step 723, in which the image reading device 67 is further operated such that the same pixel data are read from the second recording medium loaded therein. Then, the control returns to step 713 (FIG. 34).

Accordingly, the printings also are successively made on the cut sheet paper CS carrying the cyan and yellow images in substantially the same manner as mentioned above, but the printed image is reproduced as an magenta image.

Namely, at step 717, a signal horizontal-scanning line of magenta pixel data is produced as a printing data from the read blue, green, and red pixel data in the printing data generator 405, and is outputted to the thermal printing head 411, whereby a printing is made on the cut sheet paper CS carrying the cyan and yellow images, on the basis of the signal horizontal-scanning line of magenta pixel data. Thereafter, the control proceeds from step 719 to step 720, in which the counter C is incremented by 1. Then, the control proceeds to step 723, in which it is determined whether a count number of the counter C is equal to or less than 3. At this stage, since C=3, the control proceeds to step 722, in which the cut sheet paper CS carrying the cyan, yellow, and magenta images printed thereon is yet further returned back to the printing start position. Note, during the return of the cut sheet paper CS to the printing start position, the platen 412 is moved from the operative position (FIG. 8) to the removal position, and the ink ribbon web 41B is drawn out of the roll 471, such that the black zone thereof is positioned at the printing position. After the cut sheet paper CS reaches the printing start position, the control proceeds to step 723, in which the image reading device 67 is yet further operated such that the same pixel data are read from the second recording medium loaded therein. Then, the control returns to step 713 (FIG. 34).

Thus, the printings are yet further successively made on the cut sheet paper CS carrying the cyan, yellow, and magenta images in substantially the same manner as mentioned above, but the printed image is reproduced as a black image. Namely, at step 717, a single horizontal line of black data is produced as a printing data from the read blue, green, and red pixel data in the printing data generator 405, and is outputted to the thermal printing head 411, whereby a printing is made on the cut sheet paper CS carrying the cyan, yellow, and magenta images, on the basis of the signal horizontal-scanning line of black pixel data (reference "$P_{3M}$" in FIG. 24). At this moment, a full color image reproduction is completed on the cut sheet paper CS. Thereafter, the control proceeds from step 719 to step 720, in which the counter C is incremented by 1. Then, the control proceeds to step 721, in which it is determined whether a count number of the counter C is equal to or less than 3. At this stages since C=4, the control proceeds from step 721 to step 724.

At step 724, the recording-device driving signal is turned OFF (reference "V124" in FIG. 24), and, at step 725, the memory 64 is deenergized such that the writing/reading of data is disabled. Then, at step 726, the cut sheet paper CS carrying the full color image is fed forward (reference "V127" in FIG. 24). At step 727, it is confirmed that the cut sheet paper CS is discharged from the discharge port 402, and then, at step 728, the feeding of the cut sheet paper CS is stopped. At step 729, the printer driving signal is turned OFF (reference "V129" in FIG. 24), and then the printer 406 is deenergized. At step 703, the release switch 14 is enabled. Thus the routine is ended, i.e., the operation based upon the second externally-outputting mode (EO2) is finished.

When the release switch 14 has been turned ON after the auto-video-monitor mode (AV) is selected by the operation mode selection switch 18, the photographing operation is executed, and then, the scanning operation is executed, such that the pixel signals read from the electro-developing recording medium 30 are processed in and are transfered from the video signal outputting circuit 74 to the TV monitor 82, as mentioned above.

In particular, in the auto-video-monitor mode (AV), the routine comprising steps 301 to 307, and step 313 is executed in the same manner as in the manual photographing mode (MP), but the control proceeds from step 314 to step 315, because the AV flag=1. At step 314, it is determined whether the interface connector 82a is connected to the output terminal connector 17b, and this determination is possible in the manner explained above with reference to FIGS. 17 and 18; FIGS. 19 and 20; and FIG. 21.

If the connection of the interface connector 82a to the output terminal connector 17b is not detected, the control proceeds from step 315 to step 312, in which the release switch 14 is enabled. Thus, this routine is ended, i.e., the operation based upon the auto-video-monitor mode (AV) is erroneously finished.

If the connection of the interface connector 82a to the output terminal connector 17b is detected, the control proceeds from step 315 to step 316, in which it is determined whether an input or connection of the external power source is detected by the external power-input detecting circuit 87 of the main power source circuit 77. If the input or connection of the external power source is not detected, the control proceeds from step 316 to step 312, in which the release switch 14 is enabled. Namely, in this case, the operation based upon the auto-video-monitor mode (AV) is erroneously finished. This is because the electric power necessary for the transfer of the video signals to the TV monitor 82 is relatively large, resulting in prematurely consuming the internal battery 85, and because the transfer of the video signals to the TV monitor 82 may be interrupted due to the premature consumption of the internal battery 85. Accordingly, the external power source should be connected to the power source circuit 77 before the transfer of the video signals to the TV monitor 82 can be ensured.

If the input or connection of the external power source is detected, the control proceeds from step 316 to step 401 (FIG. 26), and the routine comprising the sequential steps for executing the photographing operation is carried out in the same manner as in the case of the manual photographing mode (MP). After the photographing operation is completed, the control proceeds to step 415 (FIG. 27), in which the scanning operation enabling (SOE) flag is set to be "1" to thereby enable the scanning operation.

Then, at step 416, it is determined whether the auto photographing/recording (AP) flag is "1". At this stage, since the AP flag=0, the control proceeds from step 416 to step 417. At step 417, it is determined whether the printing operation enabling (POE) flag is set to be "1". In the AV mode, since the POE flag is reset to be "0" the control proceeds from step 417 to step 420, in which it is determined whether one of the AV or MV flags is "1". At this stage, since the AV flag=1, the control proceeds from step 420 to step 421, in which the operation-parameter data necessary for executing the scanning operation in the scanning mode [1] is read from the read only memory (ROM) of the system control circuit 20. As mentioned above, the scanning mode [1] is suitable for reproduction of the image on the TV monitor 82, and thus, the scanning mode [1] must be selected whenever performing the reproduction of the image on the TV monitor 82. Then, at step 422, a writing of video signals in a video-signal memory included in the video signal outputting circuit 74 is enabled.

Subsequently, the control proceeds from step 422 to step 501 (FIG. 28). Accordingly, the routine comprising the sequential steps for executing the scanning operation is carried out in the same manner as in the auto-photographing/recording mode (AP), except that the pixel signals read from the electro-developing recording medium 30 cannot be stored in the second recording medium, such as an IC memory, a floppy disk, a detachable hard disk or the like, loaded in the image recording device 67. Namely, the pixel signals read from the electro-developing recording medium 30 are successively converted into video signals, and are then written in the video-signal memory of the video signal outputting circuit 74. As soon as the reading of the pixel signals from the line sensor 44 and the conversion of the read pixel signals into the video signals are carried out, the writing of the video signals in the video-signal memory of the video signal outputting circuit 74 is performed on the basis of clock pulses outputted from the recording device control circuit 66. After the reading of the pixel signals from the electro-developing recording medium 30 and the writing of the video signals in the video-signal memory of the video signal outputting circuit 74 are completed, the routine comprising steps 520 to 526 are carried out in the same manner as in the auto-photographing/recording mode (AP).

At step 527, when it is determined whether one of the AV or MV flags is "1", the control proceeds from step 527 to step 531, because of the AV flag=1. At step 531, the video signal outputting circuit 74 is energized, and then, at step 532, the video signals are outputted from the video-signal memory of the video signal outputting circuit 74 to the TV monitor 82 through the output terminal connector 17b, the interface connector 82a, and the cable extended therefrom (reference "S63" in FIG. 24), to thereby carry out a reproduction of the image on the TV monitor 82. Then, the control proceeds from step 532 to step 530, in which the release switch 14 is enabled. Thus, this routine is ended, i.e., the operation based upon the auto-video-monitor mode (AV) is finished.

When the release switch 14 has been turned ON after the manual-video-monitor mode (MV), the scanning operation is executed such that the read pixel signals are processed in and are transfered from the video signal outputting circuit 74 to the TV monitor 82, as mentioned above.

In particular, the routine comprising steps 301 to 309 are executed in the same manner as in the image-recording mode (IR), and the routine proceeds from step 310 to step 321, in which it is determined whether the interface connector 82a is connected to the output terminal connector 17b, and this determination is possible in the manner as explained above with reference to FIGS. 17 and 18; FIGS. 19 and 20; and FIG. 21.

If the connection of the interface connector 82a to the output terminal connector 17b is not detected, the control proceeds from step 321 to step 312, in which the release switch 14 is enabled. Thus, this routine is ended, i.e., the operation based upon the auto-video-monitor mode (AV) is erroneously finished.

If the connection of the interface connector 82a to the output terminal connector 17b is detected, the control proceeds from step 321 to step 322 in which it is determined whether an input or connection of the external power source is detected by the external power-input detecting circuit 87 of the main power source circuit 77. If the input or connection of the external power source is not detected, the control proceeds from step 322 to step 312, in which the release switch 14 is enabled. Namely, in this cases the operation based upon the auto-video-monitor mode (AV) is erroneously finished. As was already stated in the descriptions of the auto-video-monitor mode (AV), the electric power necessary for the transfer of the video signals to the TV monitor 82 is relatively large, resulting in prematurely consuming the internal battery 85, and the transfer of the video signals to the TV monitor 82 may be interrupted due to the premature consumption of the internal battery 85. Accordingly, the external power source has to be connected to the power source circuit 77 before the transfer of the video signals to the TV monitor 82 can be ensured.

If the input or connection of the external power source is detected, the control proceeds from step 322 to step 415 (FIG. 27), in which the scanning operation enabling (SOE) flag is set to be "1" to thereby enable the scanning operation. Accordingly, the routine comprising the sequential steps for executing the scanning operation is carried out in the same manner as in the auto-video-monitor mode (AV), and then the routine comprising steps 520 to 526 are also carried out in the same manner.

At step 527, when it is determined whether one of the AV and MV flags is "1", the control proceeds from step 527 to step 531, because of the MV flag=1. Then, the reproduction of the image is carried out in the same manner as in the auto-video-monitor mode (AV). Thus, this routine is ended, i.e., the operation based upon the manual-video-monitor mode (MV) is finished.

When the release switch 14 has been turned ON after the image-erasing mode (IE), an execution of the image-erasing operation is carried out to thermally erase a recorded and developed image from the electro-developing recording medium 30 by moving the movable member 52 carrying the electric heater element 75a.

In particular, the routine comprising steps 301 to 308 is executed in the same manner as in the image-recording mode (IR), and the control proceeds from step 309 to step 801 (FIG. 36), because of the IE flag=1.

At step 801, it is determined whether an input or connection of the external power source is detected by the external power-input detecting circuit 87 of the main power source circuit 77. If the input or connection of the external power source is not detected, the control proceeds from step 801 to step 812 in which the release switch 14 is enabled. Thus, this routine is ended, i.e., the operation based upon the image-erasing mode (IE) is erroneously finished. This is because the electric power necessary for the image-erasing operation is very large due to the use of the electric heater element 75a, resulting in prematurely consuming the internal battery 85. Accordingly, the external power source should be connected to the power source circuit 77 before the service life of the internal power battery 85 can be prolonged. Nevertheless, the step 801 may be eliminated from the flowchart of FIG. 30, so that the image-erasing operation can be executed whenever it is desired.

At step 801, if the input or connection of the external power source is detected, the control proceeds from step 801 to step 802, in which it is determined whether the image-erasing completion (IEC) flag is "0", i.e., whether the electro-developing recording medium 30 has an image recorded and developed therein. If the IEC flag=0, i.e., if the image-erasing operation has been already executed, the control proceeds from step 802 to step 812, in which the release switch 14 is enabled.

At step 802, if the IEC flag=1, the control proceeds from step 802 to step 803, in which the electric heater element 75a of the thermal erasing device 75 (FIG. 16) is powered ON, i.e., the transistor switch "T" is made ON to thereby electrically energize the electric heater element 75a. Then, the control proceeds to step 804, in which a scanner drive signal outputted from the system control circuit 20 to the scanner drive circuit 46 is changed from the zero level to the positive level, so that the scan drive motor 55 is driven in a forward direction due to the drive pulses outputted from the scanner drive circuit 46 thereto, whereby the electro-developing recording medium 30 starts to move downward from the upper or initial position.

At step 805, it is determined whether the image area 30a of the electro-developing recording medium 30 has been entirely scanned with the thermal radiation emitted from the electric heater element 75a, to thereby erase a recorded and developed image from the recording area thereof. This determination can be carried out by, for example, counting the driving pulses outputted from the scanner drive circuit 46 to the scan drive motor 55. If the image has been thermally erased from the electro-developing recording medium 30, the control proceeds to step 806, in which the scanner drive signal outputted from the system control circuit 20 to the scanner drive circuit 46 is returned from the positive level to the zero level, and thus the output of the drive pulses from the scanner drive circuit 46 to the scan drive motor 55 is stopped i.e., the scan drive motor 55 is stopped.

At step 807, the electric heater element 75a of the thermal erasing device 75 is powered OFF, i.e., the transistor switch "T" is made OFF. Then, the control proceeds from step 807 to step 808, in which the scanner drive signal outputted from the system control circuit 20 to the scanner drive circuit 46 is changed from the zero level to the negative level, whereby the electro-developing recording medium 30 is reversely moved toward the upper or initial position.

At step 809, it is determined whether the electro-developing recording medium 30 has been moved to the initial positions if the electro-developing recording medium 30 reaches the upper or initial position, the control proceeds from step 809 to step 810, in which the scanner drive signal outputted from the system control circuit 20 to the scanner drive circuit 46 is returned from the negative level to the zero level, and thus, the output of the drive pulses from the scanner drive circuit 46 to the scan drive motor 56 is stopped, i.e., the scan drive motor 55 is stopped. Subsequently, the control proceeds to step 811, in which the image-erasing flag (IEC) is set to be "1". Then, the control proceeds to step 812, in which the release switch 14 is enabled.

Thus, this routine is ended, i.e., the operation based upon the image-erasing mode is finished.

In the second embodiment mentioned aboves in addition to the image-erasing completion (IEC) flag, a photographing-operation completion (POC) flag may be used. In this case, whenever the photographing-operation is completed, the POC flag is set to be "1" and the IEC flag is reset to be "0" (step 414), and, whenever the image-erasing operation is completed, the POC flag is reset to be "0" and the IEC flag is set to be "1" (step 811).

Figure 37:
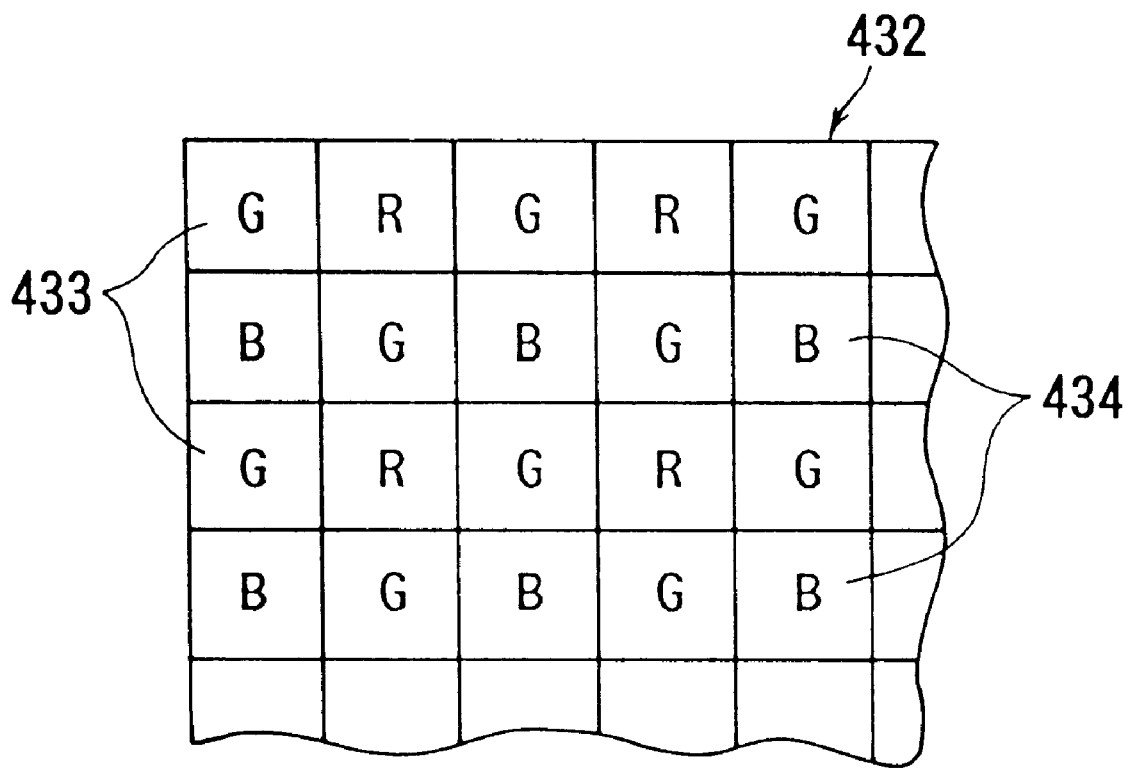
FIG. 37 is an enlarged schematic view showing a part of a regular arrangement of different color filter elements of another color filter.

FIG. 37 shows another three-primary-color filter 432 which may be substituted for the three-primary-color filter 431. This color filter 432 includes a plurality of color filter elements having different colors and regularly arranged in a matrix-like manner. In this embodiment, as shown in FIG. 5, the color film 71a is constituted as a three-primary-color film including a plurality of three different color filter elements corresponding to red, green, and blue indicated by references R, G, and B, and the color filter elements R, G, and B are regularly arranged. Namely, in each of the odd lateral rows 433 of the matrix arrangement, the green and red filter elements G and R are alternately arranged, and, in each of the even lateral rows 434 of the matrix arrangement, the green and blue filter elements G and B are alternately arranged. The pitch of the lateral arrangement of the color filter elements in each of the lateral rows is consistent with and correspond to that of the pixel-arrangement of the one-dimensional CCD line sensor 44, and thus, the color image information can be properly sensed and read by the line sensor 44.

With the arrangement of the color filter elements as shown in FIG. 37, cyan pixel data, yellow pixel data, magenta pixel data, and black data can be produced a printing data from pixel signals included in two adjacent horizontal-scanning lines corresponding to two adjacent lateral rows of the color filter 432. Note, in the filter element 431 used in the second embodiment, pixel signals included in three adjacent horizontal-scanning lines corresponding to three color stripe-like filter elements (R, G, B) must be used before cyan pixel data, yellow pixel data magenta pixel data, and black data can be produced a printing data.

Figure 38:
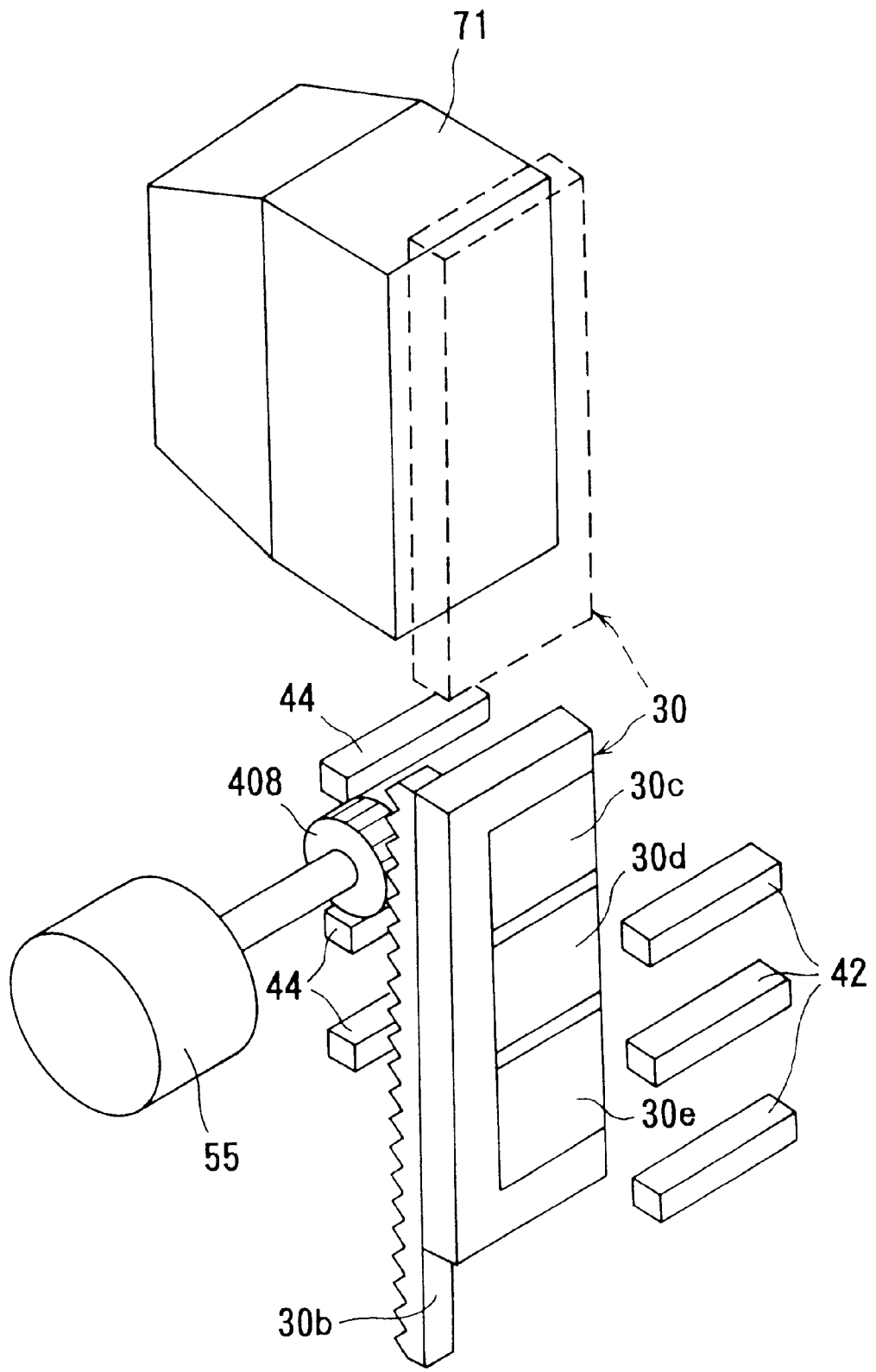
FIG. 38 is a schematic perspective view showing a scanning mechanism and a color-separation prism used in a third embodiment of an electronic still video camera according to the present invention.
Figure 39:
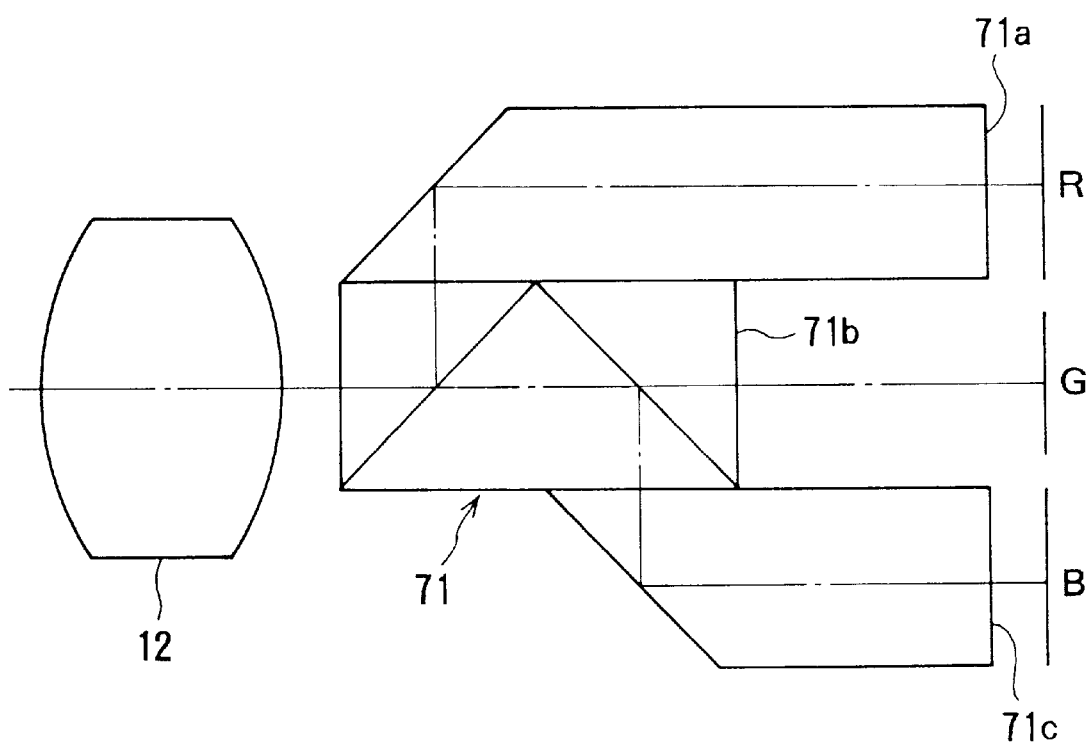
FIG. 39 is a schematic view showing the color-separation prism shown in FIG. 38.

FIG. 38 shows a third embodiment of an electronic still video camera according to the present invention. In this third embodiment, a color-separation prism 71 is used to separate an optical image into a red image component, a green image component, and a blue image component. As shown in FIG. 39, the color-separation prism 71 comprises a plurality of prism elements arranged and constituted so as to present a red light-admitting surface 71a, a green light-emitting surface 71b, and a blue light-emitting surface 71c. An optical image obtained by the photographing optical system 12 is separated by the color-separation prism 71 into the red image component, green image component, and blue image component, and these color image components are projected from the light-emitting surfaces 71a, 71b, and 71c, respectively.

As shown in FIG. 38, the electro-developing recording medium 30 is constituted as having three image area sections 30c, 30b, and 30d, and these image area sections 30c, 30b, and 30d are aligned and registered with the light-emitting surfaces 71a, 71b, and 71c of the prism 71, respectively, when the electro-developing recording medium 30 is positioned at the upper or intial position (shown by a broken line in FIG. 38). Thus, in the photographing operation, the red image component, green image components and blue image component are recorded and developed on the image area sections 30c, 30b, and 30d of the medium 30.

In the third embodiment, the camera is provided with three light sources 42 and three line sensors 44 aligned with each other, respectively. Note, although not shown in FIG. 38, three scanning optical systems (43) are provided between the light sources 42 and a moving path for the electro-developing recording medium 30.

According to the third embodiment, it can be easily understood that it is possible to reproduce the recorded and developed image of the medium 30 at high resolution.

Figure 40:
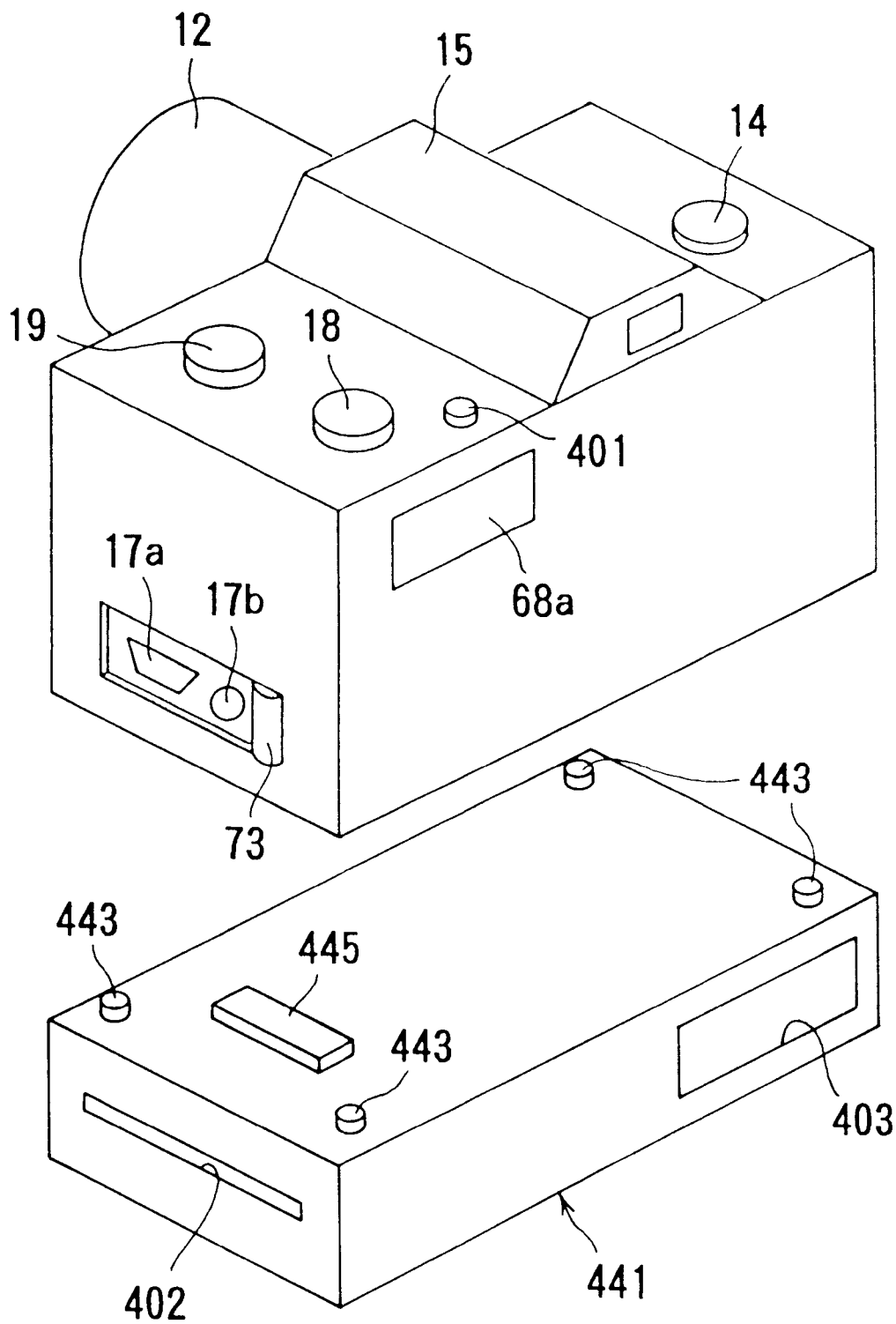
FIG. 40 is a schematic perspective view showing a fourth embodiment of an electronic still video camera according to the present invention.
Figure 41:
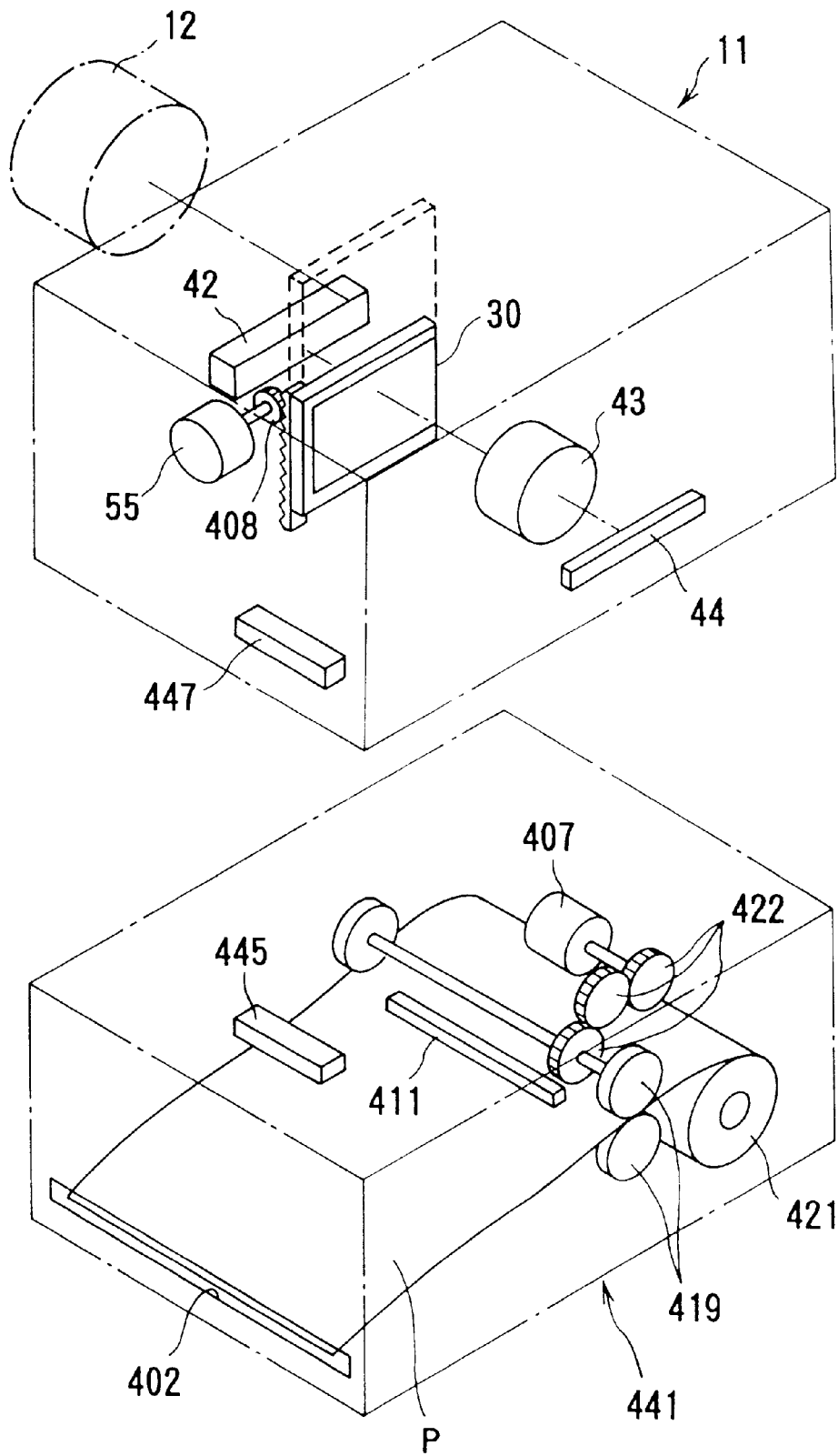
FIG. 41 is a schematic perspective view showing an arrangement of main parts of the fourth embodiment of FIG. 40.
Figure 42:
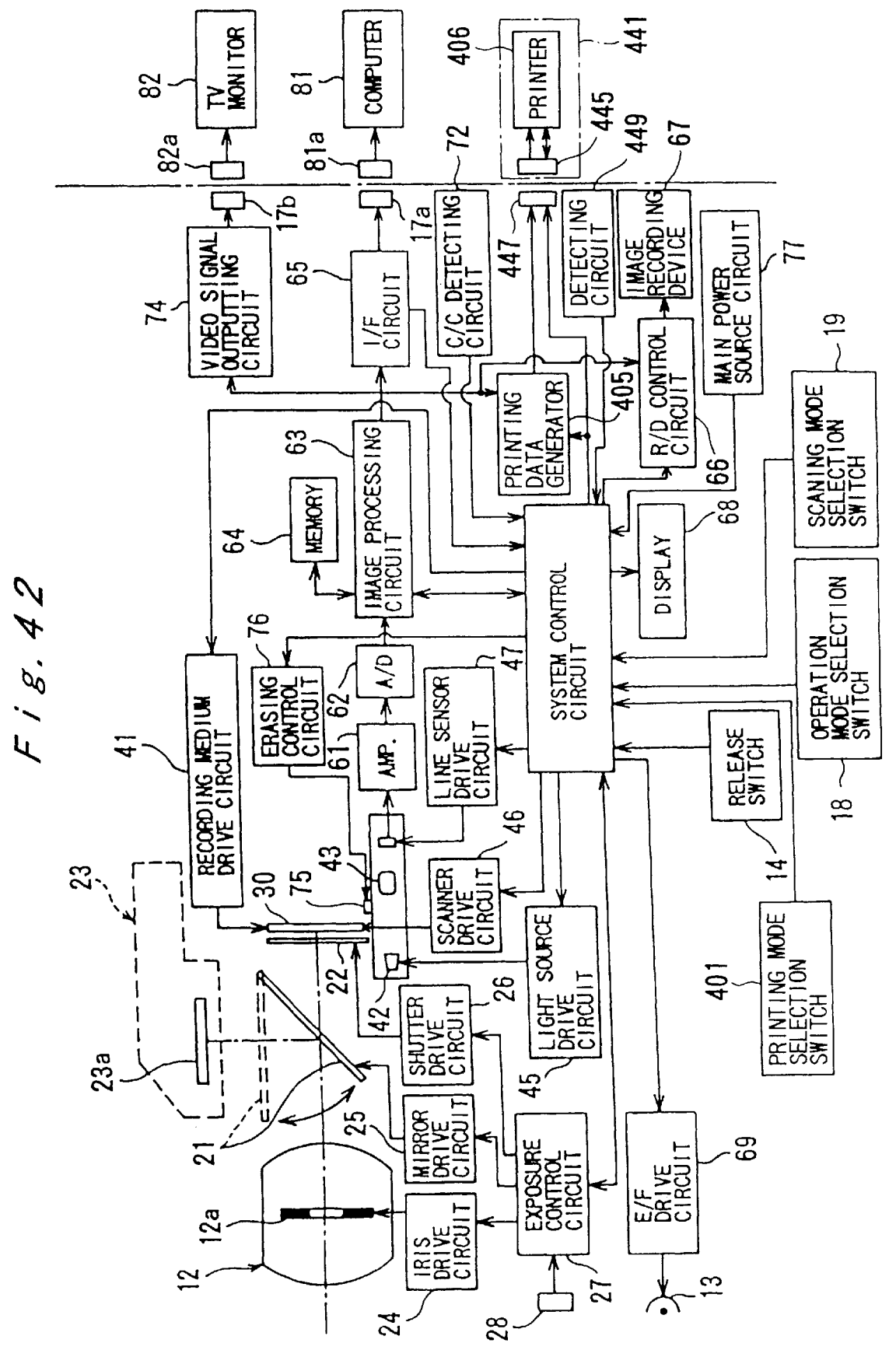

FIG. 40 and 41 show a fourth embodiment of an electronic still video camera according to the present invention, and FIG. 42 shows a block diagram of the fourth embodiment. In these drawings, the same references as in FIGS. 1 and 2 represent the same elements.

In the fourth embodiment, the camera is provided with a detachable printer 441, and the camera body 11 is removably mounted on a top surface of the printer 441. In particular, the printer 411 comprises a box-like housing having four positioning protrusions 443 arranged at four corners of the top wall thereof, and the camera body 11 has four recesses (not visible) arranged at four corners of the bottom wall thereof. The camera body 11 is mounted on the printer 441 in place such that the positioning protrusions 443 are received in the recesses, respectively.

Also, the camera body 11 has an interface connector 447 securely provided on the bottom thereof (FIG. 41), and the printer housing has an interface connector 445 securely provided on the top thereof. The interface connectors 445 and 447 are arranged so as to be coupled to each other when the camera body 11 is properly mounted on the printer housing.

As is apparent from the block diagram of FIG. 42, the printer 441 is connected to the system control circuit 20 and the printing data generator 405 through the coupled connectors 445 and 447. A detecting circuit 449 is provided in the vicinity of the interface connector 447 for detecting a connection between the interface connectors 445 and 447, and may be constituted in the same manner as the connector-connection detecting circuit 72, then the detecting circuit 449 does not detect the connection between the interface connectors 445 and 447, the printing operation enabling flag (POE) is forcibly reset to be "0".

Note, in FIG. 41, reference 407 indicates a motor for the printer 441; reference 421 indicates a roll of heat-sensitive paper; reference 419 indicates a pair of paper feeder roller assemblies for drawing the paper P out of the roll 412; and reference 422 indicates gears forming a gear train for transmitting a drive force from the motor 407 to the paper feeder roller assemblies 419.

Note that the electro-developing recording medium 30 is not restricted to the structure described above, and may be any other structure by which an image is electronically developed.

The present invention is not restricted to a single-lens reflex camera described above, but can be applied to a lens shutter camera. Note that, when the present invention is applied to the lens shutter camera, the shutter 22 need not be provided, as in the above described embodiment.

A single lens, a micro-lens arrays a rod lens array and so on may be used for the scanner optical system 43.

The line sensor 44 may be disposed in such a manner that a light beam reflected by the electro-developing recording medium 30 is sensed.

Finally, it will be understood by those skilled in the art that the foregoing description is of preferred embodiments of the disclosed electronic still video camera, and that various changes and modifications may be made to the present invention without departing from the spirit and scope thereof.

The present disclosure relates to subject matter contained in Japanese Patent Applications No. 7-47789 (filed on Feb. 13, 1995), No. 7-47790 (filed on Feb. 13, 1995), No. 7-47791 (filed on Feb. 13, 1995), No. 7-47792 (filed on Feb. 13, 1995), No. 7-47793 (filed on Feb. 13, 1995), and No. 7-47794 (filed on Feb. 13, 1995), which are expressly incorporated herein, by reference, in their entirety.

I claim:

1. An electronic camera having an electro-developing recording medium, said camera comprising:

a photographing unit that forms an optical image on said electro-developing recording medium to record said optical image in said recording medium;

a line image sensor that optically and electronically senses said recorded optical image;

a drive unit that intermittently moves said line image sensor with respect to said recorded optical image such that sensing of said recorded optical image by said line image sensor is carried out in a scanning manner to output a series of image data from said line image sensor at scanning step intervals;

an image processor that successively processes said series of image data outputted from said line image sensor, to produce a series of image reproduction data; and a printer that successively reproduces an image on a basis of said series of image reproduction data produced by said image processor, said printer comprising a writing device that writes said image on an image-carrying sheet, a feeding device that feeds said image-carrying sheet, and a synchronizing device that synchronizes a feeding of said image-carrying sheet with said scanning step intervals of said line image sensor, wherein the outputting of said series of image data by said line image sensor, the processing of said series of image data by said image-processor and the reproduction of said image by said printer are sequentially repeated until said recorded optical image is completely sensed by said line image sensor.

2. The electronic camera of claim 1, wherein said printer generates dots on a basis of said series of image reproduction data, to write said image on said image-carrying sheet.

3. The electronic camera of claim 1, further comprising a drive source that intermittently moves said line image sensor by said scanning step intervals, said feeding device of said printer being driven by said drive source through said synchronizing device.

4. The electronic camera of claim 1, further comprising:

an operation-mode selector that selects one of a first operation mode and a second operation mode, said first operation mode including a formation of said optical image by said photographing unit, said second operation mode excluding a formation of said optical image by said photographing unit; and a printing operation mode selector that determines whether a writing of said image on said image-carrying sheet by said printer is performed, wherein said writing of said image on said image-carrying sheet by said printer is enabled in both said first operation mode and said second operation mode, and said writing of said image on said image-carrying sheet by said printer is selectively disabled when said printing operation mode selector determines a disablement-condition.

5. The electronic camera of claim 4, wherein said first operation mode further includes the sensing of said recorded optical image by said line image sensor from said electro-developing recording medium after said formation of said optical image by said photographing unit, so that said series of image reproduction data is stored in a memory medium, said writing of said image on said image-carrying sheet by said printer being executed when said printing operation mode selector determines an enablement-condition.

6. The electronic camera of claim 4, wherein said first operation mode further includes the sensing of said recorded optical image by said line image sensor from said electro-developing recording medium after said formation of said optical image by said photographing unit, so that said writing of said image on said image-carrying sheet by said printer is executed when said printing operation mode selector determines an enablement-condition.

7. The electronic camera of claim 4, wherein said second operation mode includes the sensing of said recorded optical image by said line image sensor from said electro-developing recording medium, so that said series of image reproduction data is stored in a memory medium, said writing of said image on said image-carrying sheet by said printer being executed when said printing operation mode selector determines an enablement-condition.

8. The electronic camera of claim 4, wherein said second operation mode includes the sensing of said recorded optical image by said line image sensor from said electro-developing recording medium, so that said series of image reproduction data transfers to an external device, said writing of said image on said image-carrying sheet by said printer being executed when said printing operation mode selector determines an enablement-condition.

9. The electronic camera of claim 1, wherein said electro-developing recording medium comprises:

an electrostatic information recording medium; and an electric charge keeping medium.

10. The electronic camera of claim 9, wherein said electrostatic information recording medium comprises:

a photoconducting layer; and an inorganic oxide material layer, and said electric charge keeping medium comprises:

a liquid crystal display.

11. The electronic camera of claim 10, wherein said liquid crystal display comprises a memory type liquid crystal display.

12. An electronic camera having an electro-developing recording medium, said camera comprising:

a photographing unit that forms an optical image on said electro-developing recording medium to record said optical image in said recording medium;

a line image sensor that optically and electronically senses said recorded optical image;

a drive unit that intermittently moves said line image sensor with respect to said recorded optical image such that sensing of said recorded optical image by said line image sensor is carried out in a scanning manner to output a series of image data from said line image sensor at scanning step intervals;

an image processor that successively processes said series of image data outputted from said line image sensor, to produce a series of image reproduction data;

a video-processor that processes said series of image data outputted from said line image sensor, to produce a video signal;

a printer that successively reproduces an image on a basis of said series of image reproduction data produced by said image processor, and a disabling unit that disables said printer during outputting of said video signal from said video-processor, wherein the outputting of said series of image data by said line image sensor, the processing of said series of image data by said image processor and the reproduction of said image by said printer being sequentially repeated until said recorded optical image is completely sensed by said line image sensor.

13. An electronic camera having an electro-developing recording medium, said camera comprising:

a photographing unit that forms an optical image on said electro-developing recording medium to record said optical image in said recording medium;

a line image sensor that optically and electronically senses said recorded optical image;

a drive unit that intermittently moves said line image sensor with respect to said recorded optical image such that sensing of said recorded optical image by said line image sensor is carried out in a scanning manner to output a series of image data from said line image sensor at scanning step intervals;

a scanning step varying device that selectively varies said scanning step interval of said line image sensor;

an image processor that successively processes said series of image data outputted from said line image sensor, in accordance with a variation of said scanning step interval obtained by said scanning step varying device, to produce a series of image reproduction data; and a printer that successively reproduces an image on a basis of said series of image reproduction data produced by said image processor, said printer comprising a writing device that writes said image on an image-carrying sheet, a feeding device that feeds said image-carrying sheet in accordance with the variation of said scanning step interval obtained by said scanning step varying device, and a synchronizing device that synchronizes a feeding of said image-carrying sheet with said scanning step intervals of said line image sensor, wherein the outputting of said series of image data by said line image sensor, the processing of said series of image data by said image processor and the reproduction of said image by said printer are sequentially repeated until said recorded optical image is completely sensed by said line image sensor.

14. An electronic camera having an electro-developing recording medium, said camera comprising:

a photographing unit that forms an optical image on said electro-developing recording medium to record said optical image in said recording medium;

an image sensor that successively senses said recorded optical image in a scanning manner to output a series of image data at scanning step intervals;

an image-processor that successively processes said series of image data outputted from said image sensor, to produce a series of image-reproduction data;

an image-reproducing unit that reproduces an image on a basis of said image-reproduction data outputted from said image-processor; and an operation-mode selector that selects one of an auto-printing mode and a manual-printing mode, said auto-printing mode including a formation of said optical image by said photographing unit, the sensing of said recorded optical image by said image sensor from said electro-developing recording medium after said formation of said optical image by said photographing unit, so that said series of image reproduction data is stored in a memory medium, and the reproduction of said image by said image-reproducing unit, and said manual-printing mode including the sensing of said recorded optical image by said image sensor from said electro-developing recording medium, and the reproduction of said image by said image-reproducing unit.

15. An electronic camera having an electro-developing recording medium, said camera comprising:

a photographing unit that forms an optical image on said electro-developing recording medium to record said optical image in said electro-developing recording medium;

an image sensor that successively senses said recorded optical image in a scanning manner to output a series of image data at scanning step intervals;

an image-processor that successively processes said series of image data outputted from said image sensor, to produce a series of image-reproduction;

an image-reproducing unit that reproduces an image on a basis of said image-reproduction data outputted from said image-processor;

an operation-mode selector that selects one of a first operation mode and a second operation mode, said first operation mode including formation of said optical image by said photographing unit, said second operation mode excluding formation of said optical image by said photographing unit; and an image-reproduction mode selector that determines whether said image is reproduced by said image-reproducing unit, wherein said image is reproduced by said image-reproducing unit in both said first operation mode and said second operation mode, and said image is not reproduced by said image-reproducing unit when said image-reproduction mode selector determines a disablement-condition.

16. The electronic camera of claim 15, wherein said first operation mode includes the sensing of said recorded optical image by said image sensor from said electro-developing recording medium after said formation of said optical image by said photographing unit, so that said series of image reproduction data is stored in a memory medium, said image being reproduced by said image-reproducing unit when said image-reproduction mode selector determines an enablement-condition.

17. The electronic camera of claim 15, wherein said first operation mode includes the sensing of said recorded optical image by said image sensor from said electro-developing recording medium after said formation of said optical image by said photographing unit, said image being reproduced by said image-reproducing unit when said image-reproduction mode selector determines an enablement-condition.

18. The electronic camera of claim 15, wherein said second operation mode includes the sensing of said recorded optical image by said image sensor from said electro-developing recording medium, so that said series of image reproduction data is stored in a memory medium, said image being reproduced by said image-reproducing unit when said image-reproduction mode selector determines an enablement-condition.

19. The electronic camera of claim 15, wherein said second operation mode includes the sensing of said recorded optical image by said image sensor from said electro-developing recording medium, so that said series of image reproduction data transfers to an external device, said image being reproduced by said image-reproducing unit when said image-reproduction mode selector determines an enablement-condition.

20. The electronic camera of claim 15, wherein said electro-developing recording medium comprises:

an electrostatic information recording medium; and an electric charge keeping medium.

21. The electronic camera of claim 20, wherein said electrostatic information recording medium comprises:

a photoconducting layer and an inorganic oxide material layer, and said electric charge keeping medium comprises a liquid crystal display.

22. The electronic camera of claim 21, wherein said liquid crystal display comprises a memory type liquid crystal display.

23. An electronic camera having an electro-developing recording medium, said electro-developing recording medium comprising:

a photographing unit that forms an optical image carrying color information on said electro-developing recording medium to record said optical image in said electro-developing recording medium;

an image sensor that successively senses said recorded optical image in a scanning manner to output a series of image data carrying said color information at scanning step intervals; and an image-processor that successively processes said series of image data outputted from said image sensor, to produce a series of image-reproduction data carrying different color information different than the color information of the optical image, said different color information being reconstituted on a basis of said color information, wherein said color information carried by said recorded optical image comprises red, green, and blue, and said different color information comprises cyan, yellow, magenta, and black.

24. An electronic camera having an electro-developing recording medium, said electro-developing recording medium comprising:

a photographing unit that forms an optical image carrying color information on said electro-developing recording medium to record said optical image in said electro-developing recording medium;

an image sensor that successively senses said recorded optical image in a scanning manner to output a series of image data carrying said color information at scanning step intervals; and an image-processor that successively processes at least two series of image data outputted from said image sensor, to produce a series of image-reproduction data carrying color information different than the color information of the optical image, the different color information being reconstituted on a basis of said color information, wherein said color information carried by the recorded image comprises red, green, and blue, and said different color information comprises cyan, yellow, magenta, and black.

* * * * *